(12) United States Patent
Ricci

(10) Patent No.: US 10,071,641 B2
(45) Date of Patent: Sep. 11, 2018

(54) ELECTRIC CONTACT DEVICE FOR ELECTRIC VEHICLES AND METHOD OF USE

(71) Applicant: NIO USA, Inc., San Jose, CA (US)

(72) Inventor: Christopher P. Ricci, Saratoga, CA (US)

(73) Assignee: NIO USA, INC., San Jose, CA (US)

( * ) Notice: Subject to any disclaimer, the term of this patent is extended or adjusted under 35 U.S.C. 154(b) by 0 days.

(21) Appl. No.: 15/246,867

(22) Filed: Aug. 25, 2016

(65) Prior Publication Data

US 2017/0136882 A1   May 18, 2017

Related U.S. Application Data

(60) Provisional application No. 62/255,214, filed on Nov. 13, 2015, provisional application No. 62/259,536, (Continued)

(51) Int. Cl.
*B60L 5/16* (2006.01)
*B60L 5/08* (2006.01)
(Continued)

(52) U.S. Cl.
CPC .......... *B60L 11/182* (2013.01); *B60L 5/005* (2013.01); *B60L 5/06* (2013.01); *B60L 5/08* (2013.01);
(Continued)

(58) Field of Classification Search
CPC .............. B60L 5/16; B60L 5/06; B60L 5/08
(Continued)

(56) References Cited

U.S. PATENT DOCUMENTS 3,914,562 A * 10/1975 Bolger .................. B60K 1/04
191/10
5,311,973 A   5/1994 Tseng et al.
(Continued)

FOREIGN PATENT DOCUMENTS

CN   102025184   4/2011
CN   203301194   11/2013
(Continued)

OTHER PUBLICATIONS

U.S. Appl. No. 14/954,436, filed Nov. 30, 2015, Ricci.
(Continued)

*Primary Examiner* — Sun Lin
(74) *Attorney, Agent, or Firm* — Sheridan Ross P.C.

(57) ABSTRACT

A system for charging an electrical storage unit of an electric vehicle through a contact device, the system comprising: the contact device interconnected to the electrical storage unit of an electric vehicle and configured to receive an electrical charge from an external power source; a contact arm interconnected to the contact device, the contact arm configured to position the contact device at a first position relative to the external power source; and a contact device controller interconnected to the contact arm and configured to control the contact arm wherein the first position is maintained; wherein the contact device receives the electrical charge from the external power source; wherein the electrical storage unit of the electric vehicle is charged.

17 Claims, 46 Drawing Sheets

Related U.S. Application Data filed on Nov. 24, 2015, provisional application No. 62/266,452, filed on Dec. 11, 2015, provisional application No. 62/269,764, filed on Dec. 18, 2015, provisional application No. 62/300,606, filed on Feb. 26, 2016, provisional application No. 62/310,387, filed on Mar. 18, 2016.

(51) Int. Cl.
| | |
|---|---|
| *B60L 5/06* | (2006.01) |
| *B60L 11/18* | (2006.01) |
| *H02J 7/35* | (2006.01) |
| *H04B 10/80* | (2013.01) |
| *G06Q 10/06* | (2012.01) |
| *G06Q 50/06* | (2012.01) |
| *G07C 5/00* | (2006.01) |
| *G07F 15/00* | (2006.01) |
| *B60L 5/00* | (2006.01) |
| *G08G 1/00* | (2006.01) |

(52) U.S. Cl.
CPC ............. *B60L 5/16* (2013.01); *B60L 11/1829* (2013.01); *B60L 11/1833* (2013.01); *B60L 11/1838* (2013.01); *B60L 11/1844* (2013.01); *G06Q 10/06313* (2013.01); *G06Q 50/06* (2013.01); *G07C 5/008* (2013.01); *G07F 15/005* (2013.01); *H02J 7/35* (2013.01); *H04B 10/806* (2013.01); *H04B 10/807* (2013.01); *B60L 11/18* (2013.01); *G08G 1/20* (2013.01); *Y02T 90/16* (2013.01)

(58) Field of Classification Search
USPC ........................................................ 320/109
See application file for complete search history.

(56) References Cited

U.S. PATENT DOCUMENTS

| | | | |
|---|---|---|---|
| 5,431,264 A | | 7/1995 | Tseng et al. |
| 5,523,666 A | * | 6/1996 | Hoelzl et al. ............. B60K 1/04 320/109 |
| 5,563,491 A | | 10/1996 | Tseng |
| 5,821,728 A | | 10/1998 | Schwind |
| 5,821,731 A | * | 10/1998 | Kuki et al. .......... B60L 11/1805 320/108 |
| 6,291,901 B1 | | 9/2001 | Cefo |
| 6,792,259 B1 | * | 9/2004 | Parise et al. .......... B01F 5/0614 455/343.1 |
| 7,714,536 B1 | | 5/2010 | Silberg et al. |
| 8,465,303 B2 | * | 6/2013 | Lacour .................. B60L 3/0069 320/106 |
| 8,627,906 B2 | * | 1/2014 | Lacour .................. B60L 3/0069 180/2.1 |
| D706,212 S | | 6/2014 | Zwierstra et al. |
| 8,763,774 B2 | * | 7/2014 | Asplund ................... B60L 5/40 104/243 |
| 8,768,533 B2 | | 7/2014 | Ichikawa |
| 8,776,969 B2 | * | 7/2014 | Asplund ............... B60L 3/0046 104/243 |
| 8,796,990 B2 | | 8/2014 | Paparo et al. |
| 8,841,785 B2 | | 9/2014 | Theuss et al. |
| 8,841,881 B2 | | 9/2014 | Failing |
| 8,853,999 B2 | | 10/2014 | Haddad et al. |
| 9,018,904 B2 | | 4/2015 | Seyerle et al. |
| D736,716 S | | 8/2015 | Hough et al. |
| 9,120,506 B2 | | 9/2015 | Isakiewitsch et al. |
| 9,124,124 B2 | | 9/2015 | Van Wiemeersch et al. |
| 9,809,122 B2 | * | 11/2017 | McGrath ............. B60L 11/1818 |
| 2009/0184681 A1 | | 7/2009 | Kuno |
| 2010/0017249 A1 | * | 1/2010 | Fincham et al. .......... B60L 3/12 705/412 |
| 2011/0148350 A1 | | 6/2011 | Wegener et al. |
| 2011/0204845 A1 | | 8/2011 | Paparo et al. |
| 2012/0056600 A1 | | 3/2012 | Nevin |
| 2012/0078553 A1 | | 3/2012 | Kuroda et al. |
| 2012/0203410 A1 | | 8/2012 | Wechlin et al. |
| 2012/0233062 A1 | | 9/2012 | Cornish |
| 2013/0020162 A1 | * | 1/2013 | Asplund ................... B60L 5/42 191/49 |
| 2013/0020163 A1 | * | 1/2013 | Asplund ............... B60L 3/0046 191/22 C |
| 2013/0033224 A1 | | 2/2013 | Raedy |
| 2013/0033228 A1 | | 2/2013 | Raedy |
| 2013/0038276 A1 | | 2/2013 | Raedy |
| 2013/0041850 A1 | | 2/2013 | LaFrance |
| 2013/0105264 A1 | | 5/2013 | Ruth et al. |
| 2013/0193918 A1 | | 8/2013 | Sarkar et al. |
| 2013/0211988 A1 | | 8/2013 | Dorn et al. |
| 2013/0249682 A1 | | 9/2013 | Van Wiemeersch et al. |
| 2014/0012448 A1 | | 1/2014 | Tripathi et al. |
| 2014/0042752 A1 | | 2/2014 | McDermott |
| 2014/0067660 A1 | | 3/2014 | Cornish |
| 2014/0266042 A1 | | 9/2014 | Storm |
| 2015/0042211 A1 | | 2/2015 | Pan |
| 2015/0137801 A1 | | 5/2015 | Raedy et al. |
| 2015/0239352 A1 | | 8/2015 | Bell et al. |
| 2015/0249362 A1 | | 9/2015 | Bridgelall et al. |
| 2016/0089987 A1 | | 3/2016 | Ichikawa et al. |
| 2016/0272074 A1 | | 9/2016 | McGrath et al. |
| 2016/0332524 A1 | | 11/2016 | Yoon et al. |

FOREIGN PATENT DOCUMENTS

| | | |
|---|---|---|
| EP | 2711876 | 3/2014 |
| WO | WO 2011/045883 | 4/2011 |
| WO | WO 2011/106506 | 9/2011 |

OTHER PUBLICATIONS

U.S. Appl. No. 14/954,484, filed Nov. 30, 2015, Ricci.
U.S. Appl. No. 14/979,158, filed Dec. 22, 2015, Ricci.
U.S. Appl. No. 14/981,368, filed Dec. 28, 2015, Ricci.
U.S. Appl. No. 15/010,701, filed Jan. 29, 2016, Ricci.
U.S. Appl. No. 15/010,921, filed Jan. 29, 2016, Ricci.
U.S. Appl. No. 15/044,940, filed Feb. 16, 2016, Ricci.
U.S. Appl. No. 15/048,307, filed Feb. 19, 2016, Ricci.
U.S. Appl. No. 15/143,083, filed Apr. 29, 2016, Ricci.
U.S. Appl. No. 15/145,416, filed May 3, 2016, Ricci.
U.S. Appl. No. 15/169,073, filed May 31, 2016, Ricci.
U.S. Appl. No. 15/170,406, filed Jun. 1, 2016, Ricci.
U.S. Appl. No. 15/196,898, filed Jun. 29, 2016, Ricci.
U.S. Appl. No. 15/198,034, filed Jun. 30, 2016, Ricci.
U.S. Appl. No. 15/223,814, filed Jul. 29, 2016, Ricci.
U.S. Appl. No. 15/226,446, filed Nov. 30, 2015, Ricci.
"Inductive charging," Wikipedia, 2015, retrieved from https://en.wikipedia.org/wiki/Inductive_charging, 6 pages.
"Meet the Plugless L2," Pluglesspower.com, 2014, retrieved from https://web.archive.org/web/20150920163501/https://www.pluglesspower.com/, 5 pages.
"Someday Your EV Charger May Be the Roadway Itself," MIT Technology Review, 2013, retrieved from http://www.technologyreview.com/news/521761/someday-your-ev-charger-may-be-the-roadway-itself/, 2 pages.
"Wireless Charging for Electric Vehicles," brochure, QUALCOMM HALO, 2011, 6 pages.
"Wireless Charging," PowerbyProxi, 2015, retrieved from https://powerbyproxi.com/wireless-charging/, 5 pages.
Brachmann, Wireless induction charging is coming to electric vehicles, IPWatchdog, 2015, retrieved from http://www.ipwatchdog.com/2015/06/18/wireless-induction-charging-is-coming-to-electric-vehicles/id=58756/, 6 pages.
Crawford, "UK motorway to charge electric cars on the move," E&T, 2014, retrieved from http://eandt.theiet.org/news/2014/apr/onroad-charging.cfm, 4 pages.
Gitlin, "Cutting the cord: Ars goes hands-on with Qualcomm Halo wireless car charging," Ars Technica, 2015, retrieved from http://

(56) References Cited

OTHER PUBLICATIONS arstechnica.com/cars/2015/04/cutting-the-cord-ars-goes-hands-on-with-qualcomm-halo-wireless-car-charging/, 5 pages.

Gordon-Bloomfield, "Infiniti Delays LE Electric Sedan Production Plans," PluginCars.com, 2013, retrieved from http://www.plugincars.com/print/127405, 2 pages.

Greimel, "Nissan's next Evs: More mainstream, better battery," Automotive News, 2014, retrieved from http://www.autonews.com/article/20140507/OEM05/140509845?template=printart, 2 pages.

Harris, "Your questions answered: inductive charging for road vehicles," the Engineer, 2013, retrieved from http://www.theengineer.co.uk/automotive/in-depth/your-questions-answered-inductive-charging-for-road-vehicles, 8 pages.

Ivanco et al., "Wireless Charging Panel," EV Roadmap 7, 2014, 15 pages.

Li et al., "Energy Management and Control of Electric Vehicle Charging Stations," Electric Power Companents and Systems, 2014, vol. 42(3-4), pp. 339-347.

Marks, "Wireless Charging for Electric vehicles hits the road," New Scientist, 2014, Issue 2953, retrieved from https://www.newscientist.com/article/mg22129534-900-wireless-charging-for-electric-vehicles-hits-the-road/, 2 pages.

Morris, "What's up with wireless EV charging," Charged Evs, 2013, retrieved from https://chargedevs.com/features/whats-wireless-ev-charging/, 9 pages.

Rim, "Wireless Power Transfer Systems for Roadway-powered Electric Vehicles," IEEE, 2014, retrieved from http://tec.ieee.org/2014/09/02/wireless-power-transfer-systems-roadway-powered-electric-vehicles/, 6 pages.

Stewart, "2014 Infiniti EV to Debut Wireless Inductive Charging System," Popular Mechanics, 2011, retrieved from http://www.popularmechanics.com/cars/hybrid-electric/a7331/2014-infiniti-ev-to-debut-wireless-inductive-charging-system/, 4 pages.

Szondy, "BMW developing wireless inductive charging system for electric vehicles," gizmag.com, 2014, retrieved from http://newatlas.com/bmw-induction-charging/32863/, 4 pages.

Taylor, "Unplugged: Audi Readying Wireless Induction Charging for Q7 e-tron," Car and Driver, 2015, retrieved from http://blog.caranddriver.com/unplugged-audi-readying-wireless-induction-charging-for-q7-e-tron/2 pages.

International Search Report and Written Opinion for International (PCT) Patent Application No. PCT/US2016/061885, dated Jan. 27, 2017, 9 pages.

Official Action for U.S. Appl. No. 15/226,446, dated Apr. 4, 2018, 18 pages.

International Preliminary Report on Patentability for International (PCT) Patent Application No. PCT/US2016/061885, dated May 24, 2018, 10 pages.

Official Action for U.S. Appl. No. 15/223,814, dated Jun. 29, 2018, 2018, 18 pages.

* cited by examiner

| Charging Type | Compatible Vehicle Charging Panel Types | Compatible Vehicle Storage Units | Available Automation Level | Charging Service Status | Charge Rate | Cost | Other | Shielding |
|---|---|---|---|---|---|---|---|---|
| Station: manual | Roof, Side | x, z | Low | Up | Low | $100 | A, B, C | On |
| Station: manual | Roof, Side | x, z | Low | Up | Medium | $150 | A, C | On |
| Station: manual | Roof, Side | x, z | Low | Up | High | $400 | A, B, C | On |
| Station: robotic | Roof, Side | x, z | Medium | Down | Medium | $150 | A, B, D | On |
| Station: robotic | Roof, Side | x, z | High | Down | High | $500 | B, D | On |
| Station: robotic | Roof, Side | x, z | High | Down | High | $500 | B, C | On |
| Roadway | Side, Lower | x, z | Low | Up | Low | $50 | A, C, E | Off |
| Roadway | Side, Lower | x, z | Medium | Up | Low | $100 | A, C, E | Off |
| Roadway | Side, Lower | x, z | Medium | Up | Low | $100 | A, C, E | Off |
| Emergency: truck | Roof, Side, Lower | x, y | Low | Up | Low | $150 | A, B | Off |
| Emergency: truck | Roof, Side, Lower | x, y | Medium | Up | Medium | $200 | A, B | Off |
| Emergency: truck | Roof, Side, Lower | x, y | Medium | Up | High | $500 | A, D | Off |
| Emergency: UAV | Roof | x | Medium | Down | Medium | $500 | A, B, C | Off |
| Emergency: UAV | Roof | x | High | Down | High | $800 | B | Off |
| Emergency: UAV | Roof | x | High | Down | High | $800 | B | Off |
| Overhead | Roof | x, y | Low | Up | Low | $150 | B, D | Off |
| Overhead | Roof | x, y | Medium | Up | Low | $200 | B, C | Off |
| Overhead | Roof | x, y | Medium | Up | Low | $200 | B, C | Off |

Fig. 3

ELECTRIC CONTACT DEVICE FOR ELECTRIC VEHICLES AND METHOD OF USE

CROSS REFERENCE TO RELATED APPLICATIONS

The present application claims the benefits of and priority, under 35 U.S.C. § 119(e), to U.S. Provisional Application Ser. No. 62/255,214, filed on Nov. 13, 2015, entitled "Electric Vehicle Systems and Operation"; 62/259,536, filed Nov. 24, 2015, entitled "Charging Transmission Line Under Roadway for Moving Electric Vehicle"; 62/266,452, filed Dec. 11, 2015, entitled "Charging Transmission Line Under Roadway for Moving Electric Vehicle"; 62/269,764, filed Dec. 18, 2015, entitled "Conditional Progressive Degradation of Electric Vehicle Power Supply System"; 62/300,606, filed Feb. 26, 2016, entitled "Charging Transmission Line Under Roadway for Moving Electric Vehicle"; and 62/310,387, filed Mar. 18, 2016, entitled "Distributed Processing Network for Rechargeable Electric Vehicle Tracking and Routing." The entire disclosures of the applications listed above are hereby incorporated by reference, in their entirety, for all that they teach and for all purposes.

This application is also related to U.S. patent application Ser. No. 14/954,436, filed on Nov. 30, 2015, entitled "Electric Vehicle Roadway Charging System and Method of Use"; Ser. No. 14/954,484, filed on Nov. 30, 2015, entitled "Electric Vehicle Charging Device Positioning and Method of Use"; Ser. No. 14/979,158, filed on Dec. 22, 2015, entitled "Electric Vehicle Charging Device Alignment and Method of Use"; Ser. No. 14/981,368, filed on Dec. 28, 2015, entitled "Electric Vehicle Charging Device Obstacle Avoidance and Warning System and Method of Use"; Ser. No. 15/010,701, filed on Jan. 29, 2016, entitled "Electric Vehicle Emergency Charging System and Method of Use"; Ser. No. 15/010,921, filed on Jan. 29, 2016, entitled "Electric Vehicle Aerial Vehicle Charging System and Method of Use"; Ser. No. 15/044,940, filed on Feb. 16, 2016, entitled "Electric Vehicle Overhead Charging System and Method of Use"; Ser. No. 15/048,307, filed on Feb. 19, 2016, entitled "Electric Vehicle Charging Station System and Method of Use"; Ser. No. 15/143,083, filed on Apr. 29, 2016, entitled "Vehicle to Vehicle Charging System and Method of Use"; Ser. No. 15/145,416, filed on May 3, 2016, entitled "Electric Vehicle Optical Charging System and Method of Use"; Ser. No. 15/169,073, filed on May 31, 2016, entitled "Vehicle Charge Exchange System and Method of Use"; Ser. No. 15/170,406, filed Jun. 1, 2016, entitled "Vehicle Group Charging System and method of Use"; Ser. No. 15/196,898, filed Jun. 29, 2016, entitled "Predictive Charging System and Method of Use"; Ser. No. 15/198,034 filed Jun. 30, 2016, entitled "Integrated Vehicle Charging Panel System and Method of Use"; Ser. No. 15/223,814 filed Jul. 29, 2016, entitled "Vehicle Skin Charging System and Method of Use"; and Ser. No. 15/226,446 filed Aug. 2, 2016, entitled "Vehicle Capacitive Charging System and Method of Use".

The entire disclosures of the applications listed above are hereby incorporated by reference, in their entirety, for all that they teach and for all purposes.

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

BRIEF DESCRIPTION OF THE DRAWINGS

FIG. 3 is a diagram of an embodiment of a data structure for storing information about a vehicle in an environment;

Figure 1:
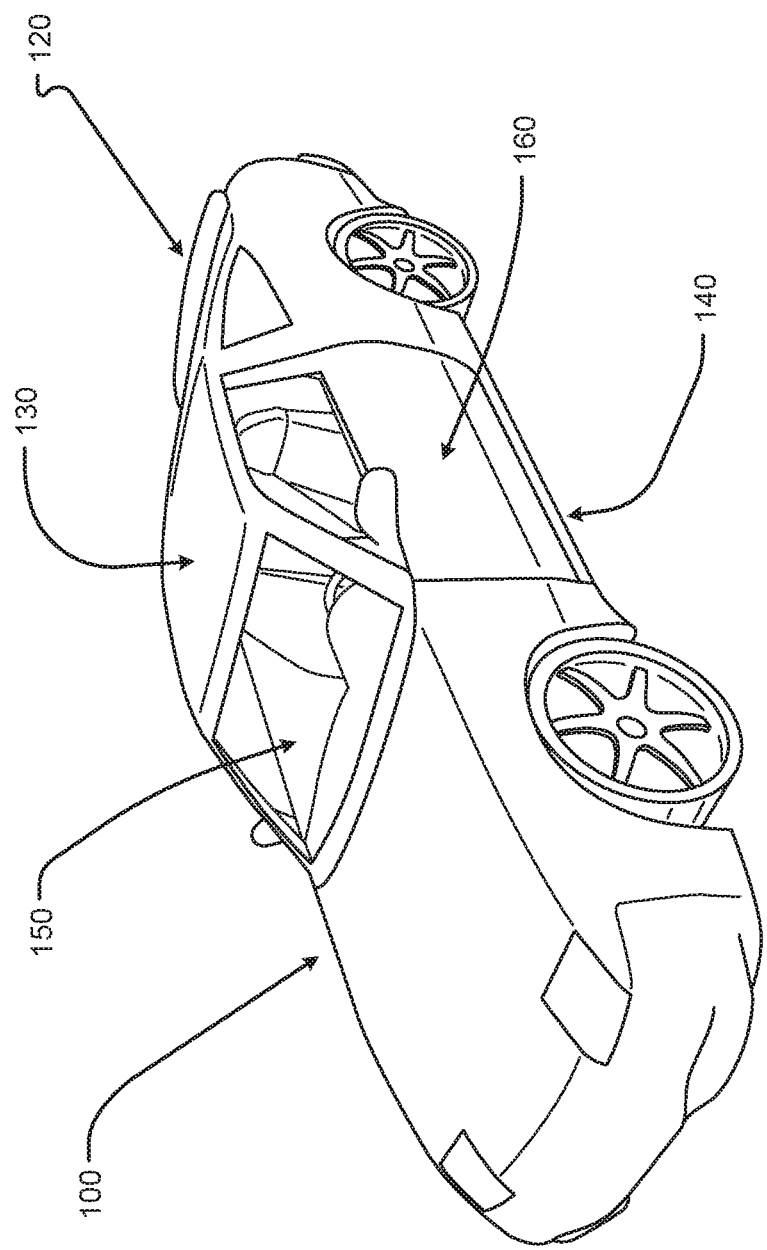
FIG. 1 shows a vehicle in accordance with embodiments of the present disclosure.

To assist in the understanding of the present invention the following list of components and associated numbering found in the drawings is provided herein:

| # | Component |
|---|---|
| 10 | System |
| 100 | Vehicle |
| 110 | Vehicle front |
| 120 | Vehicle aft |
| 130 | Vehicle roof |
| 140 | Vehicle undercarriage |
| 150 | Vehicle interior |
| 160 | Vehicle side |
| 210 | Vehicle database |
| 220 | Vehicle driver |
| 230 | Vehicle passengers |
| 240 | Remote operator system |
| 250 | Roadway system |
| 254 | Robotic charging system |
| 258 | Overhead charging system |
| 260 | Roadway vehicles |
| 270 | Emergency charging vehicle system |
| 280 | Aerial vehicle charging system |
| 290 | Autonomous environment |
| 300 | Data structure |
| 310A-M | Data structure fields |
| 400 | Instrument panel |
| 410 | Steering wheel |
| 420 | Vehicle operational display |
| 424 | Auxiliary display |
| 428 | Power management display |
| 432 | Charging manual controller |
| 434 | Head-up display |
| 504 | Roadway |
| 516 | (Charging) Power source |
| 520 | Charging plate |
| 520A-C | Roadway charging areas |
| 530 | Direction one |
| 532 | Direction two |
| 540A | Parking space |
| 540B | Traffic controlled space |
| 608 | Charging panel (retracted) |
| 608' | Charging panel (deployed) |
| 610 | Charging panel controller |
| 612 | Energy storage unit |
| 622 | Charge provider controller |
| 624 | Transmission line |
| 626 | Vehicle sensors |
| 700 | Robotic unit |
| 704 | Robotic unit arm |
| 713 | Robotic unit database |
| 810 | Tower |
| 814 | First wire |

-continued

| # | Component |
|---|---|
| 818 | Second wire |
| 820 | Pantograph |
| 824 | Overhead contact |
| 834 | Overhead charging data structure |
| 910 | Roadway passive vehicles |
| 920 | Roadway active vehicles |
| 921 | Charging vehicle |
| 922 | Charging vehicle arm |
| 923 | Charging vehicle arm controller |
| 924 | Distance Sensor |
| 925 | Receiving vehicle |
| 1010 | Tether |
| 1140 | Charging cable |
| 1150 | Connector |
| 1204 | Frame |
| 1208 | Body (Panels) |
| 1308 | Power Source |
| 1308A | First Power Source |
| 1308B | Second Power Source |
| 1312 | Electric Motor |
| 1314 | Motor Controller |
| 1316 | Bumpers |
| 1316A | Front Bumper |
| 1316B | Rear Bumper |
| 1320 | Drive Wheel |
| 1324 | Charge Controller |
| 1328 | Electrical Interconnection |
| 1332 | Redundant Electrical Interconnection |
| 1336 | Energy Recovery System |
| 1402 | Broken Section |
| 1404 | Charging Plug/Receptacle |
| 1408 | Power Transmission Interconnection |
| 1412 | Inductive Charger |
| 1500 | Electrical system |
| 1504 | Power Generation Unit |
| 1508 | Loads |
| 1512 | Billing and Cost unit |
| 1604 | Generator power source |
| 1608 | Wired or wireless charging power source |
| 1612 | Regenerative braking system |
| 1616 | Solar array |
| 1618 | Electrical Interconnection |
| 1620 | Power source interface |
| 1624 | Electrical Interface |
| 1628 | Mechanical Interface |
| 1632 | Electrical Converter |
| 1638 | Conditioner |
| 1704 | Battery and/or capacitors |
| 1708 | Charge Management unit |
| 1804 | Electric motor |
| 1808 | User interaction loads |
| 1812 | Environmental loads |
| 1816 | Sensor loads |
| 1820 | Safety loads |
| 2000 | Vehicle to vehicle charging system |
| 2100 | Vehicle to vehicle control system |
| 2200 | Graphical user interface |
| 2204 | Display device |
| 2208 | Feedback adjustment image one |
| 2208' | Feedback adjustment image two |
| 2212 | (Charging) Power Source centerline icon |
| 2216 | (Charging) Power Source icon |
| 2220 | Charging Plate centerline icon |
| 2224 | Alignment instruction |
| 2334 | Vehicle to vehicle charging system data structure |
| 2400 | Optical charging system |
| 2410 | Optical charging station |
| 2420 | Optical charging station base |
| 2422 | Optical charging station antenna controller |
| 2424 | Optical charging station antenna |
| 2430 | Optical charging station signal |
| 2450 | Optical charge receiving vehicle |
| 2452 | Receiving vehicle antenna/PV array controller |
| 2454 | Receiving vehicle antenna |
| 2456 | Receiving vehicle PV array |
| 2458 | Receiving vehicle converter |
| 2460 | Receiving vehicle signal |

-continued

| # | Component |
|---|---|
| 2470 | Vehicle optical charging data structure |
| 2475A-O | Vehicle optical charging data structure fields |
| 2700 | Charge exchange system |
| 2710 | Vehicle charging source |
| 2720 | Charge source database |
| 2722 | Charge source data structure |
| 2724A-M | Charge source data structure fields |
| 2730 | Home charge source |
| 2740 | Business charge source |
| 2822 | Receiving vehicle data structure |
| 2824A-K | Receiving vehicle data structure fields |
| 3000 | Group charging system |
| 3010 | Base station |
| 3020 | Base station database |
| 3022 | Base station data structure |
| 2024A-K | Base station data structure fields |
| 3030 | Base station business module |
| 3040 | Base station communications module |
| 3050 | Raw services/goods/materials |
| 3060 | Competitive climate |
| 3070 | Economic climate |
| 3080 | Other business climate |
| 3300 | Predictive charging system |
| 3310 | Predictive charging station |
| 3320 | Predictive charging database |
| 3322 | Predictive charging data structure |
| 3330 | Predictive charging analysis module |
| 3340 | Predictive charging communications module |
| 3350 | Predictive charging billing module |
| 3360 | Predictive charging user initialization module |
| 3608 | Integrated charging panel |
| 3610 | Integrated charging panel controller |
| 3700 | Integrated charging panel system |
| 3710 | Charging communication |
| 3712 | Charging site |
| 3713 | Site charging source database |
| 3900 | Skin charging system |
| 3910 | Door panel |
| 3920 | Door capacitor |
| 3921 | Door capacitor plate one |
| 3922 | Door capacitor plate two |
| 3924 | Door capacitive system |
| 4000 | Capacitive charging system |
| 4008 | Capacitor |
| 4034 | Capacitor charging display |
| 4200 | Contact System |
| 4210 | Contact Arm |
| 4230 | Contact sensor |
| 4240 | Contact controller |

SUMMARY

The disclosure provides a system and method of use to provide electric vehicle charging. Specifically, systems and methods to provide a charge exchange system are presented.

In one embodiment, a system for charging an electrical storage unit of an electrical vehicle through a contact device is disclosed, the system comprising: a contact device interconnected to the electrical storage unit of an electrical vehicle and configured to receive an electrical charge from an external power source; a contact arm interconnected to the contact device, the contact arm configured to position the contact device at a first position relative to the external power source; and a contact device controller interconnected to the contact arm and configured to control the contact arm wherein the first position is maintained; wherein the contact device receives the electrical charge from the external power source; wherein the electrical storage unit of the electrical vehicle is charged.

In another embodiment, a method for method for charging an electrical storage unit of an electrical vehicle through a contact device is disclosed, the method comprising: determining the electrical storage unit of the electric vehicle requires charging; positioning, by a microprocessor, a contact device at a first position relative to an external power source, the contact device interconnected to the electrical storage unit of an electrical vehicle and configured to receive an electrical charge from the external power source; receiving, through the contact device, the electrical charge from the external power source; wherein the electrical storage unit of the electrical vehicle is charged.

In some embodiments, the system and/or the method may further comprise: wherein the contact device engages the external power source through physical contact; wherein the contact device comprises a contact wheel, contact brush, and pantograph; wherein the contact device controller maintains the first position through feedback control; wherein the external power source is embedded in a roadway surface; further comprising a vertical distance measurement sensor configured to output a distance measurement of the distance between contact device and the external power source; wherein the vertical distance measurement sensor is disposed on at least one of the contact device, actuator and contact arm; wherein the contact device controller receives the distance measurement to enable feedback control; further comprising an actuator interconnected to at least one of the contact device and the contact arm; wherein the position of the contact device relative to the external power source is presented to a user of the electrical vehicle on a graphical user interface; wherein the graphical user interface is disposed on a mobile device; wherein the first position is selected from a vehicle database comprising desired contact device separation distance with respect to external power source types; wherein the electrical vehicle is moving relative to the external power source.

In further embodiments, the method may further comprise the step of measuring, by a sensor, a vertical distance measurement between the contact device and the external power source, wherein the vertical distance measurement is received by the microprocessor to position the contact device relative to the external power source.

The term "capacitor" means any two terminal electrical component used to store electrical energy in an electric field, to include devices comprising a pair of conductor plates separated by a dielectric.

The term "dielectric" means any electrical insulator that stores energy by becoming polarized.

The term "capacitance" means the ratio of the electrical charge on each conductor of a capacitor to the electrical potential between the conductors.

The term "mains electricity" and variations thereof, as used herein, refer to the general-purpose alternating-current (AC) electric power supply. In the US, mains electric power is referred to by several names including household power, household electricity, house current, powerline, domestic power, wall power, line power, AC power, city power, street power, and grid power.

The term "PV" means photovoltaic and generally refers to a means or method of converting light or solar energy into electricity.

The term "PV array" means at assembly of PV cells or modules.

DETAILED DESCRIPTION

Embodiments of the present disclosure will be described in connection with a vehicle, and in accordance with one exemplary embodiment an electric vehicle and/or hybrid-electric vehicle and associated systems.

With attention to FIGS. 1-44, embodiments of the electric vehicle system 10 and method of use are depicted.

Referring to FIG. 1, the electric vehicle system comprises electric vehicle 100. The electric vehicle 100 comprises vehicle front 110, vehicle aft 120, vehicle roof 130, vehicle side 160, vehicle undercarriage 140 and vehicle interior 150.

Figure 2:
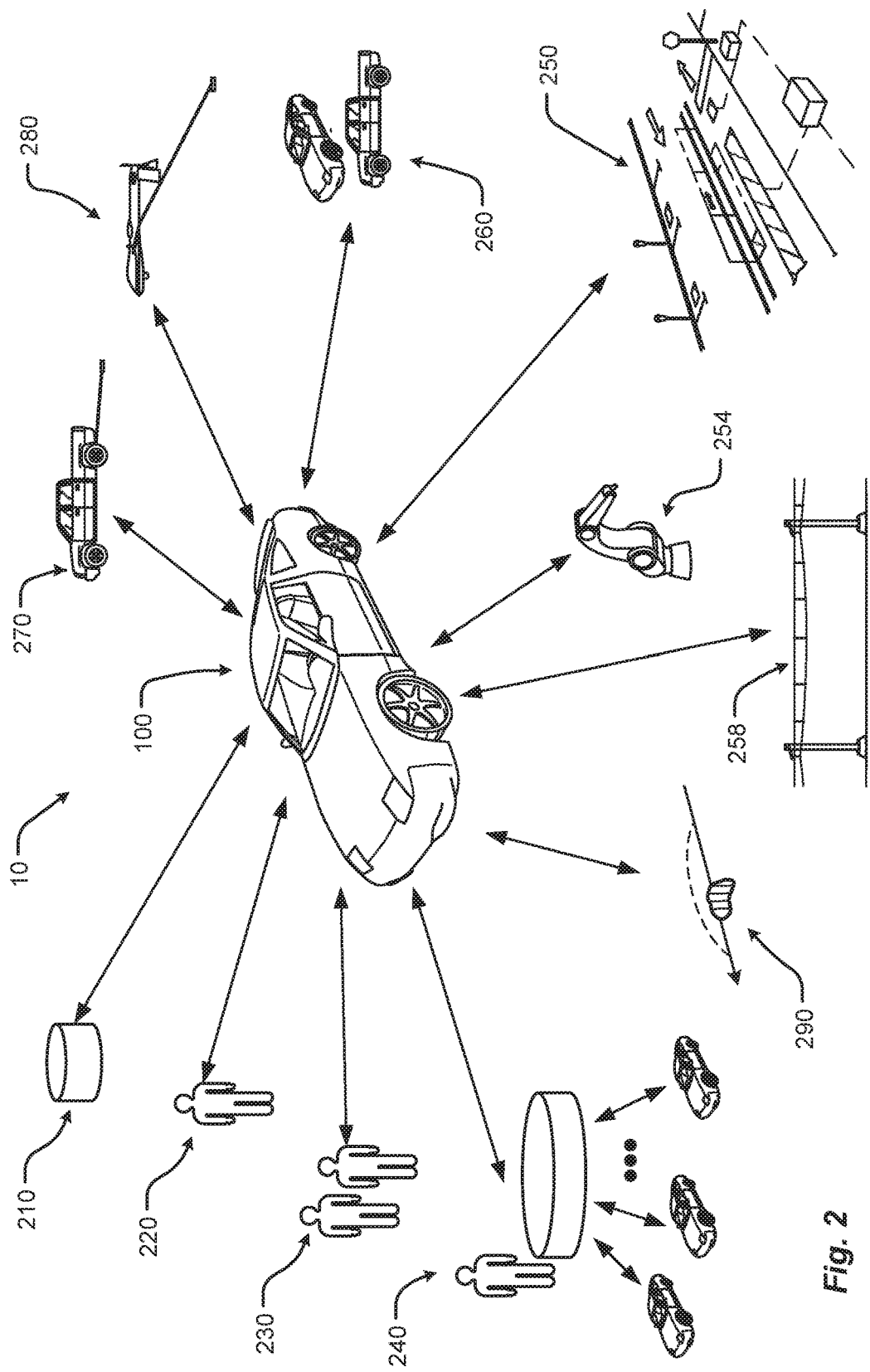
FIG. 2 shows a vehicle in an environment in accordance with embodiments of the present disclosure.

Referring to FIG. 2, the vehicle 100 is depicted in a plurality of exemplary environments. The vehicle 100 may operate in any one or more of the depicted environments in any combination. Other embodiments are possible but are not depicted in FIG. 2. Generally, the vehicle 100 may operate in environments which enable charging of the vehicle 100 and/or operation of the vehicle 100. More specifically, the vehicle 100 may receive a charge via one or more means comprising emergency charging vehicle system 270, aerial vehicle charging system 280, roadway system 250, robotic charging system 254 and overhead charging system 258. The vehicle 100 may interact and/or operate in an environment comprising one or more other roadway vehicles 260. The vehicle 100 may engage with elements within the vehicle 100 comprising vehicle driver 220, vehicle passengers 220 and vehicle database 210. In one embodiment, vehicle database 210 does not physically reside in the vehicle 100 but is instead accessed remotely, e.g. by wireless communication, and resides in another location such as a residence or business location. Vehicle 100 may operate autonomously and/or semi-autonomously in an autonomous environment 290 (here, depicted as a roadway environment presenting a roadway obstacle of which the vehicle 100 autonomously identifies and steers the vehicle 100 clear of the obstacle). Furthermore, the vehicle 100 may engage with a remote operator system 240, which may provide fleet management instructions or control.

FIG. 3 is a diagram of an embodiment of a data structure 300 for storing information about a vehicle 100 in an environment. The data structure may be stored in vehicle database 210. Generally, data structure 300 identifies operational data associated with charging types 310A. The data structures 300 may be accessible by a vehicle controller. The data contained in data structure 300 enables, among other things, for the vehicle 100 to receive a charge from a given charging type.

Exemplar data comprises charging type 310A comprising a manual charging station 310J, robotic charging station 310K such as robotic charging system 254, a roadway charging system 310L such as those of roadway system 250, an emergency charging system 310M such as that of emergency charging vehicle system 270, an emergency charging system 310N such as that of aerial vehicle charging system 280, and overhead charging type 310O such as that of overhead charging system 258.

Compatible vehicle charging panel types 310B comprise locations on vehicle 100 wherein charging may be received, such as vehicle roof 130, vehicle side 160 and vehicle lower or undercarriage 140. Compatible vehicle storage units 310C data indicates storage units types that may receive power from a given charging type 310A. Available automation level 310D data indicates the degree of automation available for a given charging type; a high level may indicate full automation, allowing the vehicle driver 220 and/or vehicle passengers 230 to not involve themselves in charging operations, while a low level of automation may require the driver 220 and/or occupant 230 to manipulate/position a vehicle charging device to engage with a particular charging type 310A to receive charging. Charging status 310E indicates whether a charging type 310A is available for charging (i.e. is "up") or is unavailable for charging (i.e. is "down"). Charge rate 310F provides a relative value for time to charge, while Cost 310G indicates the cost to vehicle 100 to receive a given charge. The Other data element 310H may provide additional data relevant to a given charging type 310A, such as a recommended separation distance between a vehicle charging plate and the charging source. The Shielding data element 310I indicates if electromagnetic shielding is recommended for a given charging type 310A and/or charging configuration. Further data fields 310P, 310Q are possible.

Figure 4A:
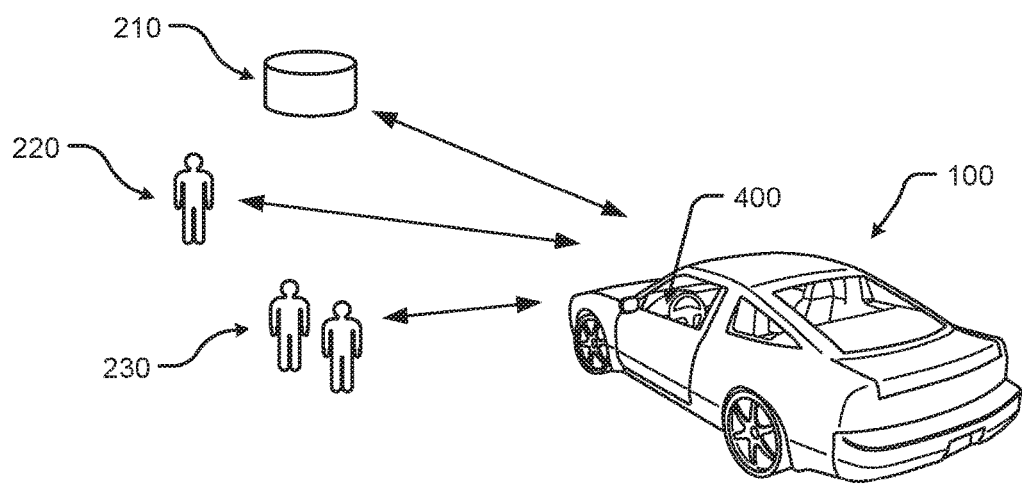
FIG. 4A shows a vehicle in a user environment in accordance with embodiments of the present disclosure.

FIG. 4A depicts the vehicle 100 in a user environment comprising vehicle database 210, vehicle driver 220 and vehicle passengers 230. Vehicle 100 further comprises vehicle instrument panel 400 to facilitate or enable interactions with one or more of vehicle database 210, vehicle driver 220 and vehicle passengers 230. In one embodiment, driver 210 interacts with instrument panel 400 to query database 210 so as to locate available charging options and to consider or weigh associated terms and conditions of the charging options. Once a charging option is selected, driver 210 may engage or operate a manual control device (e.g., a joystick) to position a vehicle charging receiver panel so as to receive a charge.

Figure 4B:
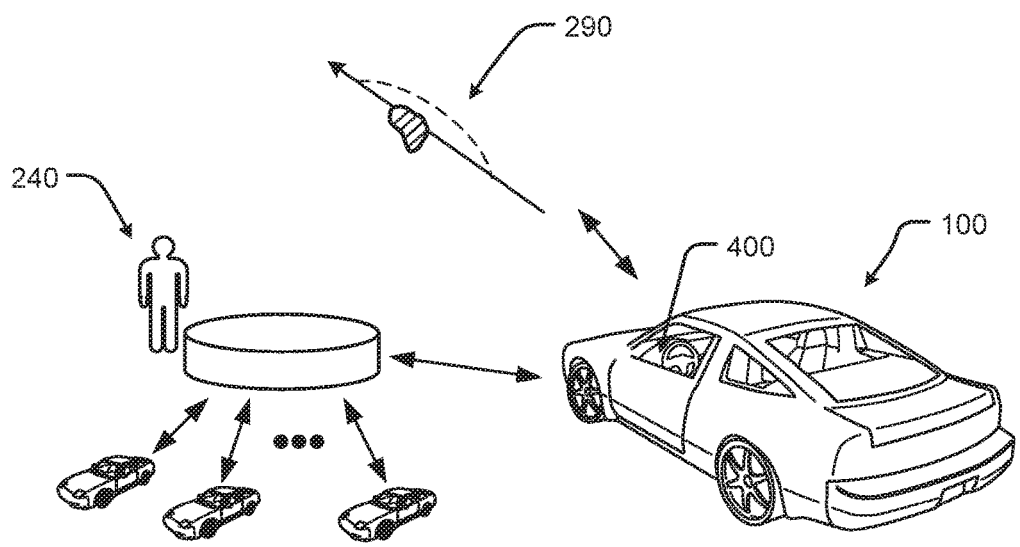
FIG. 4B shows a vehicle in a fleet management and automated operation environment in accordance with embodiments of the present disclosure.

FIG. 4B depicts the vehicle 100 in a user environment comprising a remote operator system 240 and an autonomous driving environment 290. In the remote operator system 240 environment, a fleet of electric vehicles 100 (or mixture of electric and non-electric vehicles) is managed and/or controlled remotely. For example, a human operator may dictate that only certain types of charging types are to be used, or only those charging types below a certain price point are to be used. The remote operator system 240 may comprise a database comprising operational data, such as fleet-wide operational data. In another example, the vehicle 100 may operate in an autonomous driving environment 290 wherein the vehicle 100 is operated with some degree of autonomy, ranging from complete autonomous operation to semi-automation wherein only specific driving parameters (e.g., speed control or obstacle avoidance) are maintained or controlled autonomously. In FIG. 4B, autonomous driving environment 290 depicts an oil slick roadway hazard that triggers that triggers the vehicle 100, while in an automated obstacle avoidance mode, to automatically steer around the roadway hazard.

Figure 4C:
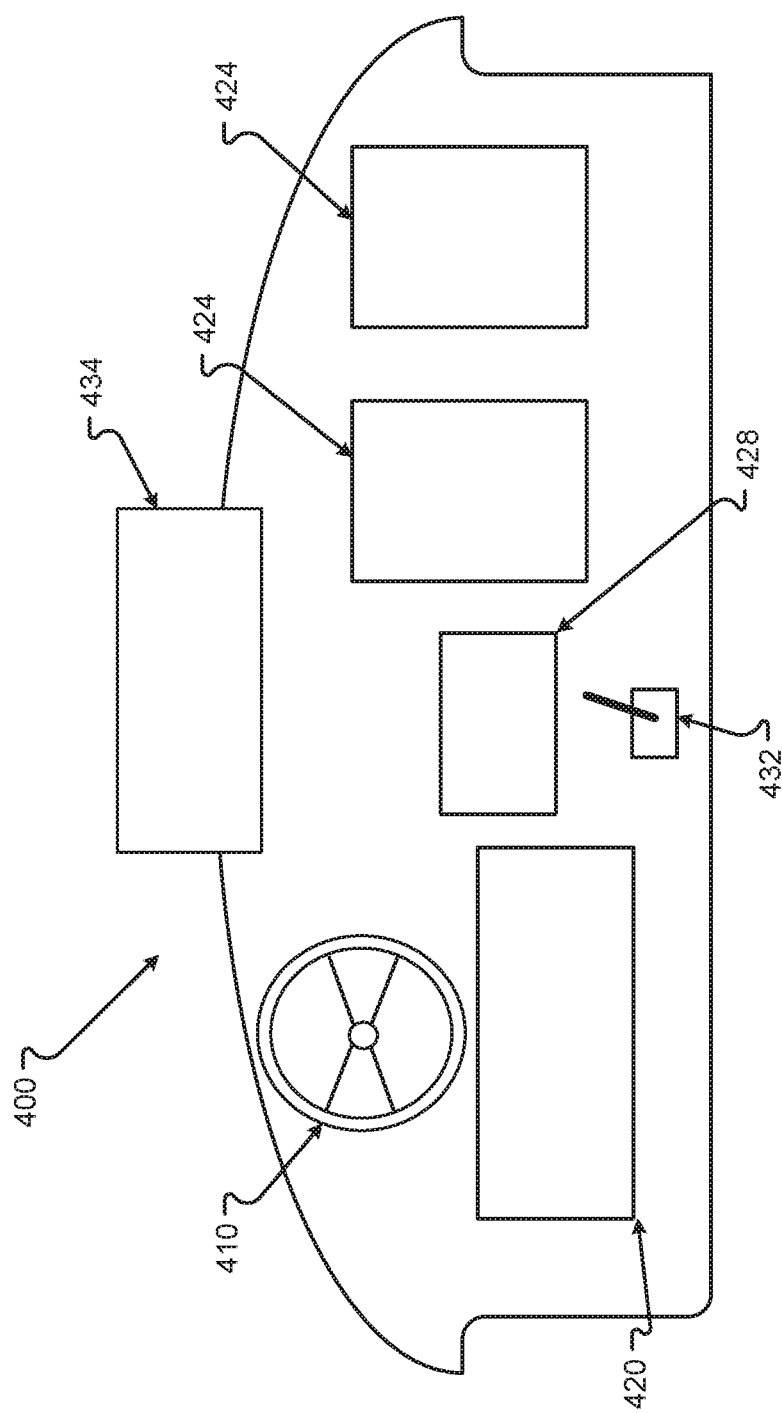
FIG. 4C shows an embodiment of the instrument panel of the vehicle according to one embodiment of the present disclosure.

FIG. 4C shows one embodiment of the vehicle instrument panel 400 of vehicle 100. Instrument panel 400 of vehicle 100 comprises steering wheel 410, vehicle operational display 420 (which would provide basic driving data such as speed), one or more auxiliary displays 424 (which may display, e.g., entertainment applications such as music or radio selections), heads-up display 434 (which may provide, e.g., guidance information such as route to destination, or obstacle warning information to warn of a potential collision, or some or all primary vehicle operational data such as speed), power management display 428 (which may provide, e.g., data as to electric power levels of vehicle 100), and charging manual controller 432 (which provides a physical input, e.g. a joystick, to manual maneuver, e.g., a vehicle charging plate to a desired separation distance). One or more of displays of instrument panel 400 may be touch-screen displays. One or more displays of instrument panel 400 may be mobile devices and/or applications residing on a mobile device such as a smart phone.

Figure 5:
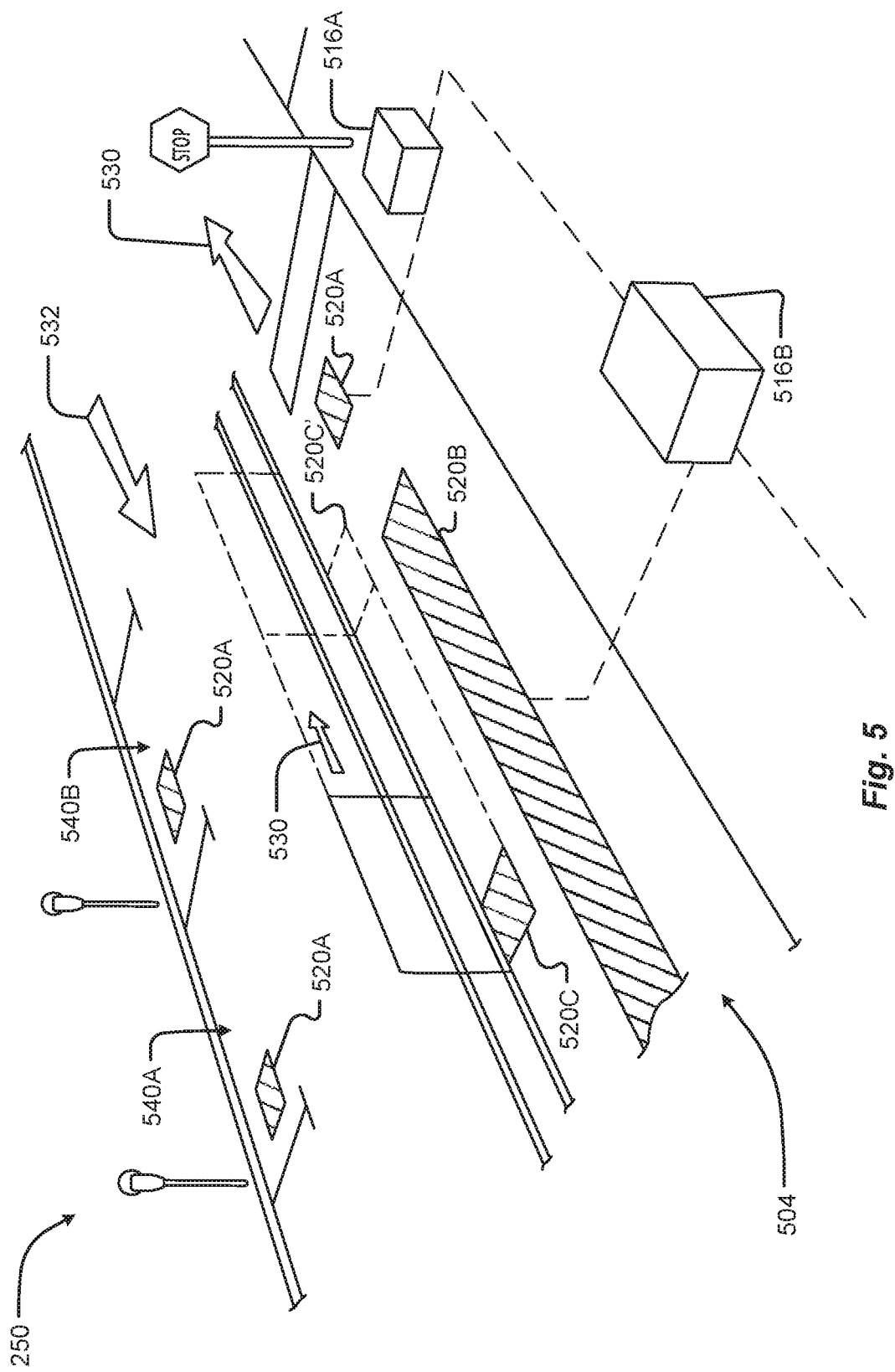
FIG. 5 shows charging areas associated with an environment in accordance with embodiments of the present disclosure.

FIG. 5 depicts a charging environment of a roadway charging system 250. The charging area may be in the roadway 504, on the roadway 504, or otherwise adjacent to the roadway 504, and/or combinations thereof. This static charging area 520B may allow a charge to be transferred even while the electrical vehicle 100 is moving. For example, the static charging area 520B may include a charging transmitter (e.g., conductor, etc.) that provides a transfer of energy when in a suitable range of a receiving unit (e.g., an inductor pick up, etc.). In this example, the receiving unit may be a part of the charging panel associated with the electrical vehicle 100.

The static charging areas 520A, 520B may be positioned a static area such as a designated spot, pad, parking space 540A, 540B, traffic controlled space (e.g., an area adjacent to a stop sign, traffic light, gate, etc.), portion of a building, portion of a structure, etc., and/or combinations thereof. Some static charging areas may require that the electric vehicle 100 is stationary before a charge, or electrical energy transfer, is initiated. The charging of vehicle 100 may occur by any of several means comprising a plug or other protruding feature. The power source 516A, 516B may include a receptacle or other receiving feature, and/or vice versa.

The charging area may be a moving charging area 520C. Moving charging areas 520C may include charging areas associated with one or more portions of a vehicle, a robotic charging device, a tracked charging device, a rail charging device, etc., and/or combinations thereof. In a moving charging area 520C, the electrical vehicle 100 may be configured to receive a charge, via a charging panel, while the vehicle 100 is moving and/or while the vehicle 100 is stationary. In some embodiments, the electrical vehicle 100 may synchronize to move at the same speed, acceleration, and/or path as the moving charging area 520C. In one embodiment, the moving charging area 520C may synchronize to move at the same speed, acceleration, and/or path as the electrical vehicle 100. In any event, the synchronization may be based on an exchange of information communicated across a communications channel between the electric vehicle 100 and the charging area 520C. Additionally or alternatively, the synchronization may be based on information associated with a movement of the electric vehicle 100 and/or the moving charging area 520C. In some embodiments, the moving charging area 520C may be configured to move along a direction or path 532 from an origin position to a destination position 520C'.

In some embodiments, a transformer may be included to convert a power setting associated with a main power supply to a power supply used by the charging areas 520A-C. For example, the transformer may increase or decrease a voltage associated with power supplied via one or more power transmission lines.

Figure 6:
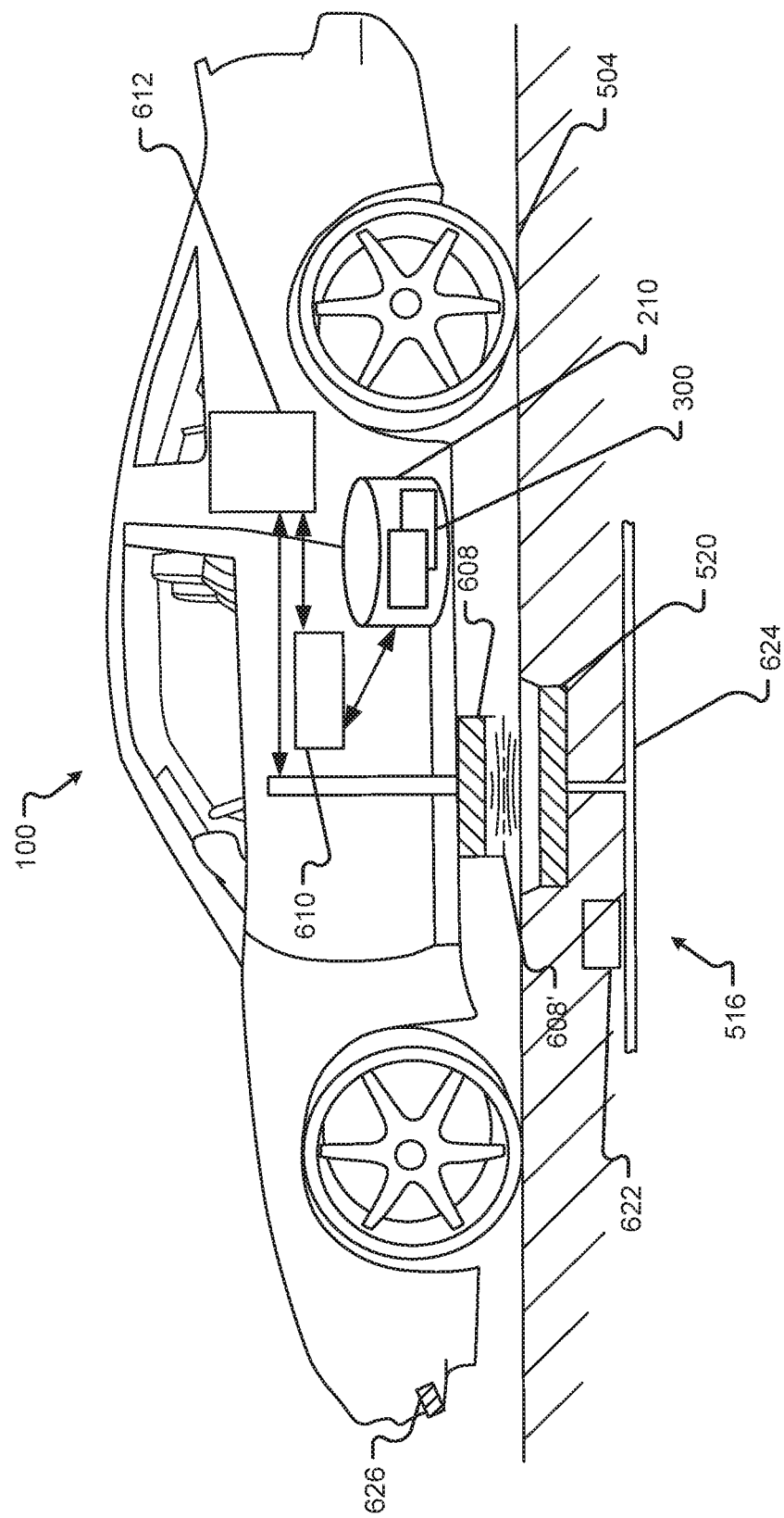
FIG. 6 shows a vehicle in a roadway charging environment in accordance with embodiments of the present disclosure.

Referring to FIG. 6, a vehicle 100 is shown in a charging environment in accordance with embodiments of the present disclosure. The system 10 comprises a vehicle 100, an electrical storage unit 612, an external power source 516 able to provide a charge to the vehicle 100, a charging panel 608 mounted on the vehicle 100 and in electrical communication with the electrical storage unit 612, and a vehicle charging panel controller 610. The charging panel controller 610 may determine if the electrical storage unit requires charging and if conditions allow for deployment of a charging panel. The vehicle charging panel 608 may operate in at least a retracted state and a deployed state (608 and 608' as shown is FIG. 6), and is movable by way of an armature.

The charging panel controller 610 may receive signals from vehicle sensors 626 to determine, for example, if a hazard is present in the path of the vehicle 100 such that deployment of the vehicle charging panel 608 is inadvisable.

The charging panel controller 610 may also query vehicle database 210 comprising data structures 300 to establish other required conditions for deployment. For example, the database may provide that a particular roadway does not provide a charging service or the charging service is inactive, wherein the charging panel 108 would not be deployed.

The power source 516 may include at least one electrical transmission line 624 and at least one power transmitter or charging area 520. During a charge, the charging panel 608 may serve to transfer energy from the power source 516 to at least one energy storage unit 612 (e.g., battery, capacitor, power cell, etc.) of the electric vehicle 100.

Figure 7:
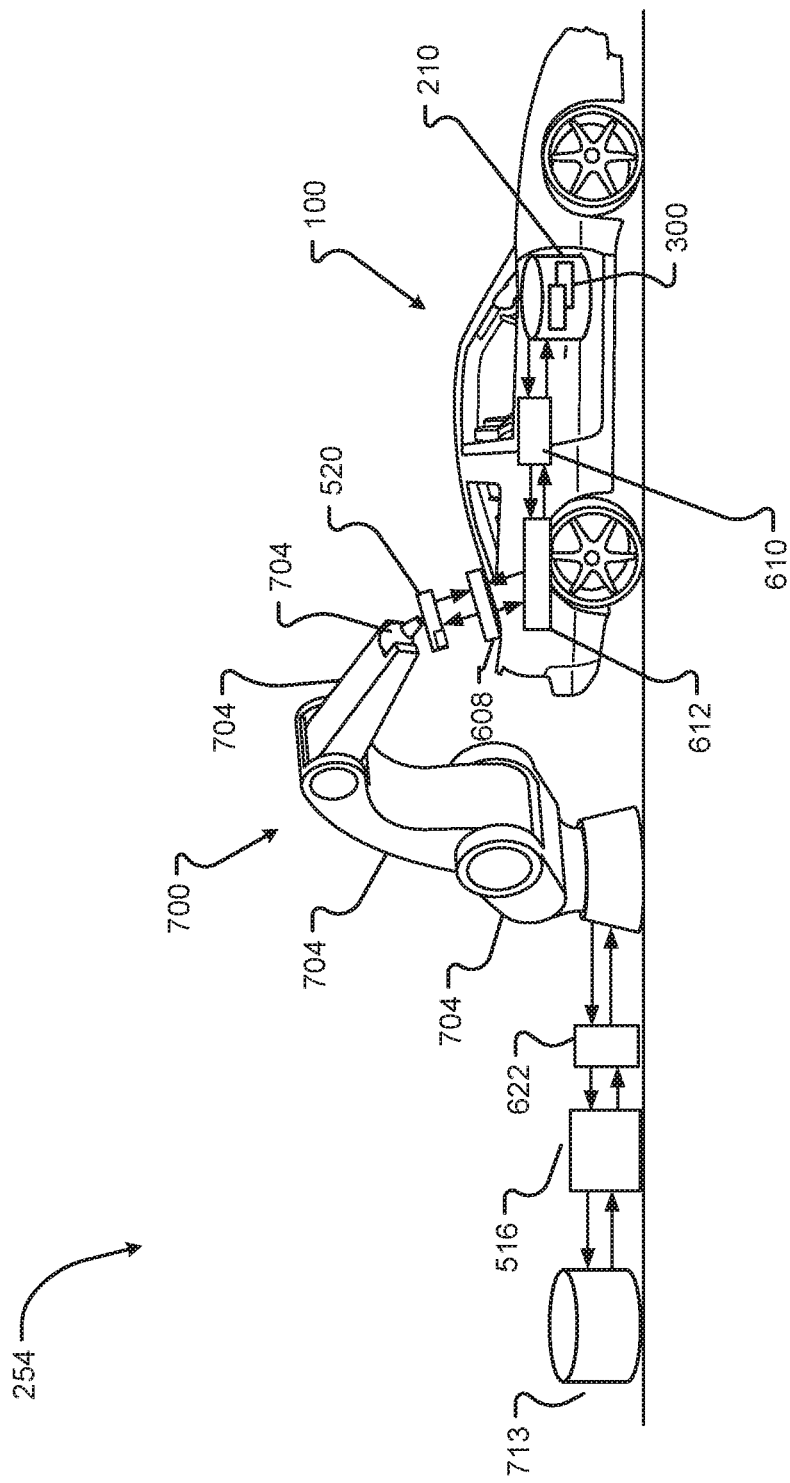
FIG. 7 shows a vehicle in a robotic charging station environment in accordance with another embodiment of the present disclosure.

FIG. 7 shows a vehicle 100 in a charging station environment 254 in accordance with another embodiment of the present disclosure. Generally, in this embodiment of the invention, charging occurs from a robotic unit 700.

Robotic charging unit 700 comprises one or more robotic unit arms 704, at least one robotic unit arm 704 interconnected with charging plate 520. The one or more robotic unit arms 704 manoeuver charging plate 520 relative to charging panel 608 of vehicle 100. Charging plate 520 is positioned to a desired or selectable separation distance, as assisted by a separation distance sensor disposed on charging plate 520. Charging plate 520 may remain at a finite separation distance from charging panel 608, or may directly contact charging panel (i.e. such that separation distance is zero). Charging may be by induction. In alternative embodiments, separation distance sensor is alternatively or additionally disposed on robotic arm 704. Vehicle 100 receives charging via charging panel 608 which in turn charges energy storage unit 612. Charging panel controller 610 is in communication with energy storage unit 612, charging panel 608, vehicle database 300, charge provider controller 622, and/or any one of elements of instrument panel 400.

Robotic unit further comprises, is in communication with and/or is interconnected with charge provider controller 622, power source 516 and a robotic unit database. Power source 516 supplies power, such as electrical power, to charge plate 520 to enable charging of vehicle 100 via charging panel 608. Controller 622 manoeuvers or operates robotic unit 704, either directly and/or completely or with assistance from a remote user, such as a driver or passenger in vehicle 100 by way of, in one embodiment, charging manual controller 432.

Figure 8:
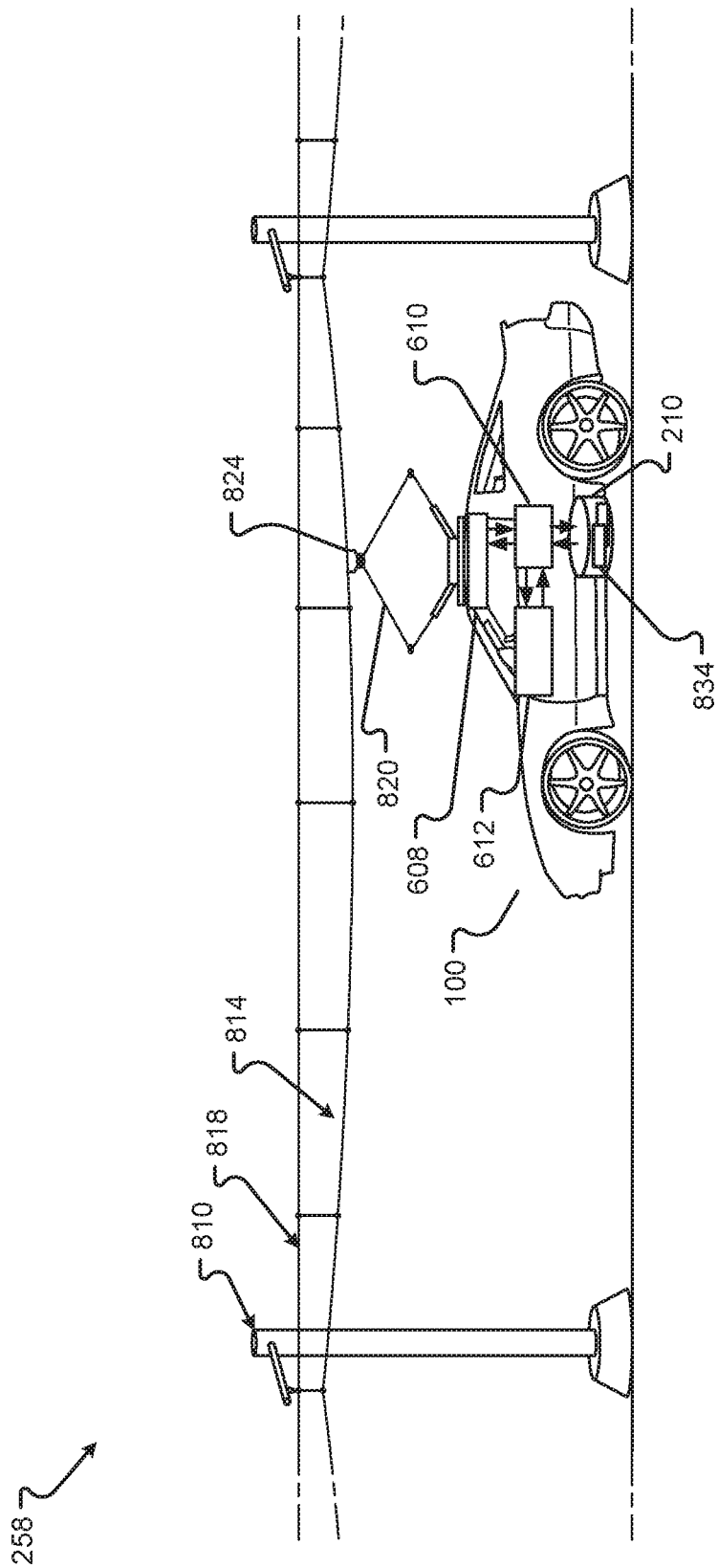
FIG. 8 shows a vehicle in an overhead charging environment in accordance with another embodiment of the present disclosure.

FIG. 8 shows a vehicle 100 in an overhead charging environment in accordance with another embodiment of the present disclosure. Generally, in this embodiment of the invention, charging occurs from an overhead towered charging system 258, similar to existing commuter rail systems. Such an overhead towered system 258 may be easier to build and repair compared to in-roadway systems. Generally, the invention includes a specially-designed overhead roadway charging system comprising an overhead charging cable or first wire 814 that is configured to engage an overhead contact 824 which provides charge to charging panel 608 which provides charge to vehicle energy storage unit 612. The overhead towered charging system 258 may further comprise second wire 818 to provide stability and structural strength to the roadway charging system 800. The first wire 814 and second wire 818 are strung between towers 810.

The overhead charging cable or first wire 814 is analogous to a contact wire used to provide charging to electric trains or other vehicles. An external source provides or supplies electrical power to the first wire 814. The charge provider comprises an energy source i.e. a provider battery and a provider charge circuit or controller in communication with the provider battery. The overhead charging cable or first wire 814 engages the overhead contact 824 which is in electrical communication with charge receiver panel 108. The overhead contact 824 may comprise any known means to connect to overhead electrical power cables, such as a pantograph 820, a bow collector, a trolley pole or any means known to those skilled in the art. Further disclosure regarding electrical power or energy transfer via overhead systems is found in US Pat. Publ. No. 2013/0105264 to Ruth entitled "Pantograph Assembly," the entire contents of which are incorporated by reference for all purposes. In one embodiment, the charging of vehicle 100 by overhead charging system 800 via overhead contact 824 is by any means know to those skilled in the art, to include those described in the above-referenced US Pat. Publ. No. 2013/0105264 to Ruth.

The overhead contact 824 presses against the underside of the lowest overhead wire of the overhead charging system, i.e. the overhead charging cable or first wire 814, aka the contact wire. The overhead contact 824 may be electrically conductive. Alternatively, or additionally, the overhead contact 824 may be adapted to receive electrical power from overhead charging cable or first wire 814 by inductive charging.

In one embodiment, the receipt and/or control of the energy provided via overhead contact 824 (as connected to the energy storage unit 612) is provided by receiver charge circuit or charging panel controller 110.

Overhead contact 824 and/or charging panel 608 may be located anywhere on vehicle 100, to include, for example, the roof, side panel, trunk, hood, front or rear bumper of the charge receiver 100 vehicle, as long as the overhead contact 824 may engage the overhead charging cable or first wire 814. Charging panel 108 may be stationary (e.g. disposed on the roof of vehicle 100) or may be moveable, e.g. moveable with the pantograph 820. Pantograph 820 may be positioned in at least two states comprising retracted and extended. In the extended state pantograph 820 engages first wire 814 by way of the overhead contact 824. In the retracted state, pantograph 820 may typically reside flush with the roof of vehicle 100 and extend only when required for charging. Control of the charging and/or positioning of the charging plate 608, pantograph 820 and/or overhead contact 824 may be manual, automatic or semi-automatic (such as via controller 610); said control may be performed through a GUI engaged by driver or occupant of receiving vehicle 100 and/or driver or occupant of charging vehicle.

Figure 9:
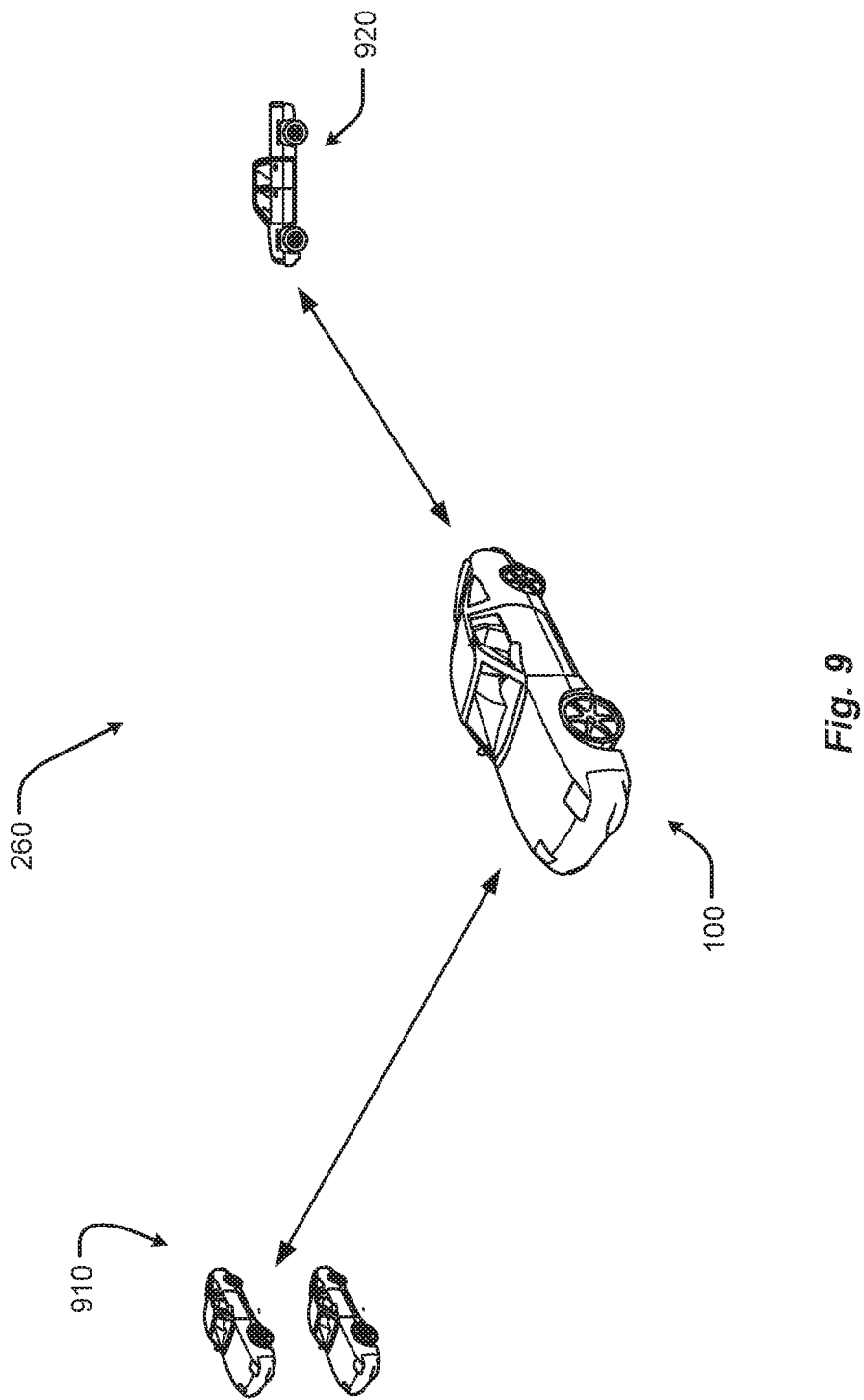
FIG. 9 shows a vehicle in a roadway environment comprising roadway vehicles in accordance with another embodiment of the present disclosure.

FIG. 9 shows a vehicle in a roadway environment comprising roadway vehicles 260 in accordance with another embodiment of the present disclosure. Roadway vehicles 260 comprise roadway passive vehicles 910 and roadway active vehicles 920. Roadway passive vehicles 910 comprise vehicles that are operating on the roadway of vehicle 100 but do no cooperatively or actively engage with vehicle 100. Stated another way, roadway passive vehicles 910 are simply other vehicles operating on the roadway with the vehicle 100 and must be, among other things, avoided (e.g., to include when vehicle 100 is operating in an autonomous or semi-autonomous manner). In contrast, roadway active vehicles 920 comprise vehicles that are operating on the roadway of vehicle 100 and have the capability to, or actually are, actively engaging with vehicle 100. For example, the emergency charging vehicle system 270 is a roadway active vehicle 920 in that it may cooperate or engage with vehicle 100 to provide charging. In some embodiments, vehicle 100 may exchange data with a roadway active vehicle 920 such as, for example, data regarding charging types available to the roadway active vehicle 920.

Figure 10:
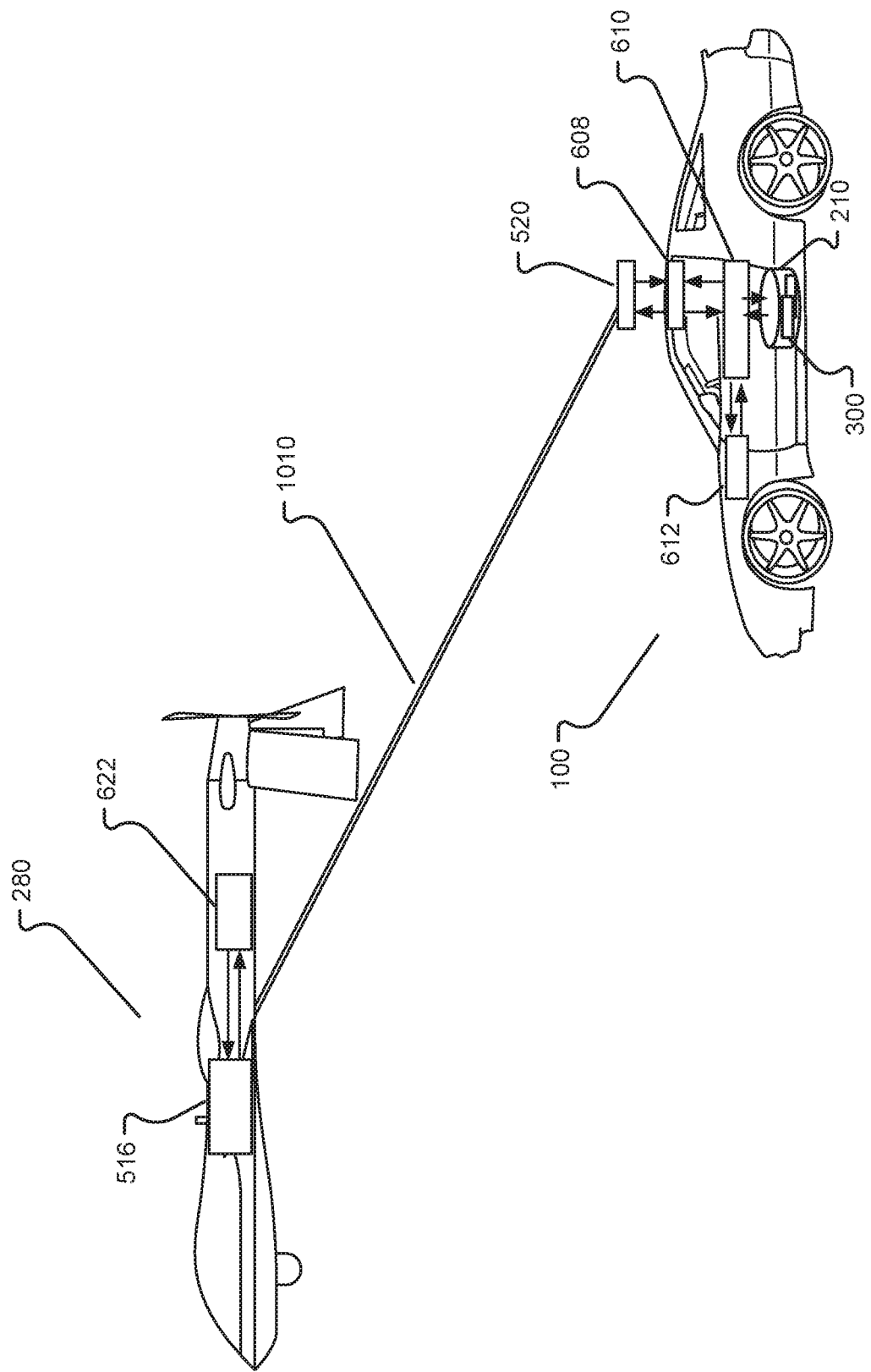
FIG. 10 shows a vehicle in an aerial vehicle charging environment in accordance with another embodiment of the present disclosure.

FIG. 10 shows a vehicle in an aerial vehicle charging environment in accordance with another embodiment of the present disclosure. Generally, this embodiment involves an aerial vehicle ("AV"), such as an Unmanned Aerial Vehicle (UAV), flying over or near a vehicle to provide a charge. The UAV may also land on the car to provide an emergency (or routine) charge. Such a charging scheme may be particularly suited for operations in remote areas, in high traffic situations, and/or when the car is moving. The AV may be a specially-designed UAV, aka RPV or drone, with a charging panel that can extend from the AV to provide a charge. The AV may include a battery pack and a charging circuit to deliver a charge to the vehicle. The AV may be a manned aerial vehicle, such as a piloted general aviation aircraft, such as a Cessna 172.

With reference to FIG. 10, an exemplar embodiment of a vehicle charging system 100 comprising a charge provider configured as an aerial vehicle 280, the aerial vehicle 280 comprising a power source 516 and charge provider controller 622. The AV may be semi-autonomous or fully autonomous. The AV may have a remote pilot/operator providing control inputs. The power source 516 is configured to provide a charge to a charging panel 608 of vehicle 100. The power source 516 is in communication with the charge provider controller 622. The aerial vehicle 280 provides a tether 1010 to deploy or extend charging plate 520 near to charging panel 608. The tether 1010 may comprise a chain, rope, rigid or semi-rigid tow bar or any means to position charging plate 520 near charging panel 608. For example, tether 1010 may be similar to a refueling probe used by airborne tanker aircraft when refueling another aircraft.

In one embodiment, the charging plate 520 is not in physical interconnection to AV 280, that is, there is no tether 1010. In this embodiment, the charging plate 520 is positioned and controlled by AV 280 by way of a controller on AV 280 or in communication with AV 280.

In one embodiment, the charging plate 520 position and/or characteristics (e.g. charging power level, flying separation distance, physical engagement on/off) are controlled by vehicle 100 and/or a user in or driver of vehicle 100.

Charge or power output of power source 516 is provided or transmitted to charger plate 620 by way of a charging cable or wire, which may be integral to tether 1010. In one embodiment, the charging cable is non-structural, that is, it provides zero or little structural support to the connection between AV 280 and charger plate 520.

Charging panel 608 of vehicle 100 receives power from charger plate 520. Charging panel 608 and charger plate 520 may be in direct physical contact (termed a "contact" charger configuration) or not in direct physical contact (termed a "flyer" charger configuration), but must be at or below a threshold (separation) distance to enable charging, such as by induction. Energy transfer or charging from the charger plate 520 to the charging panel 608 is inductive charging (i.e. use of an EM field to transfer energy between two objects). The charging panel 608 provides received power to energy storage unit 612 by way of charging panel controller 610. Charging panel controller 610 is in communication with vehicle database 210, vehicle database 210 comprising an AV charging data structure.

Charging panel 508 may be located anywhere on vehicle 100, to include, for example, the roof, side panel, trunk, hood, front or rear bumper and wheel hub of vehicle 100. Charging panel 608 is mounted on the roof of vehicle 100 in the embodiment of FIG. 10. In some embodiments, charging panel 608 may be deployable, i.e. may extend or deploy only when charging is needed. For example, charging panel 608 may typically reside flush with the roof of vehicle 100 and extend when required for charging. Similarly, charger plate 520 may, in one embodiment, not be connected to AV 280 by way of tether 1010 and may instead be mounted directly on the AV 280, to include, for example, the wing, empennage, undercarriage to include landing gear, and may be deployable or extendable when required. Tether 1010 may be configured to maneuver charging plate 520 to any position on vehicle 100 so as to enable charging. In one embodiment, the AV 280 may land on the vehicle 100 so as to enable charging through direct contact (i.e. the aforementioned contact charging configuration) between the charging plate 520 and the charging panel 608 of vehicle 100. Charging may occur while both AV 280 and vehicle 100 are moving, while both vehicle 100 and AV 280 are not moving (i.e., vehicle 100 is parked and AV 280 lands on top of vehicle 100), or while vehicle 100 is parked and AV 280 is hovering or circling above. Control of the charging and/or positioning of the charging plate 520 may be manual, automatic or semi-automatic; said control may be performed through a GUI engaged by driver or occupant of receiving vehicle 100 and/or driver or occupant of charging AV 280.

Figure 11:
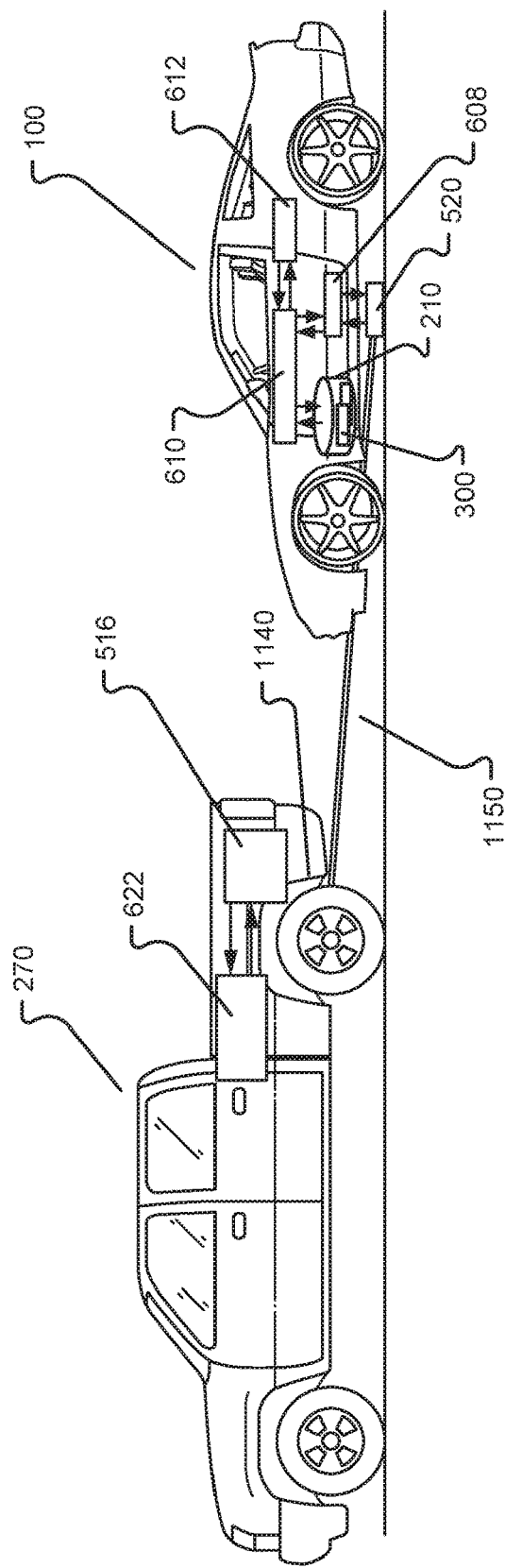
FIG. 11 shows a vehicle in an emergency charging environment in accordance with embodiments of the present disclosure.

FIG. 11 is an exemplar embodiment of a vehicle emergency charging system comprising an emergency charging vehicle 270 and charge receiver vehicle 100 is disclosed. The emergency charging vehicle 270 is a road vehicle, such as a pick-up truck, as shown in FIG. 11. The emergency charging vehicle 270 is configured to provide a charge to a charge receiver vehicle 100, such as an automobile. The emergency charging vehicle 270 comprises an energy source i.e. a charging power source 516 and a charge provider controller 622 in communication with the charging power source 516. The emergency charging vehicle 270 provides a towed and/or articulated charger plate 520, as connected to the emergency charging vehicle 270 by connector 1150. The connector 1150 may comprise a chain, rope, rigid or semi-rigid tow bar or any means to position charger plate 520 near the charging panel 608 of vehicle 100. Charge or power output of charging power source 516 is provided or transmitted to charger plate 520 by way of charging cable or wire 1140. In one embodiment, the charging cable 1140 is non-structural, that is, it provides little or no structural support to the connection between emergency charging vehicle 270 and charging panel 608. Charging panel 608 (of vehicle 100) receives power from charger plate 520. Charger plate 520 and charging panel 608 may be in direct physical contact or not in direct physical contact, but must be at or below a threshold separation distance to enable charging, such as by induction. Charger plate 520 may comprise wheels or rollers so as to roll along roadway surface. Charger plate 520 may also not contact the ground surface and instead be suspended above the ground; such a configuration may be termed a "flying" configuration. In the flying configuration, charger plate may form an aerodynamic surface to, for example, facilitate stability and control of the positioning of the charging plate 520. Energy transfer or charging from the charger plate 520 to the charge receiver panel 608 is through inductive charging (i.e. use of an EM field to transfer energy between two objects). The charging panel 608 provides received power to energy storage unit 612 directly or by way of charging panel controller 610. In one embodiment, the receipt and/or control of the energy provided via the charging panel 608 is provided by charging panel controller 610.

Charging panel controller 610 may be located anywhere on charge receiver vehicle 100, to include, for example, the roof, side panel, trunk, hood, front or rear bumper and wheel hub of charge receiver 100 vehicle. In some embodiments, charging panel 608 may be deployable, i.e. may extend or deploy only when charging is needed. For example, charging panel 608 may typically stow flush with the lower plane of vehicle 100 and extend when required for charging. Similarly, charger plate 520 may, in one embodiment, not be connected to the lower rear of the emergency charging vehicle 270 by way of connector 1150 and may instead be mounted on the emergency charging vehicle 270, to include, for example, the roof, side panel, trunk, hood, front or rear bumper and wheel hub of emergency charging vehicle 270. Connector 1150 may be configured to maneuver connector plate 520 to any position on emergency charging vehicle 270 so as to enable charging. Control of the charging and/or positioning of the charging plate may be manual, automatic or semi-automatic; said control may be performed through a GUI engaged by driver or occupant of receiving vehicle and/or driver or occupant of charging vehicle.

Figure 12:
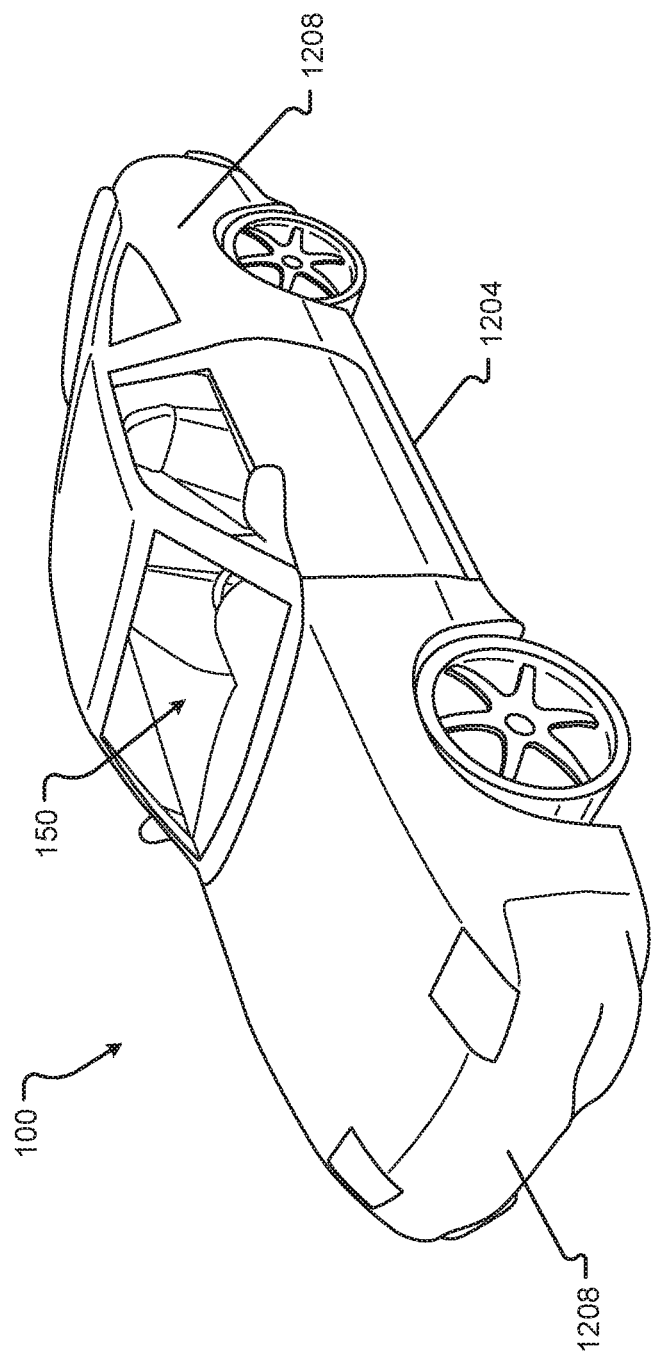
FIG. 12 is a perspective view of a vehicle in accordance with embodiments of the present disclosure.

FIG. 12 shows a perspective view of a vehicle 100 in accordance with embodiments of the present disclosure. Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like. In any event, the vehicle 100 may include a frame 1204 and one or more body panels 1208 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components.

Figure 13:
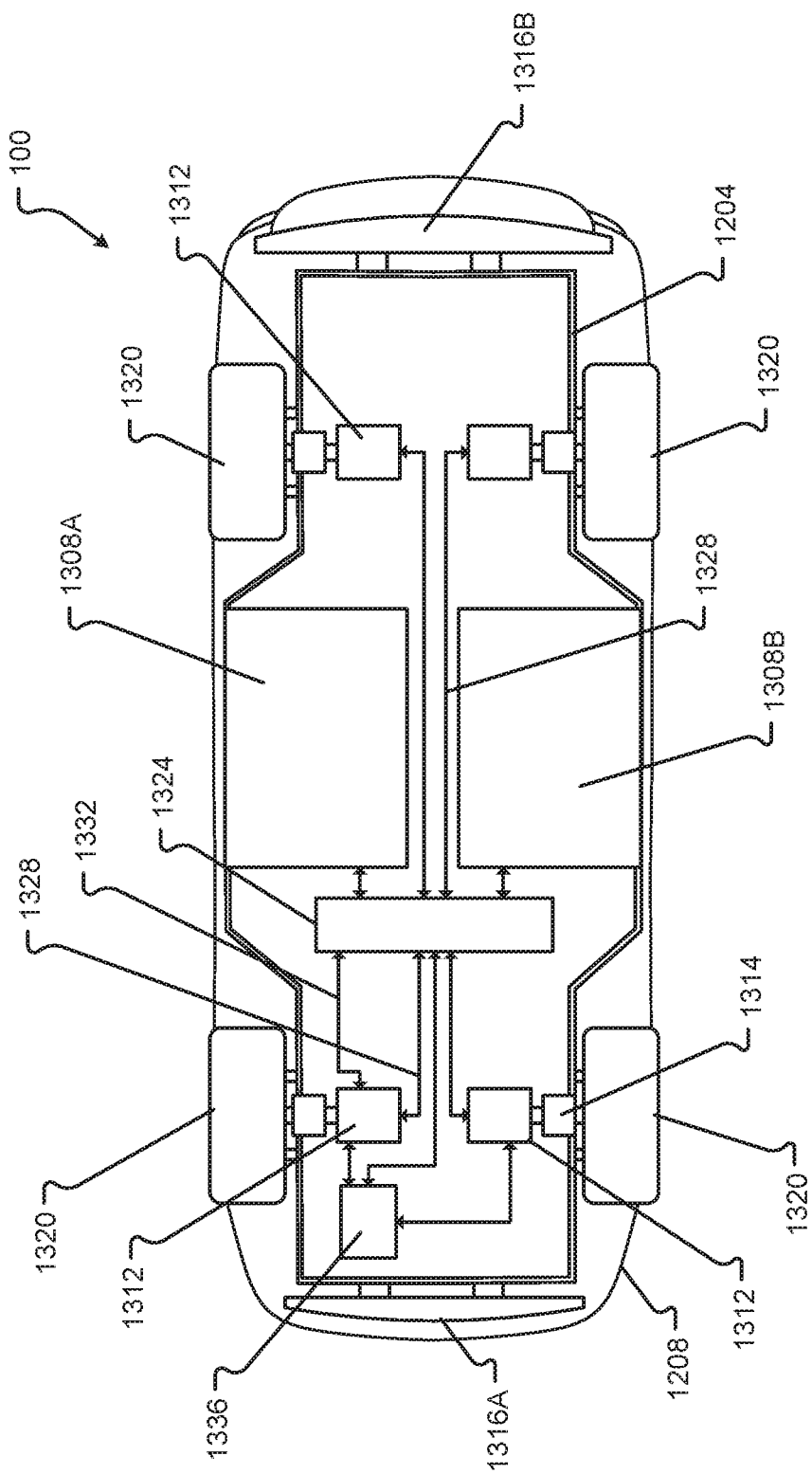
FIG. 13 is a plan view of a vehicle in accordance with at least some embodiments of the present disclosure.

Referring now to FIG. 13, a plan view of a vehicle 100 will be described in accordance with embodiments of the present disclosure. As provided above, the vehicle 100 may comprise a number of electrical and/or mechanical systems, subsystems, etc. The mechanical systems of the vehicle 100 can include structural, power, safety, and communications subsystems, to name a few. While each subsystem may be described separately, it should be appreciated that the components of a particular subsystem may be shared between one or more other subsystems of the vehicle 100.

The structural subsystem includes the frame 1204 of the vehicle 100. The frame 1204 may comprise a separate frame and body construction (i.e., body-on-frame construction), a unitary frame and body construction (i.e., a unibody construction), or any other construction defining the structure of the vehicle 100. The frame 1204 may be made from one or more materials including, but in no way limited to steel, titanium, aluminum, carbon fiber, plastic, polymers, etc., and/or combinations thereof. In some embodiments, the frame 1204 may be formed, welded, fused, fastened, pressed, etc., combinations thereof, or otherwise shaped to define a physical structure and strength of the vehicle 100. In any event, the frame 1204 may comprise one or more surfaces, connections, protrusions, cavities, mounting points, tabs, slots, or other features that are configured to receive other components that make up the vehicle 100. For example, the body panels, powertrain subsystem, controls systems, interior components, communications subsystem, and safety subsystem may interconnect with, or attach to, the frame 1204 of the vehicle 100.

The frame 1204 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources 1308A, 1308B, motors 1312, engines, safety equipment, controllers, user interfaces, interiors exterior components, body panels 1208, bumpers 1316, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ poka-yoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single minute exchange principle. In some embodiments, the frame 1204 may include slides, receptacles, cavities, protrusions, and/or a number of other features that allow for quick exchange of system components. In one embodiment, the frame 1204 may include tray or ledge features, mechanical interconnection features, locking mechanisms, retaining mechanisms, etc., and/or combinations thereof. In some embodiments, it may be beneficial to quickly remove a used power source 1308A, 1308B (e.g., battery unit, capacitor unit, etc.) from the vehicle 100 and replace the used power source 1308A, 1308B with a charged power source. Continuing this example, the power source 1308A, 1308B may include selectively interchangeable features that interconnect with the frame 1204 or other portion of the vehicle 100. For instance, in a power source 1308A, 1308B replacement, the quick release features may be configured to release the power source 1308A, 1308B from an engaged position and slide or move away from the frame 1204 of a vehicle 100. Once removed, the power source 1308A, 1308B may be replaced (e.g., with a new power source, a charged power source, etc.) by engaging the replacement power source into a system receiving position adjacent to the vehicle 100. In some embodiments, the vehicle 100 may include one or more actuators configured to position, lift, slide, or otherwise engage the replacement power source with the vehicle 100. In one embodiment, the replacement power source may be inserted into the vehicle 100 or vehicle frame 1204 with mechanisms and/or machines that are external or separate from the vehicle 100.

In some embodiments, the frame 1204 may include one or more features configured to selectively interconnect with other vehicles and/or portions of vehicles. These selectively interconnecting features can allow for one or more vehicles to selectively couple together and decouple for a variety of purposes. For example, it is an aspect of the present disclosure that a number of vehicles may be selectively coupled together to share energy, increase power output, provide security, decrease power consumption, provide towing services, and/or provide a range of other benefits. Continuing this example, the vehicles may be coupled together based on travel route, destination, preferences, settings, sensor information, and/or some other data. The coupling may be initiated by at least one controller of the vehicle and/or traffic control system upon determining that a coupling is beneficial to one or more vehicles in a group of vehicles or a traffic system. As can be appreciated, the power consumption for a group of vehicles traveling in a same direction may be reduced or decreased by removing any aerodynamic separation between vehicles. In this case, the vehicles may be coupled together to subject only the foremost vehicle in the coupling to air and/or wind resistance during travel. In one embodiment, the power output by the group of vehicles may be proportionally or selectively controlled to provide a specific output from each of the one or more of the vehicles in the group.

The interconnecting, or coupling, features may be configured as electromagnetic mechanisms, mechanical couplings, electromechanical coupling mechanisms, etc., and/or combinations thereof. The features may be selectively deployed from a portion of the frame 1204 and/or body of the vehicle 100. In some cases, the features may be built into the frame 1204 and/or body of the vehicle 100. In any event, the features may deploy from an unexposed position to an exposed position or may be configured to selectively engage/disengage without requiring an exposure or deployment of the mechanism from the frame 1204 and/or body. In some embodiments, the interconnecting features may be configured to interconnect one or more of power, communications, electrical energy, fuel, and/or the like. One or more of the power, mechanical, and/or communications connections between vehicles may be part of a single interconnection mechanism. In some embodiments, the interconnection mechanism may include multiple connection mechanisms. In any event, the single interconnection mechanism or the interconnection mechanism may employ the poka-yoke features as described above.

The power system of the vehicle 100 may include the powertrain, power distribution system, accessory power system, and/or any other components that store power, provide power, convert power, and/or distribute power to one or more portions of the vehicle 100. The powertrain may include the one or more electric motors 1312 of the vehicle 100. The electric motors 1312 are configured to convert electrical energy provided by a power source into mechanical energy. This mechanical energy may be in the form of a rotational or other output force that is configured to propel or otherwise provide a motive force for the vehicle 100.

In some embodiments, the vehicle 100 may include one or more drive wheels 1320 that are driven by the one or more electric motors 1312 and motor controllers 1314. In some cases, the vehicle 100 may include an electric motor 1312 configured to provide a driving force for each drive wheel 1320. In other cases, a single electric motor 1312 may be configured to share an output force between two or more drive wheels 1320 via one or more power transmission components. It is an aspect of the present disclosure that the powertrain include one or more power transmission components, motor controllers 1314, and/or power controllers that can provide a controlled output of power to one or more of the drive wheels 1320 of the vehicle 100. The power transmission components, power controllers, or motor controllers 1314 may be controlled by at least one other vehicle controller described herein.

As provided above, the powertrain of the vehicle 100 may include one or more power sources 1308A, 1308B. These one or more power sources 1308A, 1308B may be configured to provide drive power, system and/or subsystem power, accessory power, etc. While described herein as a single power source 1308 for sake of clarity, embodiments of the present disclosure are not so limited. For example, it should be appreciated that independent, different, or separate power sources 1308A, 1308B may provide power to various systems of the vehicle 100. For instance, a drive power source may be configured to provide the power for the one or more electric motors 1312 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 1308A, 1308B in this manner may provide a number of benefits over conventional vehicle systems. For example, separating the power sources 1308A, 1308B allow one power source 1308 to be removed and/or replaced independently without requiring that power be removed from all systems and/or subsystems of the vehicle 100 during a power source 1308 removal/replacement. For instance, one or more of the accessories, communications, safety equipment, and/or backup power systems, etc., may be maintained even when a particular power source 1308A, 1308B is depleted, removed, or becomes otherwise inoperable.

In some embodiments, the drive power source may be separated into two or more cells, units, sources, and/or systems. By way of example, a vehicle 100 may include a first drive power source 1308A and a second drive power source 1308B. The first drive power source 1308A may be operated independently from or in conjunction with the second drive power source 1308B and vice versa. Continuing this example, the first drive power source 1308A may be removed from a vehicle while a second drive power source 1308B can be maintained in the vehicle 100 to provide drive power. This approach allows the vehicle 100 to significantly reduce weight (e.g., of the first drive power source 1308A, etc.) and improve power consumption, even if only for a temporary period of time. In some cases, a vehicle 100 running low on power may automatically determine that pulling over to a rest area, emergency lane, and removing, or "dropping off," at least one power source 1308A, 1308B may reduce enough weight of the vehicle 100 to allow the vehicle 100 to navigate to the closest power source replacement and/or charging area. In some embodiments, the removed, or "dropped off," power source 1308A may be collected by a collection service, vehicle mechanic, tow truck, or even another vehicle or individual.

The power source 1308 may include a GPS or other geographical location system that may be configured to emit a location signal to one or more receiving entities. For instance, the signal may be broadcast or targeted to a specific receiving party. Additionally or alternatively, the power source 1308 may include a unique identifier that may be used to associate the power source 1308 with a particular vehicle 100 or vehicle user. This unique identifier may allow an efficient recovery of the power source 1308 dropped off. In some embodiments, the unique identifier may provide information for the particular vehicle 100 or vehicle user to be billed or charged with a cost of recovery for the power source 1308.

The power source 1308 may include a charge controller 1324 that may be configured to determine charge levels of the power source 1308, control a rate at which charge is drawn from the power source 1308, control a rate at which charge is added to the power source 1308, and/or monitor a health of the power source 1308 (e.g., one or more cells, portions, etc.). In some embodiments, the charge controller 1324 or the power source 1308 may include a communication interface. The communication interface can allow the charge controller 1324 to report a state of the power source 1308 to one or more other controllers of the vehicle 100 or even communicate with a communication device separate and/or apart from the vehicle 100. Additionally or alternatively, the communication interface may be configured to receive instructions (e.g., control instructions, charge instructions, communication instructions, etc.) from one or more other controllers of the vehicle 100 or a communication device that is separate and/or apart from the vehicle 100.

The powertrain includes one or more power distribution systems configured to transmit power from the power source 1308 to one or more electric motors 1312 in the vehicle 100. The power distribution system may include electrical interconnections 1328 in the form of cables, wires, traces, wireless power transmission systems, etc., and/or combinations thereof. It is an aspect of the present disclosure that the vehicle 100 include one or more redundant electrical interconnections 1332 of the power distribution system. The redundant electrical interconnections 1332 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection 1332 is being used and/or damage has occurred to a particular area of the vehicle electrical system. In any event, the one or more redundant electrical interconnections 1332 may be configured along completely different routes than the electrical interconnections 1328 and/or include different modes of failure than the electrical interconnections 1328 to, among other things, prevent a total interruption power distribution in the event of a failure.

In some embodiments, the power distribution system may include an energy recovery system 1336. This energy recovery system 1336, or kinetic energy recovery system, may be configured to recover energy produced by the movement of a vehicle 100. The recovered energy may be stored as electrical and/or mechanical energy. For instance, as a vehicle 100 travels or moves, a certain amount of energy is required to accelerate, maintain a speed, stop, or slow the vehicle 100. In any event, a moving vehicle has a certain amount of kinetic energy. When brakes are applied in a typical moving vehicle, most of the kinetic energy of the vehicle is lost as the generation of heat in the braking mechanism. In an energy recovery system 1336, when a vehicle 100 brakes, at least a portion of the kinetic energy is converted into electrical and/or mechanical energy for storage. Mechanical energy may be stored as mechanical movement (e.g., in a flywheel, etc.) and electrical energy may be stored in batteries, capacitors, and/or some other electrical storage system. In some embodiments, electrical energy recovered may be stored in the power source 1308. For example, the recovered electrical energy may be used to charge the power source 1308 of the vehicle 100.

The vehicle 100 may include one or more safety systems. Vehicle safety systems can include a variety of mechanical and/or electrical components including, but in no way limited to, low impact or energy-absorbing bumpers 1316A, 1316B, crumple zones, reinforced body panels, reinforced frame components, impact bars, power source containment zones, safety glass, seatbelts, supplemental restraint systems, air bags, escape hatches, removable access panels, impact sensors, accelerometers, vision systems, radar systems, etc., and/or the like. In some embodiments, the one or more of the safety components may include a safety sensor or group of safety sensors associated with the one or more of the safety components. For example, a crumple zone may include one or more strain gages, impact sensors, pressure transducers, etc. These sensors may be configured to detect or determine whether a portion of the vehicle 100 has been subjected to a particular force, deformation, or other impact. Once detected, the information collected by the sensors may be transmitted or sent to one or more of a controller of the vehicle 100 (e.g., a safety controller, vehicle controller, etc.) or a communication device associated with the vehicle 100 (e.g., across a communication network, etc.).

Figure 14:
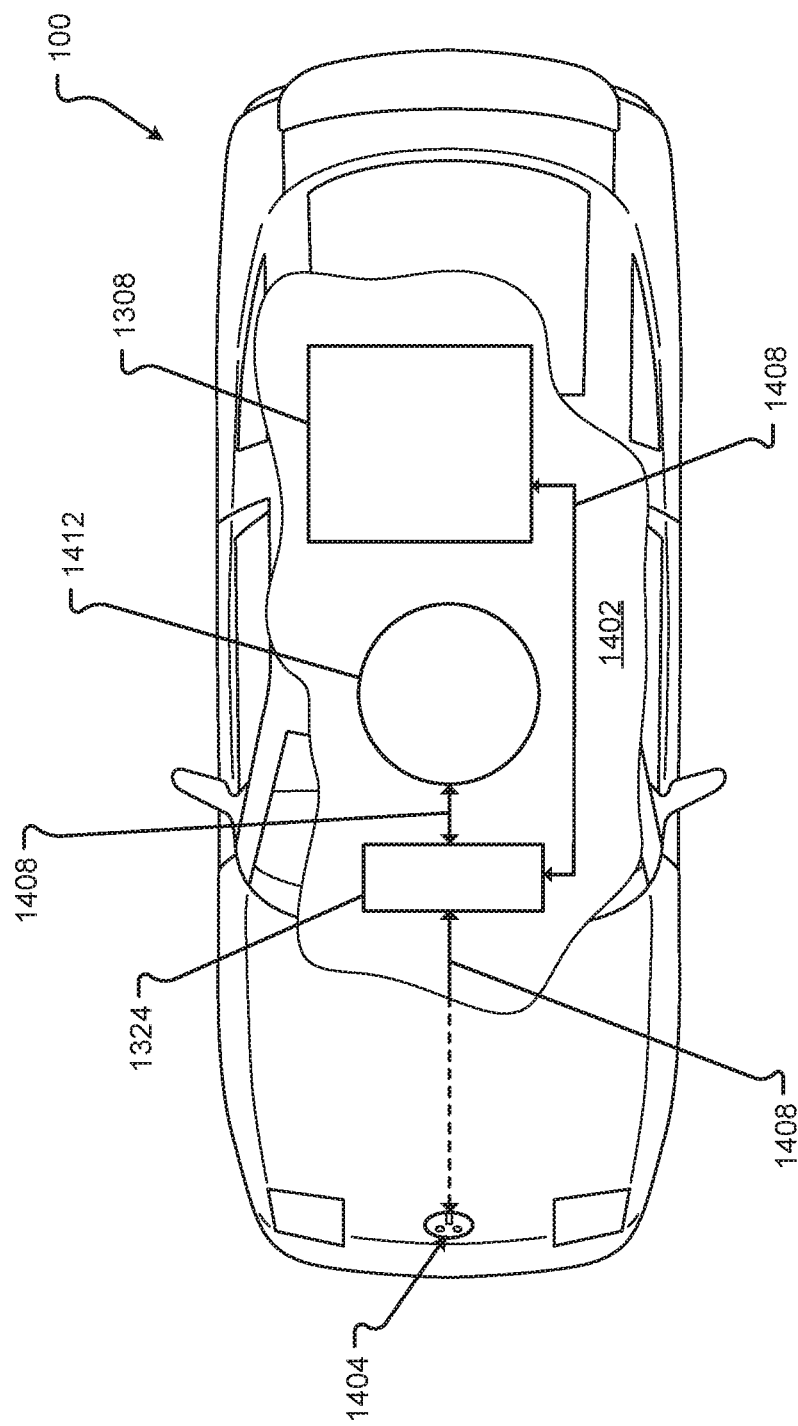
FIG. 14 is a plan view of a vehicle in accordance with embodiments of the present disclosure.

FIG. 14 shows a plan view of the vehicle 100 in accordance with embodiments of the present disclosure. In particular, FIG. 14 shows a broken section 1402 of a charging system for the vehicle 100. The charging system may include a plug or receptacle 1404 configured to receive power from an external power source (e.g., a source of power that is external to and/or separate from the vehicle 100, etc.). An example of an external power source may include the standard industrial, commercial, or residential power that is provided across power lines. Another example of an external power source may include a proprietary power system configured to provide power to the vehicle 100. In any event, power received at the plug/receptacle 1404 may be transferred via at least one power transmission interconnection 1408. Similar, if not identical, to the electrical interconnections 1328 described above, the at least one power transmission interconnection 1408 may be one or more cables, wires, traces, wireless power transmission systems, etc., and/or combinations thereof. Electrical energy in the form of charge can be transferred from the external power source to the charge controller 1324. As provided above, the charge controller 1324 may regulate the addition of charge to the power source 1308 of the vehicle 100 (e.g., until the power source 1308 is full or at a capacity, etc.).

In some embodiments, the vehicle 100 may include an inductive charging system and inductive charger 1412. The inductive charger 1412 may be configured to receive electrical energy from an inductive power source external to the vehicle 100. In one embodiment, when the vehicle 100 and/or the inductive charger 1412 is positioned over an inductive power source external to the vehicle 100, electrical energy can be transferred from the inductive power source to the vehicle 100. For example, the inductive charger 1412 may receive the charge and transfer the charge via at least one power transmission interconnection 1408 to the charge controller 1324 and/or the power source 1308 of the vehicle 100. The inductive charger 1412 may be concealed in a portion of the vehicle 100 (e.g., at least partially protected by the frame 1204, one or more body panels 1208, a shroud, a shield, a protective cover, etc., and/or combinations thereof) and/or may be deployed from the vehicle 100. In some embodiments, the inductive charger 1412 may be configured to receive charge only when the inductive charger 1412 is deployed from the vehicle 100. In other embodiments, the inductive charger 1412 may be configured to receive charge while concealed in the portion of the vehicle 100.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 15:
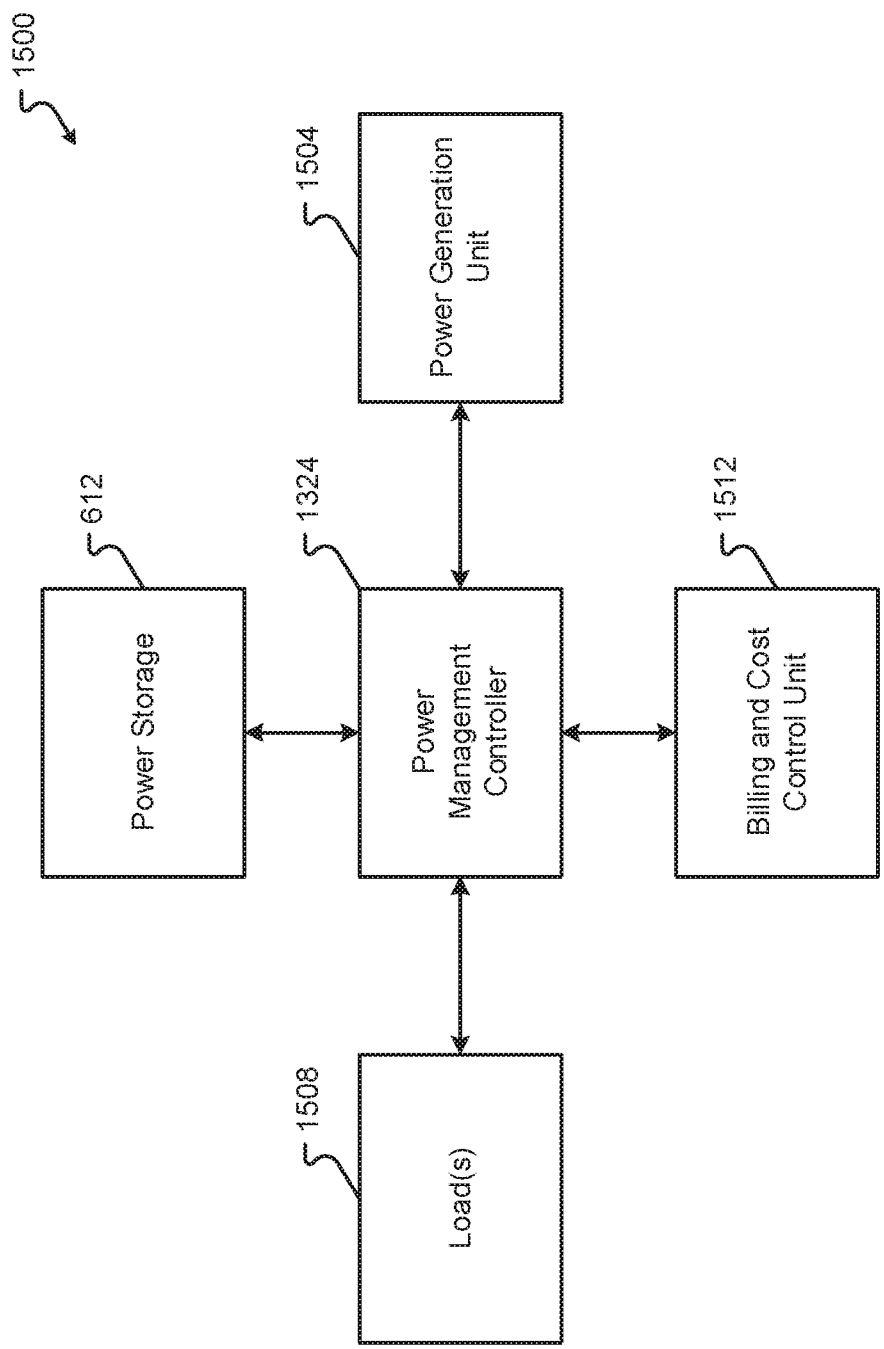
FIG. 15 is a block diagram of an embodiment of an electrical system of the vehicle.

An embodiment of the electrical system 1500 associated with the vehicle 100 may be as shown in FIG. 15. The electrical system 1500 can include power source(s) that generate power, power storage that stores power, and/or load(s) that consume power. Power sources may be associated with a power generation unit 1504. Power storage may be associated with a power storage system 612. Loads may be associated with loads 1508. The electrical system 1500 may be managed by a power management controller 1324. Further, the electrical system 1500 can include one or more other interfaces or controllers, which can include the billing and cost control unit 1512.

Figure 16:
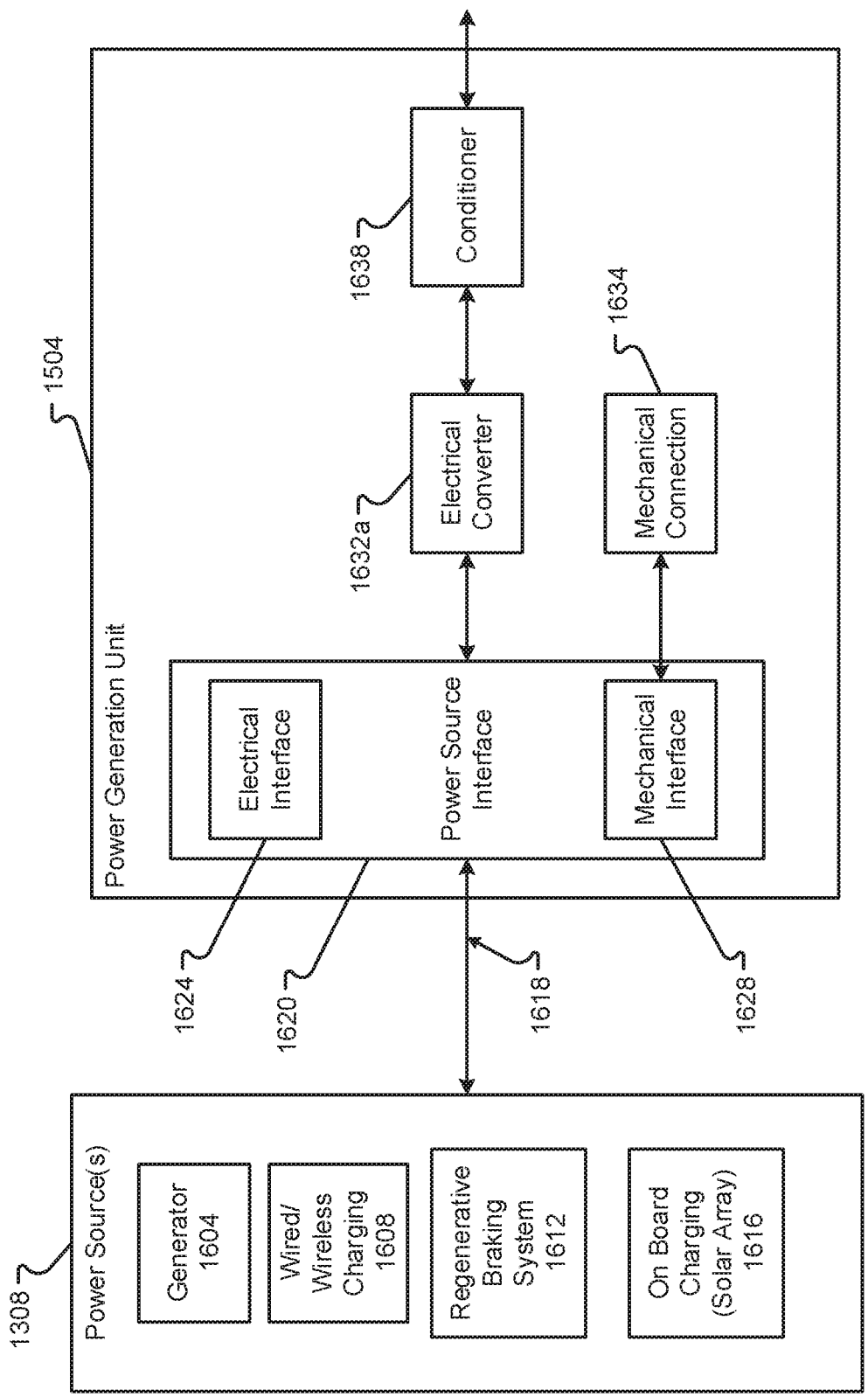
FIG. 16 is a block diagram of an embodiment of a power generation unit associated with the electrical system of the vehicle.

The power generation unit 1504 may be as described in conjunction with FIG. 16. The power storage component 612 may be as described in conjunction with FIG. 17. The loads 1508 may be as described in conjunction with FIG. 18.

The billing and cost control unit 1512 may interface with the power management controller 1324 to determine the amount of charge or power provided to the power storage 612 through the power generation unit 1504. The billing and cost control unit 1512 can then provide information for billing the vehicle owner. Thus, the billing and cost control unit 1512 can receive and/or send power information to third party system(s) regarding the received charge from an external source. The information provided can help determine an amount of money required, from the owner of the vehicle, as payment for the provided power. Alternatively, or in addition, if the owner of the vehicle provided power to another vehicle (or another device/system), that owner may be owed compensation for the provided power or energy, e.g., a credit.

The power management controller 1324 can be a computer or computing system(s) and/or electrical system with associated components, as described herein, capable of managing the power generation unit 1504 to receive power, routing the power to the power storage 612, and then providing the power from either the power generation unit 1504 and/or the power storage 612 to the loads 1508. Thus, the power management controller 1324 may execute programming that controls switches, devices, components, etc. involved in the reception, storage, and provision of the power in the electrical system 1500.

An embodiment of the power generation unit 1504 may be as shown in FIG. 16. Generally, the power generation unit 1504 may be electrically coupled to one or more power sources 1308. The power sources 1308 can include power sources internal and/or associated with the vehicle 100 and/or power sources external to the vehicle 100 to which the vehicle 100 electrically connects. One of the internal power sources can include an on board generator 1604. The generator 1604 may be an alternating current (AC) generator, a direct current (DC) generator or a self-excited generator. The AC generators can include induction generators, linear electric generators, and/or other types of generators. The DC generators can include homopolar generators and/or other types of generators. The generator 1604 can be brushless or include brush contacts and generate the electric field with permanent magnets or through induction. The generator 1604 may be mechanically coupled to a source of kinetic energy, such as an axle or some other power take-off. The generator 1604 may also have another mechanical coupling to an exterior source of kinetic energy, for example, a wind turbine.

Another power source 1308 may include wired or wireless charging 1608. The wireless charging system 1608 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system can include an connectors, wired interconnections, the controllers, etc. The wired and wireless charging systems 1608 can provide power to the power generation unit 1504 from external power sources 1308.

Internal sources for power may include a regenerative braking system 1612. The regenerative braking system 1612 can convert the kinetic energy of the moving car into electrical energy through a generation system mounted within the wheels, axle, and/or braking system of the vehicle 100. The regenerative braking system 1612 can include any coils, magnets, electrical interconnections, converters, controllers, etc. required to convert the kinetic energy into electrical energy.

Another source of power 1308, internal to or associated with the vehicle 100, may be a solar array 1616. The solar array 1616 may include any system or device of one or more solar cells mounted on the exterior of the vehicle 100 or integrated within the body panels of the vehicle 100 that provides or converts solar energy into electrical energy to provide to the power generation unit 1504.

The power sources 1308 may be connected to the power generation unit 1504 through an electrical interconnection 1618. The electrical interconnection 1618 can include any wire, interface, bus, etc. between the one or more power sources 1308 and the power generation unit 1504.

The power generation unit 1504 can also include a power source interface 1620. The power source interface 1620 can be any type of physical and/or electrical interface used to receive the electrical energy from the one or more power sources 1308; thus, the power source interface 1620 can include an electrical interface 1624 that receives the electrical energy and a mechanical interface 1628 which may include wires, connectors, or other types of devices or physical connections. The mechanical interface 1608 can also include a physical/electrical connection 1634 to the power generation unit 1504.

The electrical energy from the power source 1308 can be processed through the power source interface 1624 to an electric converter 1632. The electric converter 1632 may convert the characteristics of the power from one of the power sources into a useable form that may be used either by the power storage 612 or one or more loads 1508 within the vehicle 100. The electrical converter 1624 may include any electronics or electrical devices and/or component that can change electrical characteristics, e.g., AC frequency, amplitude, phase, etc. associated with the electrical energy provided by the power source 1308. The converted electrical energy may then be provided to an optional conditioner

1638. The conditioner 1638 may include any electronics or electrical devices and/or component that may further condition the converted electrical energy by removing harmonics, noise, etc. from the electrical energy to provide a more stable and effective form of power to the vehicle 100.

Figure 17:
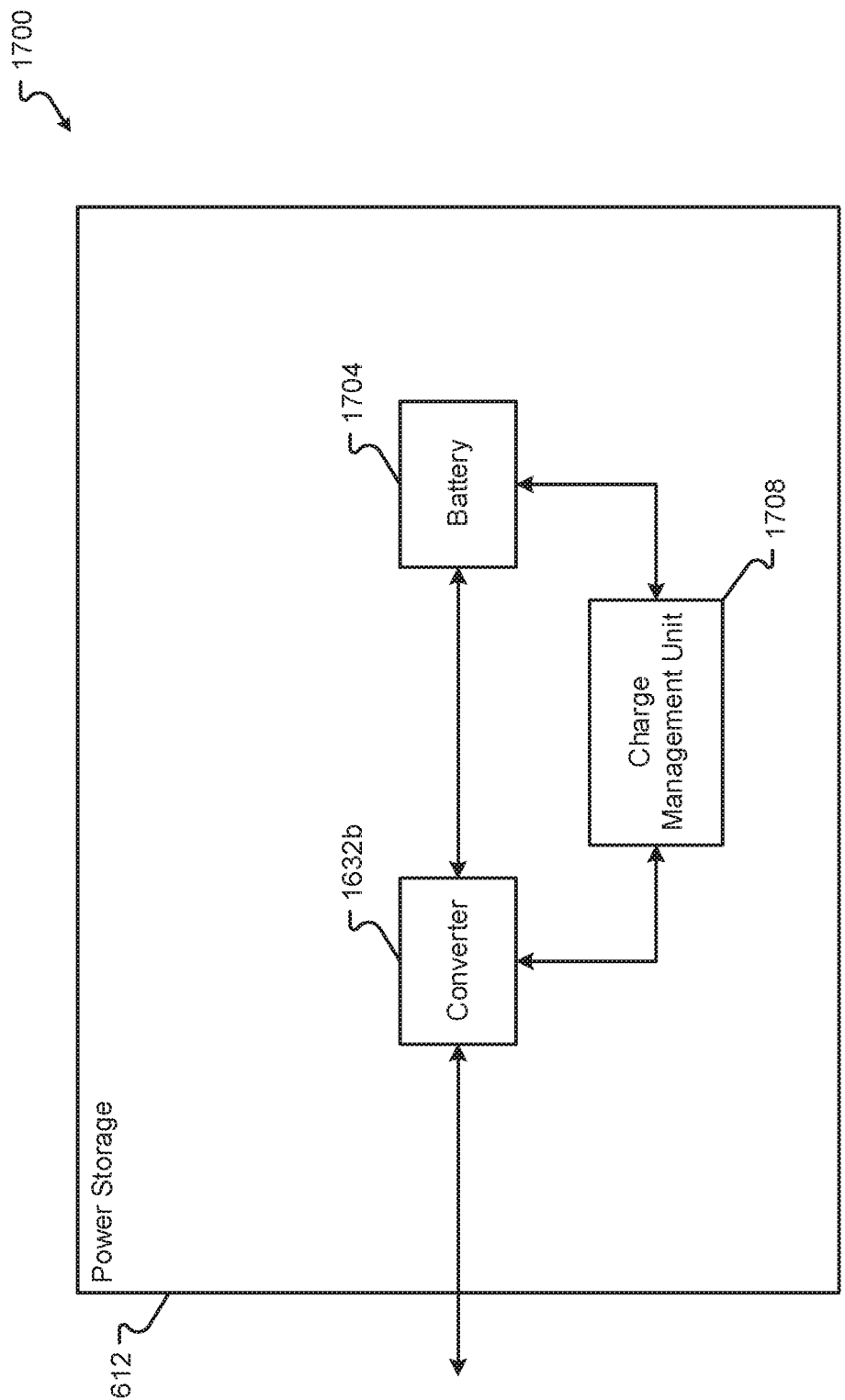
FIG. 17 is a block diagram of an embodiment of power storage associated with the electrical system of the vehicle.

An embodiment of the power storage 1612 may be as shown in FIG. 17. The power storage unit can include an electrical converter 1632b, one or more batteries, one or more rechargeable batteries, one or more capacitors, one or more accumulators, one or more supercapacitors, one or more ultrabatteries, and/or superconducting magnetics 1704, and/or a charge management unit 1708. The converter 1632b may be the same or similar to the electrical converter 1632a shown in FIG. 16. The converter 1632b may be a replacement for the electric converter 1632a shown in FIG. 16 and thus eliminate the need for the electrical converter 1632a as shown in FIG. 16. However, if the electrical converter 1632a is provided in the power generation unit 1504, the converter 1632b, as shown in the power storage unit 612, may be eliminated. The converter 1632b can also be redundant or different from the electrical converter 1632a shown in FIG. 16 and may provide a different form of energy to the battery and/or capacitors 1704. Thus, the converter 1632b can change the energy characteristics specifically for the battery/capacitor 1704.

The battery 1704 can be any type of battery for storing electrical energy, for example, a lithium ion battery, a lead acid battery, a nickel cadmium battery, etc. Further, the battery 1704 may include different types of power storage systems, such as, ionic fluids or other types of fuel cell systems. The energy storage 1704 may also include one or more high-capacity capacitors 1704. The capacitors 1704 may be used for long-term or short-term storage of electrical energy. The input into the battery or capacitor 1704 may be different from the output, and thus, the capacitor 1704 may be charged quickly but drain slowly. The functioning of the converter 1632 and battery capacitor 1704 may be monitored or managed by a charge management unit 1708.

The charge management unit 1708 can include any hardware (e.g., any electronics or electrical devices and/or components), software, or firmware operable to adjust the operations of the converter 1632 or batteries/capacitors 1704. The charge management unit 1708 can receive inputs or periodically monitor the converter 1632 and/or battery/capacitor 1704 from this information; the charge management unit 1708 may then adjust settings or inputs into the converter 1632 or battery/capacitor 1704 to control the operation of the power storage system 612.

Figure 18:
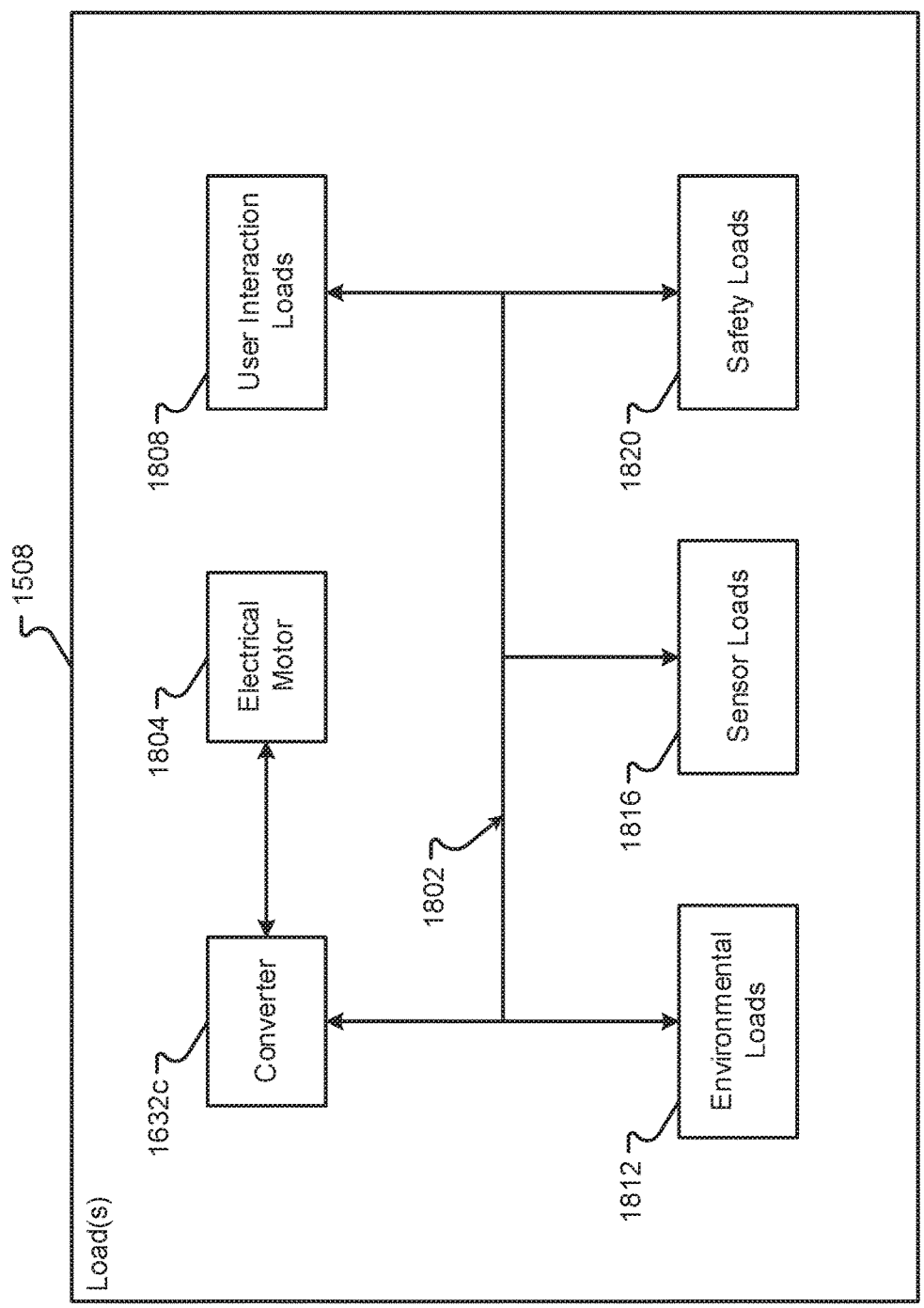
FIG. 18 is a block diagram of an embodiment of loads associated with the electrical system of the vehicle.

An embodiment of one or more loads 1508 associated with the vehicle 100 may be as shown in FIG. 18. The loads 1508 may include a bus or electrical interconnection system 1802, which provides electrical energy to one or more different loads within the vehicle 100. The bus 1802 can be any number of wires or interfaces used to connect the power generation unit 1504 and/or power storage 1612 to the one or more loads 1508. The converter 1632c may be an interface from the power generation unit 1504 or the power storage 612 into the loads 1508. The converter 1632c may be the same or similar to electric converter 1632a as shown in FIG. 16. Similar to the discussion of the converter 1632b in FIG. 17, the converter 1632c may be eliminated, if the electric converter 1632a, shown in FIG. 16, is present. However, the converter 1632c may further condition or change the energy characteristics for the bus 1802 for use by the loads 1508. The converter 1632c may also provide electrical energy to electric motor 1804, which may power the vehicle 100.

The electric motor 1804 can be any type of DC or AC electric motor. The electric motor may be a direct drive or induction motor using permanent magnets and/or winding either on the stator or rotor. The electric motor 1804 may also be wireless or include brush contacts. The electric motor 1804 may be capable of providing a torque and enough kinetic energy to move the vehicle 100 in traffic.

The different loads 1508 may also include environmental loads 1812, sensor loads 1816, safety loads 1820, user interaction loads 1808, etc. User interaction loads 1808 can be any energy used by user interfaces or systems that interact with the driver and/or passenger(s). These loads 1808 may include, for example, the heads up display, the dash display, the radio, user interfaces on the head unit, lights, radio, and/or other types of loads that provide or receive information from the occupants of the vehicle 100. The environmental loads 1812 can be any loads used to control the environment within the vehicle 100. For example, the air conditioning or heating unit of the vehicle 100 can be environmental loads 1812. Other environmental loads can include lights, fans, and/or defrosting units, etc. that may control the environment within the vehicle 100. The sensor loads 1816 can be any loads used by sensors, for example, air bag sensors, GPS, and other such sensors used to either manage or control the vehicle 100 and/or provide information or feedback to the vehicle occupants. The safety loads 1820 can include any safety equipment, for example, seat belt alarms, airbags, headlights, blinkers, etc. that may be used to manage the safety of the occupants. There may be more or fewer loads than those described herein, although they may not be shown in FIG. 18.

Figure 19:
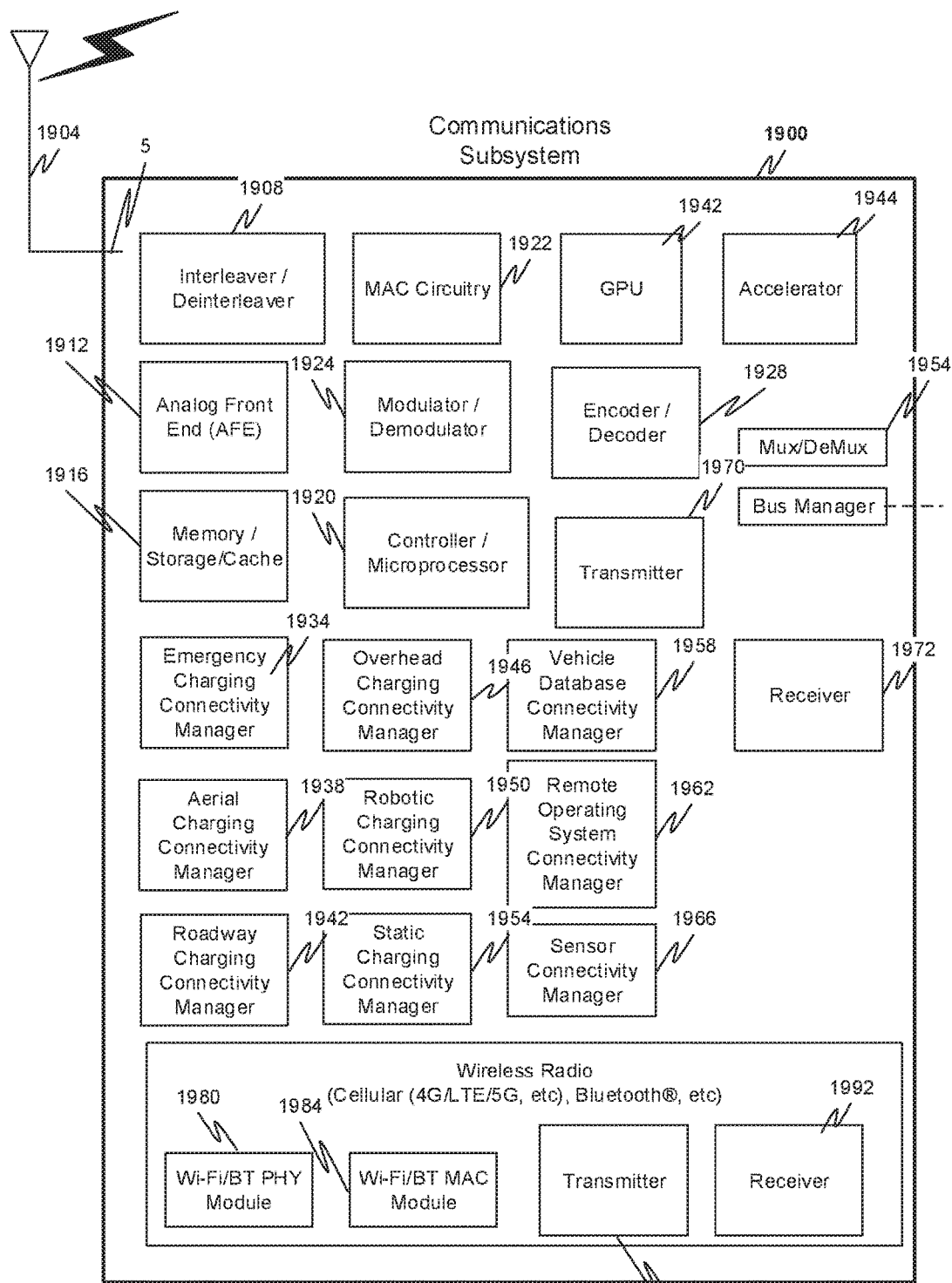
FIG. 19. is a block diagram of an exemplary embodiment of a communications subsystem of the vehicle.

FIG. 19 illustrates an exemplary hardware diagram of communications componentry that can be optionally associated with the vehicle.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud.

The communications subsystem can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem can include one or more communications links (that can be wired or wireless) and/or communications busses (managed by the bus manager), including one or more of CANbus, OBD-II, ARCINC 429, Byteflight, CAN (Controller Area Network), D2B (Domestic Digital Bus), FlexRay, DC-BUS, IDB-1394, IEBus, I²C, ISO 9141-1/-2, J1708, J1587, J1850, J1939, ISO 11783, Keyword Protocol 2000, LIN (Local Interconnect Network), MOST (Media Oriended Systems Transport), Multifunction Vehicle Bus, SMARTwireX, SPI, VAN (Vehicle Area Network), and the like or in general any communications protocol and/or standard.

The various protocols and communications can be communicated one or more of wirelessly and/or over transmission media such as single wire, twisted pair, fibre optic, IEEE 1394, MIL-STD-1553, MIL-STD-1773, power-line communication, or the like. (All of the above standards and protocols are incorporated herein by reference in their entirety)

As discussed, the communications subsystem enables communications between any if the inter-vehicle systems and subsystems as well as communications with non-collocated resources, such as those reachable over a network such as the Internet.

The communications subsystem, in addition to well-known componentry (which has been omitted for clarity), the device communications subsystem 1900 includes interconnected elements including one or more of: one or more antennas 1904, an interleaver/deinterleaver 1908, an analog front end (AFE) 1912, memory/storage/cache 1916, controller/microprocessor 1920, MAC circuitry 1922, modulator/demodulator 1924, encoder/decoder 1928, a plurality of connectivity managers 1934-1966, GPU 1942, accelerator 1944, a multiplexer/demultiplexer 1954, transmitter 1970, receiver 1972 and wireless radio 310 components such as a Wi-Fi PHY/Bluetooth® module 1980, a Wi-Fi/BT MAC module 1984, transmitter 1988 and receiver 1992. The various elements in the device 1900 are connected by one or more links/busses 5 (not shown, again for sake of clarity).

The device 400 can have one more antennas 1904, for use in wireless communications such as multi-input multi-output (MIMO) communications, multi-user multi-input multi-output (MU-MIMO) communications Bluetooth®, LTE, 4G, 5G, Near-Field Communication (NFC), etc. The antenna(s) 1904 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle and/or in another vehicle.

Antenna(s) 1904 generally interact with the Analog Front End (AFE) 1912, which is needed to enable the correct processing of the received modulated signal and signal conditioning for a transmitted signal. The AFE 1912 can be functionally located between the antenna and a digital baseband system in order to convert the analog signal into a digital signal for processing and vice-versa.

The subsystem 1900 can also include a controller/microprocessor 1920 and a memory/storage/cache 1916. The subsystem 1900 can interact with the memory/storage/cache 1916 which may store information and operations necessary for configuring and transmitting or receiving the information described herein. The memory/storage/cache 1916 may also be used in connection with the execution of application programming or instructions by the controller/microprocessor 1920, and for temporary or long term storage of program instructions and/or data. As examples, the memory/storage/cache 1920 may comprise a computer-readable device, RAM, ROM, DRAM, SDRAM, and/or other storage device(s) and media.

The controller/microprocessor 1920 may comprise a general purpose programmable processor or controller for executing application programming or instructions related to the subsystem 1900. Furthermore, the controller/microprocessor 1920 can perform operations for configuring and transmitting/receiving information as described herein. The controller/microprocessor 1920 may include multiple processor cores, and/or implement multiple virtual processors. Optionally, the controller/microprocessor 1920 may include multiple physical processors. By way of example, the controller/microprocessor 1920 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 1900 can further include a transmitter 1970 and receiver 1972 which can transmit and receive signals, respectively, to and from other devices, subsystems and/or other destinations using the one or more antennas 1904 and/or links/busses. Included in the subsystem 1900 circuitry is the medium access control or MAC Circuitry 1922. MAC circuitry 1922 provides for controlling access to the wireless medium. In an exemplary embodiment, the MAC circuitry 1922 may be arranged to contend for the wireless medium and configure frames or packets for communicating over the wireless medium.

The subsystem 1900 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

The exemplary subsystem 1900 also includes a GPU 1942, an accelerator 1944, a Wi-Fi/BT/BLE PHY module 1980 and a Wi-Fi/BT/BLE MAC module 1984 and wireless transmitter 1988 and receiver 1992.

The various connectivity managers 1934-1966 manage and/or coordinate communications between the subsystem 1900 and one or more of the systems disclosed herein and one or more other devices/systems. The connectivity managers include an emergency charging connectivity manager 1934, an aerial charging connectivity manager 1938, a roadway charging connectivity manager 1942, an overhead charging connectivity manager 1946, a robotic charging connectivity manager 1950, a static charging connectivity manager 1954, a vehicle database connectivity manager 1958, a remote operating system connectivity manager 1962 and a sensor connectivity manager 1966.

The emergency charging connectivity manager 1934 can coordinate not only the physical connectivity between the vehicle and the emergency charging device/vehicle, but can also communicate with one or more of the power management controller, one or more third parties and optionally a billing system(s). As an example, the vehicle can establish communications with the emergency charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the emergency charging connectivity manager 1934 can also communicate information, such as billing information to the emergency charging vehicle and/or a third party. This billing information could be, for example, the owner of the vehicle, the driver of the vehicle, company information, or in general any information usable to charge the appropriate entity for the power received.

The aerial charging connectivity manager 1938 can coordinate not only the physical connectivity between the vehicle and the aerial charging device/vehicle, but can also communicate with one or more of the power management controller, one or more third parties and optionally a billing system(s). As an example, the vehicle can establish communications with the aerial charging device/vehicle to one or more of coordinate interconnectivity between the two (e.g., by spatially aligning the charging receptacle on the vehicle with the charger on the emergency charging vehicle) and optionally share navigation information. Once charging is complete, the amount of charge provided can be tracked and optionally forwarded to, for example, a third party for billing. In addition to being able to manage connectivity for the exchange of power, the aerial charging connectivity manager 1938 can similarly communicate information, such as billing information to the aerial charging vehicle and/or a third party. This billing information could be, for example, the owner of the vehicle, the driver of the vehicle, company information, or in general any information usable to charge the appropriate entity for the power received etc., as discussed.

The roadway charging connectivity manager 1942 and overhead charging connectivity manager 1946 can coordinate not only the physical connectivity between the vehicle and the charging device/system, but can also communicate with one or more of the power management controller, one or more third parties and optionally a billing system(s). As one example, the vehicle can request a charge from the charging system when, for example, the vehicle needs or is predicted to need power. As an example, the vehicle can establish communications with the charging device/vehicle to one or more of coordinate interconnectivity between the two for charging and share information for billing. Once charging is complete, the amount of charge provided can be tracked and optionally forwarded to, for example, a third party for billing. This billing information could be, for example, the owner of the vehicle, the driver of the vehicle, company information, or in general any information usable to charge the appropriate entity for the power received etc., as discussed. The person responsible for paying for the charge could also receive a copy of the billing information as is customary. The robotic charging connectivity manager 1950 and static charging connectivity manager 1954 can operate in a similar manner to that described herein.

The vehicle database connectivity manager 1958 allows the subsystem to receive and/or share information stored in the vehicle database. This information can be shared with other vehicle components/subsystems and/or other entities, such as third parties and/or charging systems. The information can also be shared with one or more vehicle occupant devices, such as an app on a mobile device the driver uses to track information about the vehicle and/or a dealer or service/maintenance provider. In general, any information stored in the vehicle database can optionally be shared with any one or more other devices optionally subject to any privacy or confidentially restrictions.

The remote operating system connectivity manager 1962 facilitates communications between the vehicle and any one or more autonomous vehicle systems. These communications can include one or more of navigation information, vehicle information, occupant information, or in general any information related to the remote operation of the vehicle.

The sensor connectivity manager 1966 facilitates communications between any one or more of the vehicle sensors and any one or more of the other vehicle systems. The sensor connectivity manager 1966 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS. The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

A system and method for vehicle to vehicle charging is disclosed in FIGS. 20-23. Generally, the system enables a charging vehicle to provide a charge to a receiving vehicle.

Figure 20:
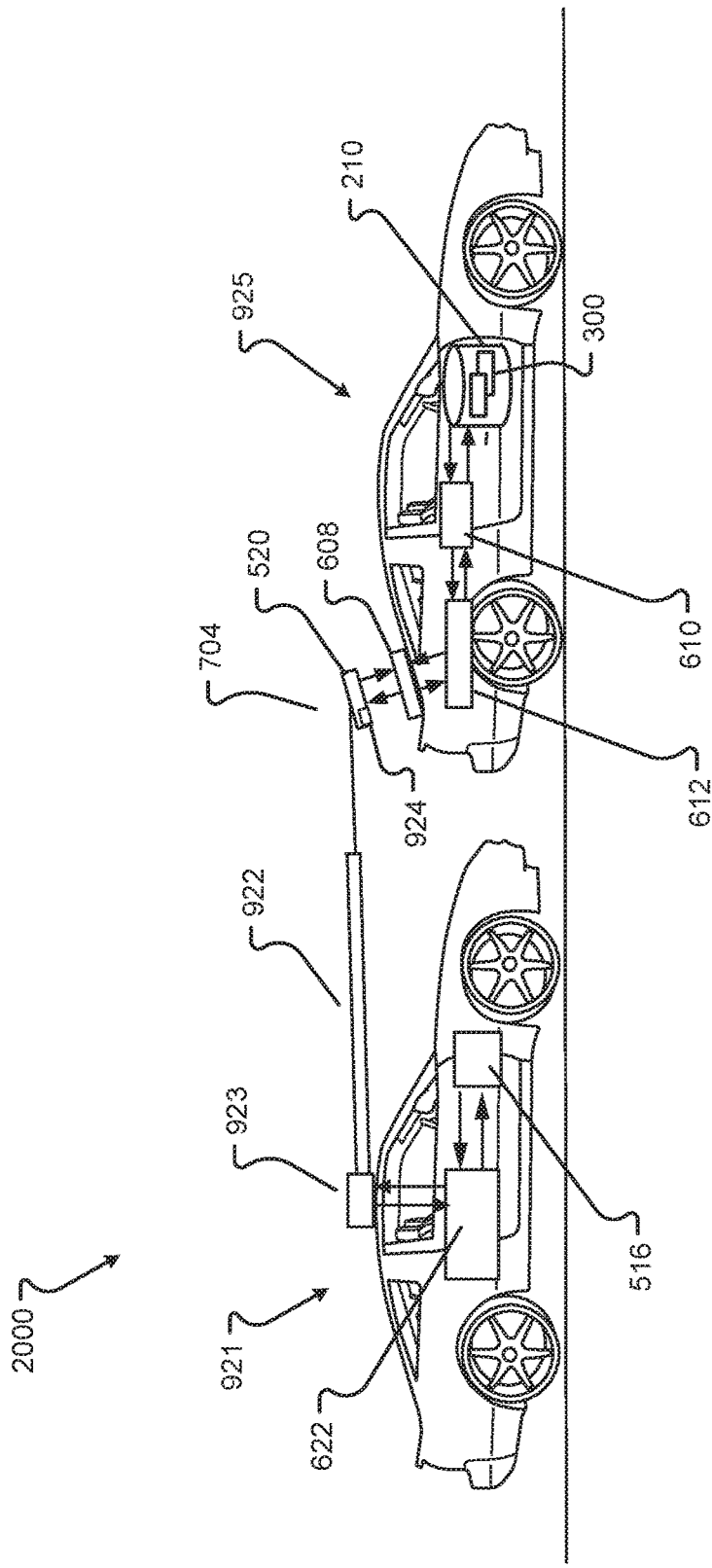
FIG. 20 shows a vehicle in a vehicle to vehicle roadway charging environment in accordance with embodiments of the present disclosure.

With attention to FIG. 20, one embodiment of a vehicle to vehicle charging system 2000 is depicted. The system 2000 comprises a charging vehicle 921 and a receiving vehicle 925. The charging vehicle 921 comprises power source 516 interconnected with a charge provider controller 622, the controller 622 interconnected with a charging vehicle controller 923. The charging vehicle controller 923 is interconnected with a charging vehicle arm 922 which in turn is interconnected with charging plate 520. The controller 923 may control one or more of the extension and/or positioning of the arm 922 and the positioning (relative to the distal end of arm and/or panel 608) of the plate 924. The charging vehicle arm 922 is extendable and extends so as to enable the charging plate 520 to charge (e.g. through induction) the receiving vehicle 925 by way of charging panel 608. The charging plate 520 may be disposed at a distal end of the charging vehicle arm 922. The charging plate 520 may comprise at least one positioning sensor 924, to enable automated positioning control of the charging plate 520 with respect to the charging panel 608 (further described with regard to FIG. 21). Receiving vehicle 925 comprises components as described in FIG. 7.

Figure 21:
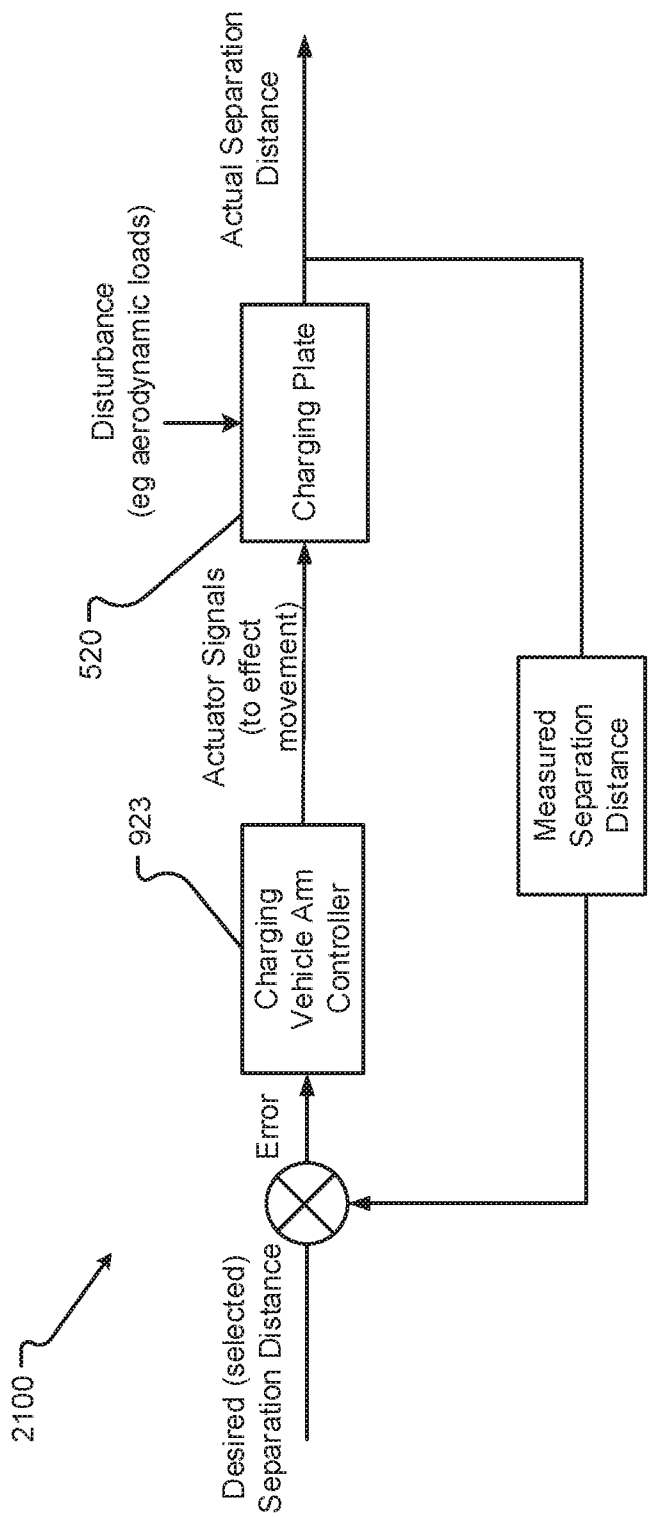
FIG. 21 is a block diagram of a charging panel control system.

FIG. 21 is a block diagram of a vehicle to vehicle control system 2100 which automatically positions the charging plate 520 with respect to the charging panel 608. Generally, the control system 2100 is a feedback control system to control the separation distance between the charging panel 608 and the charging plate 520. Selected separation distance is input (as determined by way of query to database 210 or manually entered by user) and compared with a measured separation distance (as from a separation distance sensor 924) to compute an error signal. The error signal is received by the controller 923 to determine control inputs to arm 922 (or to an actuator which maneuvers arm 922) which in turn positions the charging plate 52 relative to panel 608. Alternatively or additionally, the control 923 may control the maneuvering/positioning of plate 520 with respect to the distal end of arm 922. The error signal will typically be non-zero due to disturbances to the charging plate, such as aerodynamic loads generated while the vehicles are in motion. The controller 923 may employ any known types of feedback control known to those skilled in the art, comprising stochastic control, proportional, integral and/or derivative control, non-linear control and deterministic control. In other embodiments, a plurality of sensor 924 inputs are provided and/or a plurality of separation distances and/or loading measures are controlled. For example, a pair of positional sensors may be positioned at ends of a leading edge of an airfoil (or otherwise aerodynamically-shaped) charging plate 520 whereby pitch and/or roll are controlled as well as distance from the charging panel 608. Furthermore, a loading sensor may be positioned on the arm 922 and/or charging plate 520 to measure the loading imparted to the arm 922 and/or charging plate 520, so as to provide an ability to, for example, determine if a threshold value for do-not-exceed loading (as stored in database 210) has been exceeded.

Figure 22A:
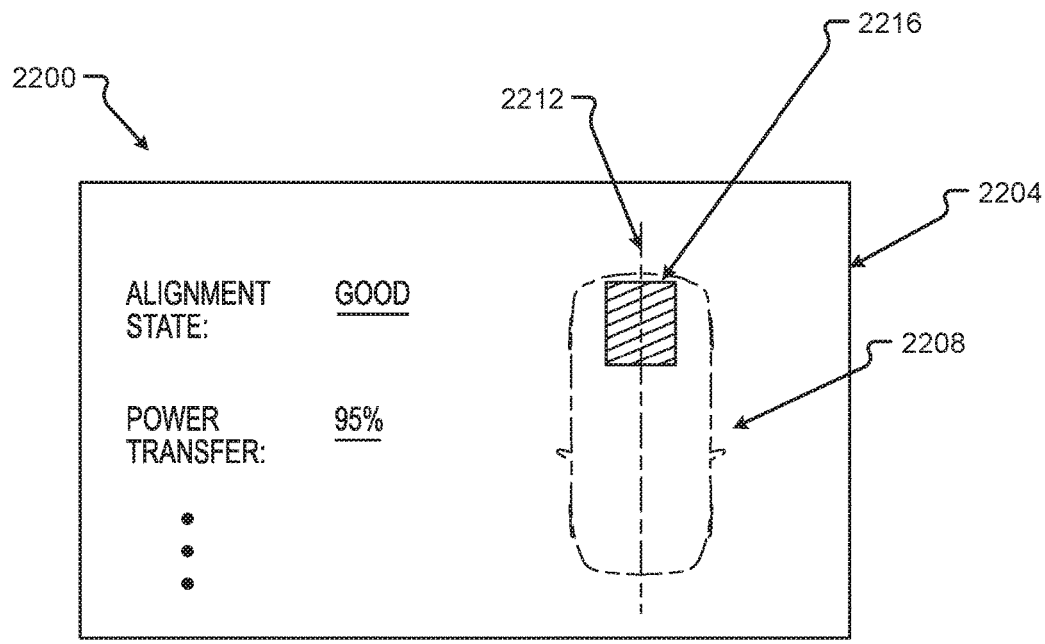
FIG. 22A shows a first state of a graphical user interface used in aligning a charging panel of an electrical vehicle to receive a charge.
Figure 22B:
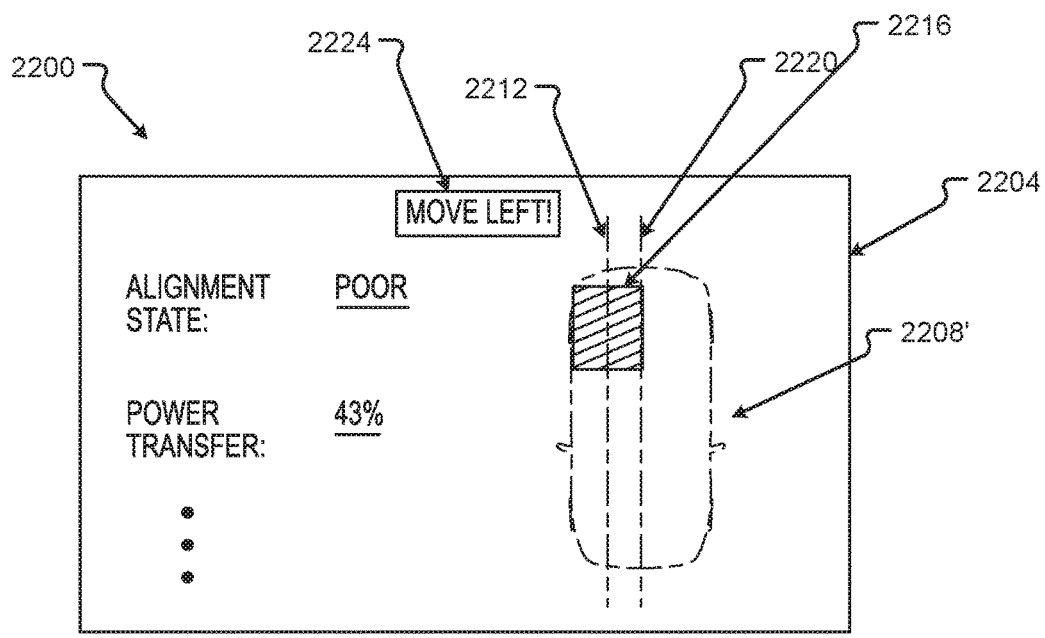
FIG. 22B shows a second state of the graphical user interface of FIG. 22A.

FIGS. 22A-B show representative states of a graphical user interface (GUI) used in aligning a charging plate 520 of a charging vehicle to provide a charge to a receiving vehicle (note: such a display could also be used by a receiving vehicle to position its charging panel 608 to receive a charge from a charging plate 520). More specifically, FIGS. 22A-B depict graphical user interfaces 2200 displaying feedback adjustment image one 2208 and feedback adjustment image two 2208' in accordance with embodiments of the present disclosure. In some embodiments, methods and systems are described that provide a charging vehicle 921, or a receiving vehicle 925, with the ability to properly align a charging plate or a charging panel relative to the other, respectively. The dynamic position or location may be provided to a driver (or any occupant of a vehicle) of the vehicle via at least one graphical user interface (GUI) 2200 of a display device 2204 to allow the driver to make any adjustments to the position of the charging vehicle 921, a receiving vehicle 925, charging plate 520 and/or the charging panel 608. For instance, the GUI 2200 may show a vehicle image aka feedback adjustment image 2008 relative to an alignment line, or centerline aka power source centerline icon 2212, of an image representing a charging element aka power source icon 2216. As the position of the charging plate 520, or charging vehicle 921, changes relative to the charging circuit components 2216 the graphical output (e.g., showing the relative position of the components in the charging system, etc.) provided to the at least one GUI 2200 changes (e.g., a changed representative image 2208', of the charging vehicle 921 may move relative to the centerline 2212 and/or image representing the charging element aka power source icon 2216, or vice versa, etc.) to reflect the changed position. This continual updating of the GUI 2200 and the relative charging components position can provide a driver of the vehicle with a feedback loop by which the driver can adjust a position of the charging panel 608, charging plate 520 and/or the vehicle 100 to obtain an optimal charging alignment between the charging plate and the at least one charging circuit component 2216. In some embodiments, a feedback recommendation aka alignment instruction 2224 may be displayed to a portion of the GUI 2200. For example, the feedback recommendation 2224 may provide the driver with alignment instructions and/or advice for adjusting a position of the vehicle relative to the charging circuit 2216.

In some embodiments, alignment instructions may comprise more than horizontal separation distance adjustments, e.g. both a horizontal and a vertical alignment or position instructions, or a horizontal alignment instruction and an angular position. The angular alignment adjustment may comprise a yaw alignment command, which may be particularly important if the vehicle is moving and the power sources are multiple sequential power sources embedded in a roadway.

Figure 23:
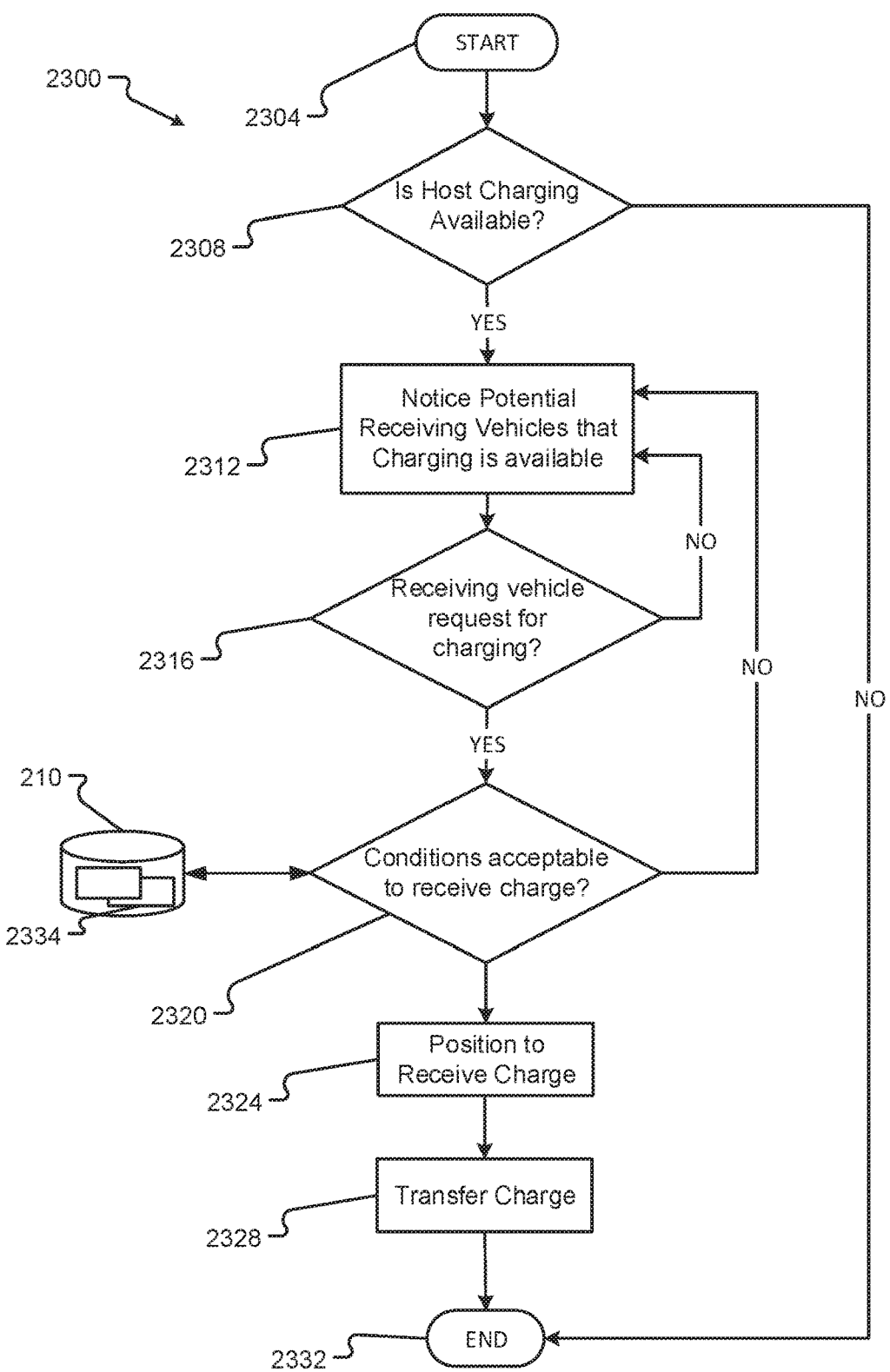
FIG. 23 is a flow or process diagram of a method of vehicle to vehicle charging.

FIG. 23 is a flow or process diagram of a method of vehicle to vehicle charging. The method starts at step 2304 and ends at step 2332.

After starting at step 2304, at step 2308 the method queries as to whether charging is available by charging vehicle 921. That is, a query is made as to whether the charging vehicle 921 is able to provide a charging service to a charging panel 608 of receiving vehicle 925. If NO, the method proceeds to step 2332 and ends. (Alternatively, the charging vehicle 921 may return to a home base station or similar and recharge its energy source i.e. recharge energy power unit 516.) If the result of the query of step 2308 is YES, the method proceeds to step 2312 wherein notice is provided that charging is available. The notice may comprise targeted communications e.g. by texting to potential receiving vehicle 925 within a selectable distance. The content of the notice may comprise: the availability of charging, and terms and conditions of charging (cost, payment types, amount available, duration of charging time, etc). The notice may comprise a physical mounted advertisement (eg a lighted sign on charging vehicle 921) that charging is available, not unlike a taxi "off duty" or "on duty" light. The notice may be through wireless advertisement, e.g. via a smartphone app available to potential receiving vehicles 925.

At step 2216 a query is made as to whether a particular receiving vehicle 925 has requested or requires or seeks a charge. Note that controller 923 may monitor a state or status of charging (e.g. battery is charged at 32%, or battery charging level drops below a selectable threshold value e.g. below 10%) of the energy storage unit 516 of charging vehicle 921 to determine if charging is recommended or required. A user, such as a driver or passenger, may also request that the vehicle be charged. If NO, the method proceeds back to step 2312. If YES, the method proceeds to step 2320.

At step 2320, a query is made as to whether the receiving vehicle 925 is configured to receive the charging from charging vehicle 921. Such a query may be facilitated by communications between vehicle "smart" control systems aboard one or both of charging vehicle 921 and charging vehicle 921, comprising communications between controller 923 and controller 610. Note that incompatibilities may include min/max energy transfer thresholds (e.g. voltages), electrical or mechanical incompatibilities charging plate 520 and panel 608, and physical incompatibilities between the vehicles 921 and 925 (e.g. such as exceeding range thresholds of arm 922). If the query answer is a NO, the method proceeds to step 2312. If YES, the method proceeds to step 2324 wherein the receiving vehicle 925 is charged by charging vehicle 921 and the method proceeds to step 2324 wherein the charging plate 520 is positioned with respect to the panel 608 so as to receive (or transmit) a charge. The positioning of the charging panel 520 and/or arm 922 may comprise selection of initial or nominal positioning via data contained in vehicle database 210 through a vehicle to vehicle charging system data structure 2334 (similar to that of FIG. 3. The method 2300 then continues to step 2328 wherein a charge is provided by plate 520 to panel 608 so as to power or charge energy source 612 of receiving vehicle 925. When charging is complete the method 2300 ends at step 2332.

Figure 24:
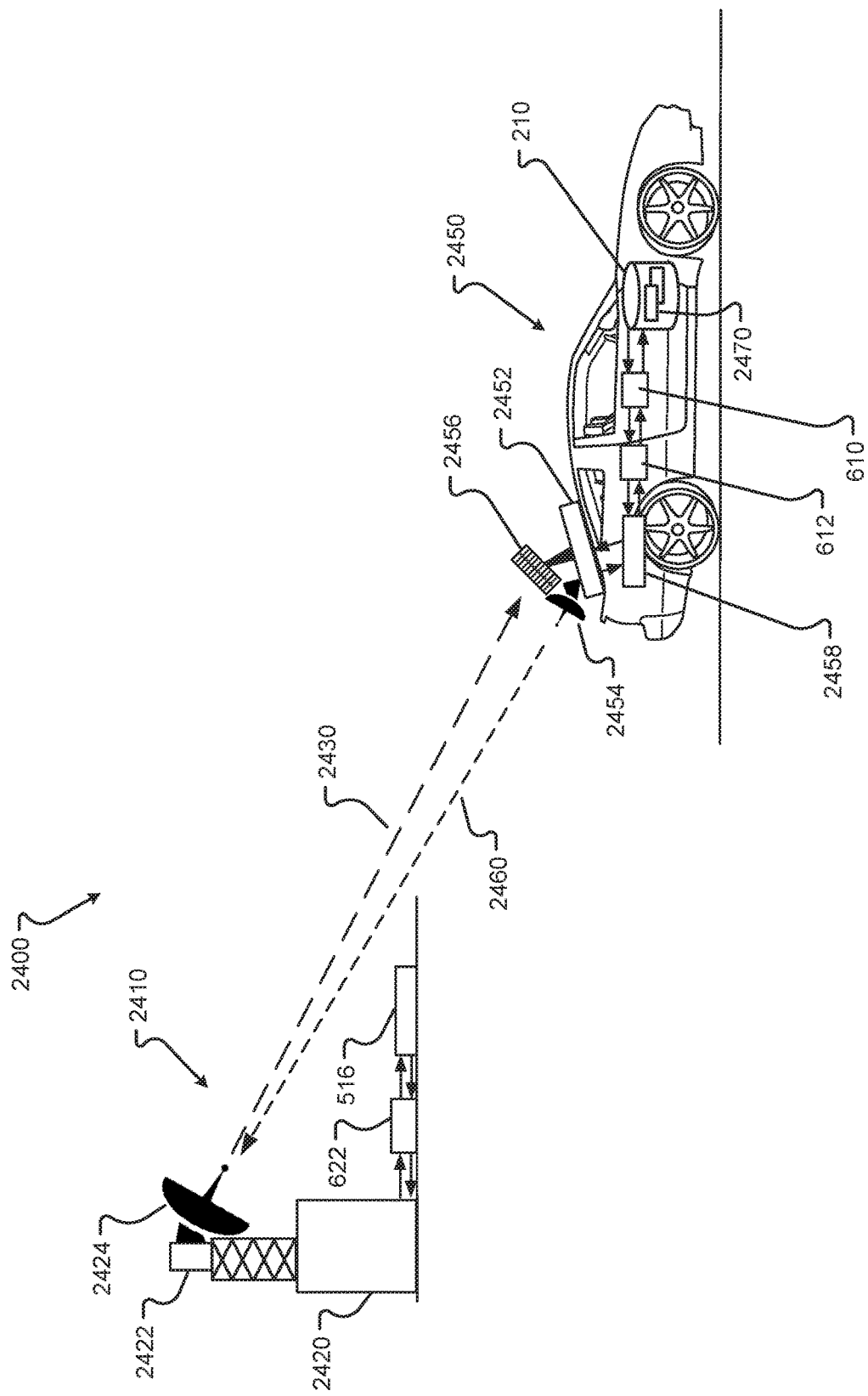
FIG. 24 shows a vehicle and optical charging station in an optical charging environment in accordance with embodiments of the present disclosure.
Figure 25:
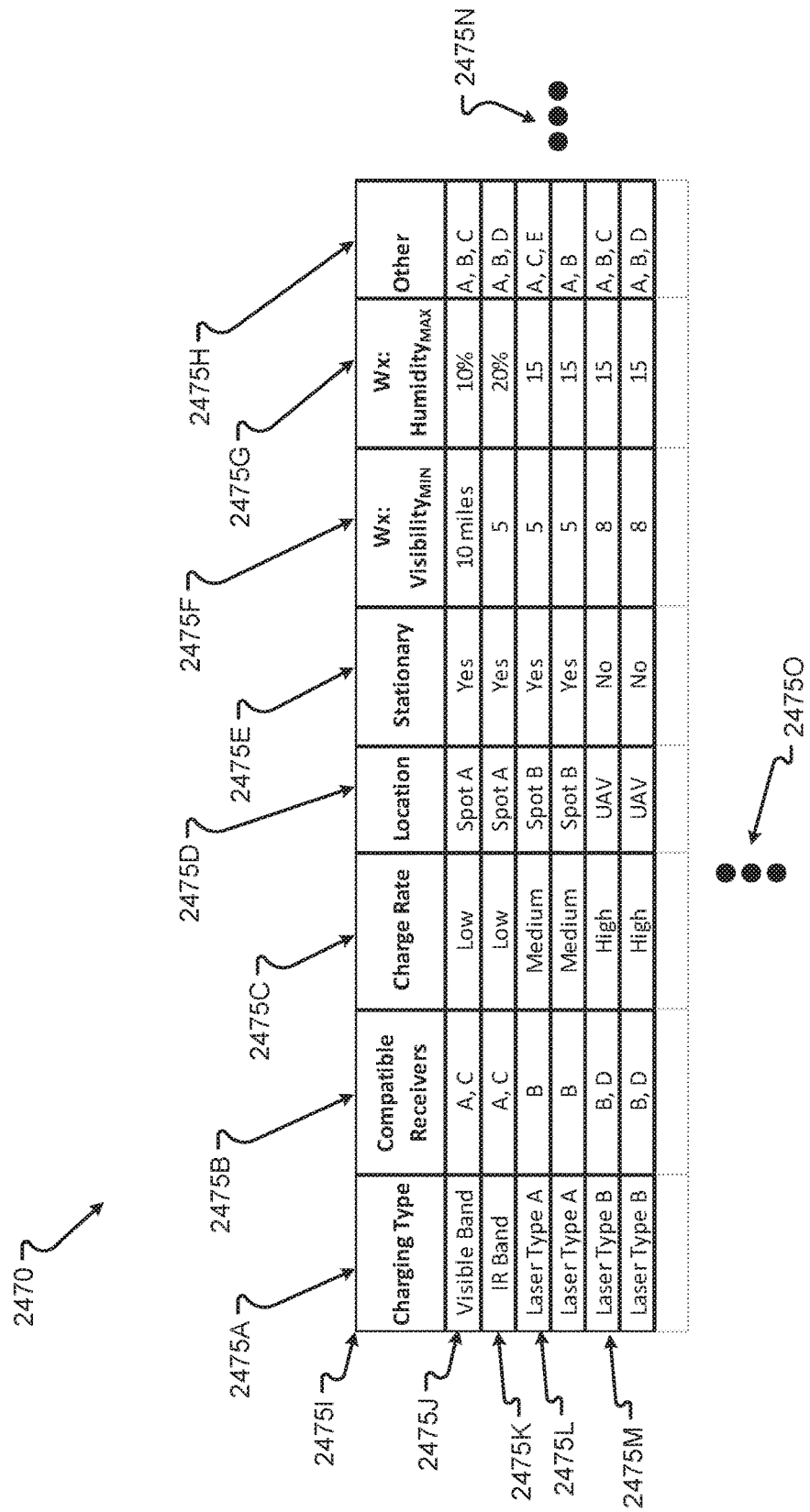
FIG. 25 is a diagram of an embodiment of a data structure for storing information about a vehicle in an optical charging environment.
Figure 26:
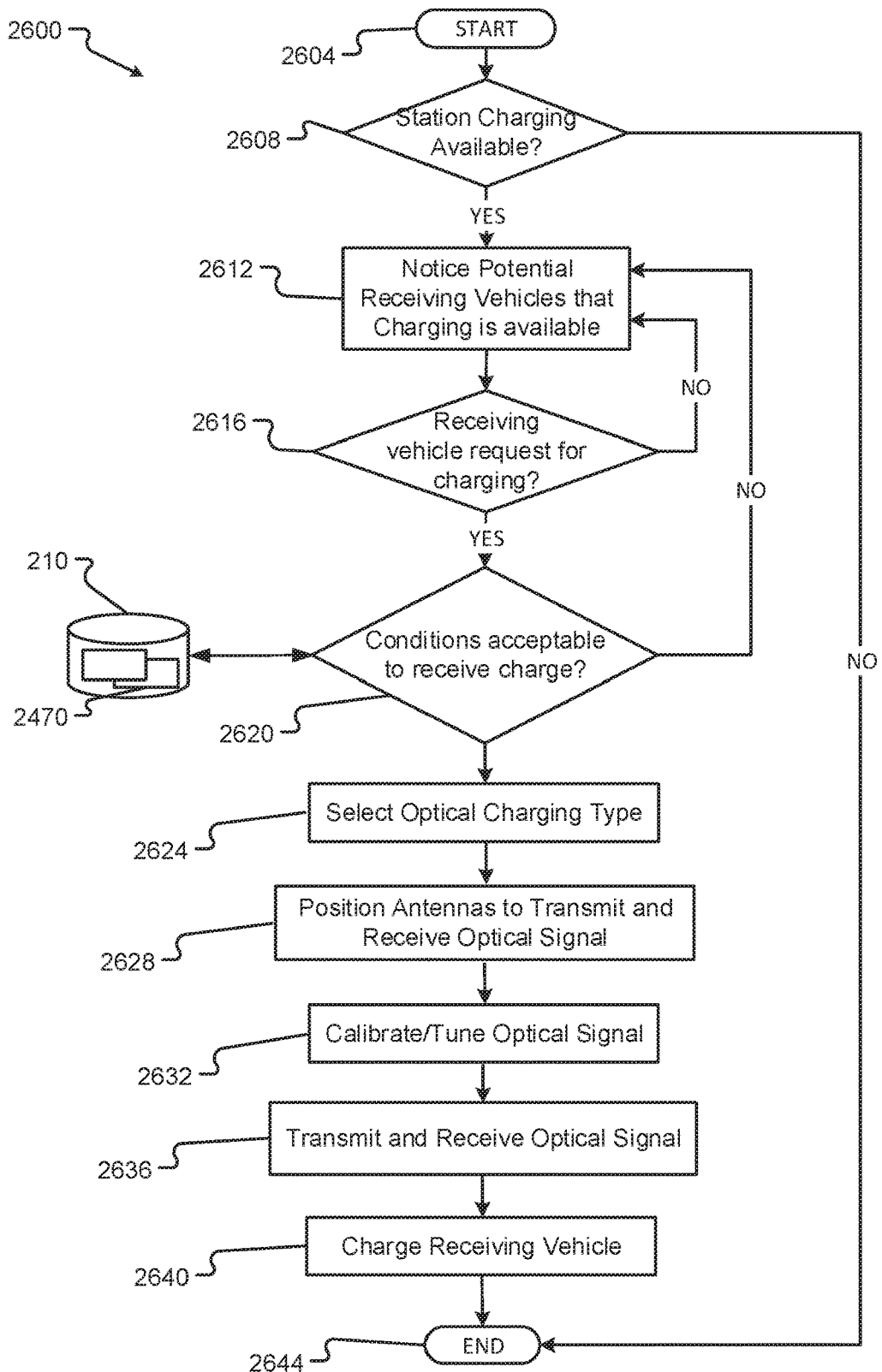
FIG. 26 is a flow or process diagram of a method of optical charging.

A system and method for optical charging of a vehicle is disclosed in FIGS. 24-26. Generally, the system enables a receiving vehicle to receive a charge by optical means from an optical charging station. Here, optical is broadly defined to include any electromagnetic spectrum means and directed energy means.

With attention to FIG. 24, one embodiment of an optical charging system 2400 is depicted. The system 2400 comprises an optical charging station 2410 and an optical charge receiving vehicle 2450.

The optical charging station 2410 comprises a power source 516, a charge provider controller 622 (which interconnects with the power source 516), an optical charging station base 2420 interconnected with optical charging station antenna controller 2422, the optical charging station antenna controller 2422 interconnected with the optical charging station antenna 2424. The optical charging station antenna 2424 emits optical charging station signal 2430, as directed or pointed by optical charging station antenna controller 2422. The emitted and directed optical charging station signal may comprise any band in the electromagnetic spectrum, to include without limitation visible band light emissions/bands, IR bands, microwave bands, millimeter wave bands, laser emissions and any optical or electromagnetic band or signal known to those skilled in the art. The optical charging station 2410 may comprise a plurality of antennas or emission sources, which may operate in concert, in sequence or in series. In one embodiment, the optical charging station 2410 broadcasts or emits or directs a first signal of a first band from a first antenna (or similar) to a receiving target (eg to the optical charge receiving vehicle 2450), processes that first signal of a first band, and then broadcasts a second signal of a second band from a second antenna (or similar) to the target. The first signal may provide general pointing, orientation and/or calibration data used in tuning (such as pointing, power level, etc) of the second signal prior to broadcast.

The optical charge receiving vehicle 2450 comprises receiving vehicle PV array 2456 (which may receive optical charging station signal 2430), receiving vehicle antenna 2454 (which may receive optical charging station signal 2430 and/or transmit or broadcast receiving vehicle signal 2460 to optical charging station 2410), receiving vehicle antenna/PV array controller 2452 (in communication with receiving vehicle PV array 2456 and/or receiving vehicle antenna 2454) in communication with receiving vehicle converter 2458 (which may convert a received signal to a signal that may charge energy storage unit 612). Charging panel controller 610 is in communication with one or more of receiving vehicle converter 2458, energy storage unit 612 and vehicle database 210 comprising vehicle optical charging data structure 2470. Charging panel controller 610 may determine tracking characteristics or parameters for receiving vehicle antenna/PV array controller 2452 to control or orient one or both of receiving vehicle PV array 2456 and receiving vehicle antenna 2454. Receiving vehicle antenna/PV array controller 2452 may comprise a feedback controller for controlling pointing/orientation of the antenna and/or PV array, as described with respect to FIG. 21.

FIG. 25 is a diagram of an embodiment of a data structure for storing information about a vehicle in an optical charging environment, such as provided in FIG. 24. The vehicle optical charging data structure 2470 are stored in vehicle database 210 and accessible by charge provider controller 610. The data contained in vehicle optical charging data structure 2470 enables, among other things, for the charge provider controller 610 to, in coordination with receiving vehicle antenna/PV array controller 2452, to position, control and/or orient the antenna 2454 and/or PV array 2456 for a given optical charging types and/or conditions.

Exemplar data may comprise charging type 2475A, such as various electromagnetic bands (i.e. visible band e.g. 2475J, IR band 2465K) or laser types (i.e. type A of 2475L and laser type B of 2465M). A compatible receiver type is identified in element 2475B (where A, B, C and D may reference a design type of antenna or PV array or other receiver that is compatible or able to interact with charging type of 2475A). Charge rate 24755C may be set to numerical values or a qualitative value (e.g. low, medium, high which may correspond to a charging transmission level).

A location 2475D identifies a location for charging, such as a stretch of roadway (e.g. "I-25 Hwy" to indicate Highway Interstate-25) or a static location for charging (e.g. "Spot A" or "Spot B" to alternative lat/long charging pad locations). The Stationary 2475E indicates options for moving or dynamic charging (where "UAV" indicates charging by way of an unmanned aerial vehicle aka a drone where one or both of drone and vehicle 2450 are in motion) identified as a "No" or a situation when vehicle 2450 is stationary (identified as a "Yes" data element. Data items 24755F and 2475G identify weather conditions to permit optical charging. That is, Wx:Visibility$_{MIN}$ 2475F provides values for weather visibility minimums required to allow a given charging type to provide charging. Wx:Humidity$_{MAX}$ 2475G similarly provides maximum wherein a particular type of optical charging may occur. Such weather minimums reflect underlying physics involved in optical communications. For example, low visibility conditions do not allow visible band light to propagate, while high atmospheric turbulence or humidity influence or reduce laser transmission efficiencies and pointing accuracies.

The Other data type of 2475H may comprise other data items involved in optical or electromagnetic wave propagation, charging such as voltage levels, current values, etc as known to those skilled in the art, and operational data such as costs of charging for a given charging type or charging provider. Further data fields 2475N and 24750 are possible.

FIG. 26 is a flow or process diagram of a method of optical charging. The method starts at step 2604 and ends at step 2644.

After starting at step 2604, at step 2608 the method queries as to whether charging is available by the optical charging station 2410. That is, a query is made as to whether the optical charging station 2410 is able to provide a charging service to a receiving vehicle 2450. If NO, the method proceeds to step 2644 and ends. If the result of the query of step 2608 is YES, the method proceeds to step 2612 wherein notice is provided that charging is available. The notice may comprise targeted communications e.g. by texting to potential receiving vehicles 2450 within a selectable distance. The content of the notice may comprise: the availability of charging, and terms and conditions of charging (cost, payment types, amount available, duration of charging time, etc.). The notice may comprise a physical mounted advertisement (eg a lighted sign on optical charging station 2410) that charging is available. The notice may be through wireless advertisement, e.g. via a smartphone app available to potential receiving vehicles 2450.

At step 2616 a query is made as to whether a particular receiving vehicle 2450 has requested or requires or seeks a charge. Note that controller 610 may monitor a state or status of charging (e.g. battery is charged at 32%, or battery charging level drops below a selectable threshold value e.g. below 10%) of the energy storage unit 612 of receiving vehicle 2450 to determine if charging is recommended or required. A user, such as a driver or passenger, may also request that the vehicle be charged. If NO, the method proceeds back to step 2612. If YES, the method proceeds to step 2620.

At step 2620, a query is made as to whether the receiving vehicle 2450 is configured to receive the charging from optical charging station 2410. Such a query may be facilitated by communications between vehicle "smart" control systems aboard one or both of receiving vehicle 2450 and optical charging station 2410, comprising communications between controller 610 of vehicle 2450 and controller 622 of optical station 2410. Note that incompatibilities may include min/max energy transfer thresholds (e.g. voltages) and electrical or mechanical incompatibilities (of, e.g., antenna 2454 or PV array 2456 and incoming signal 2430). If the query answer is a NO, the method proceeds to step 2612. If YES, the method proceeds to step 2624 wherein the receiving vehicle 2450 selects an optical charging type. After completing step 2628, the method 2600 proceeds to position a receiver (one or more of antenna 2454 and PV array 2456) to receive the signal 2430 (and in some embodiments, also transmit a signal 2460). The method 2600 then continues to step 2632.

At step 2632, the optical station (emitted) signal 2430 is tuned and/or calibrated. That is, emission or broadcast or transmission characteristics of the signal 2430 are optimized or tuned for, among other things, atmospheric conditions between optical station and receiving vehicle, type of receiver on receiving vehicle (eg PV array or antenna), and transmission distance (to set, e.g. power level). Similarly, additionally or alternatively, the receiving vehicle may tune receiver characteristics (e.g. signal/noise ratio of receiver) so as to more effectively or optimally receive signal 2430. In some embodiments, an initial lower-power track illuminating laser is used to determine the target vehicle's range and provide initial information on the atmosphere through which the main power (second, power charging) beam is being transmitted. The illuminating laser tracks the target and provides aiming data for the later primary (power charging) beam. The second higher-power beam (e.g. a higher power laser beam) may also be configured to reflect light from the target (perhaps with aid of a reflective corner or other known target reflector) to provide data on the rapidly changing characteristics of the atmosphere along the path of the laser beam. In one embodiment, these data are used to control a set of deformable mirrors of the optical charging station antenna 2424, as controlled by the antenna controller 2422. The mirrors introduce tailored distortions into the laser beam to compensate for atmospheric distortions and allow the laser beam to fall on the target at the intended location (the location being the vehicle receiver, e.g. antenna 2454 and/or PV array 2456). The method 2600 continues to step 2636 wherein the optical charging station 2410 emits or transmits the signal 2430 wherein the signal 2430 is received by the vehicle 2450. The method continues to step 2640.

At step 2640, the vehicle 2450 is charged. More specifically, vehicle receiver, such as antenna 2454 and/or PV array 2456, receives signal 2430, and processes the signal prior to providing to converter 2458. the converter 2458 provides any conversion required to the received signal from the vehicle receiver so as to provide an electrical charge to the energy storage unit 612. The method 2600 ends at step 2644.

Figure 27:
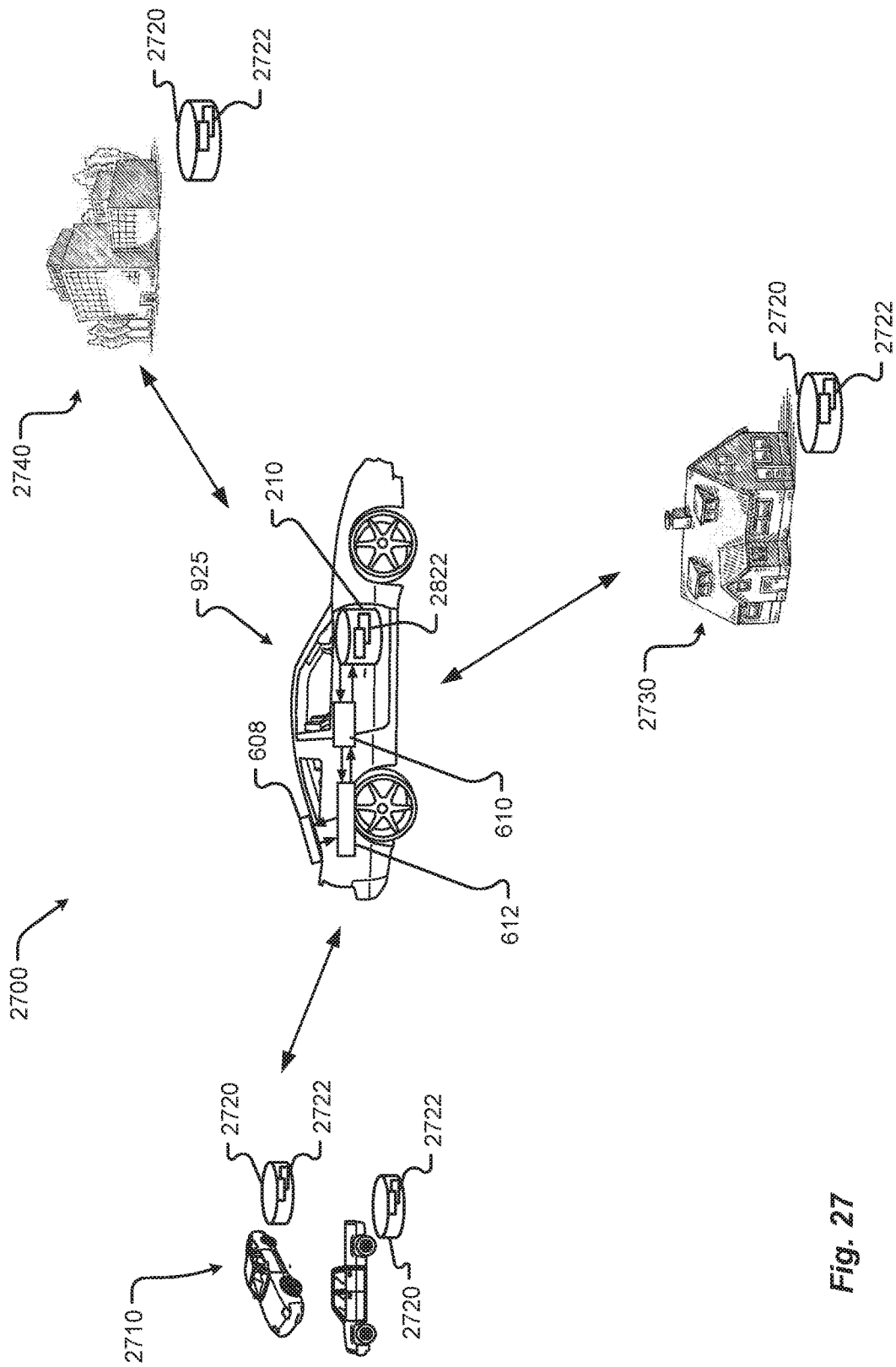
FIG. 27 shows a vehicle in a charge exchange environment in accordance with embodiments of the present disclosure.
Figure 28A:
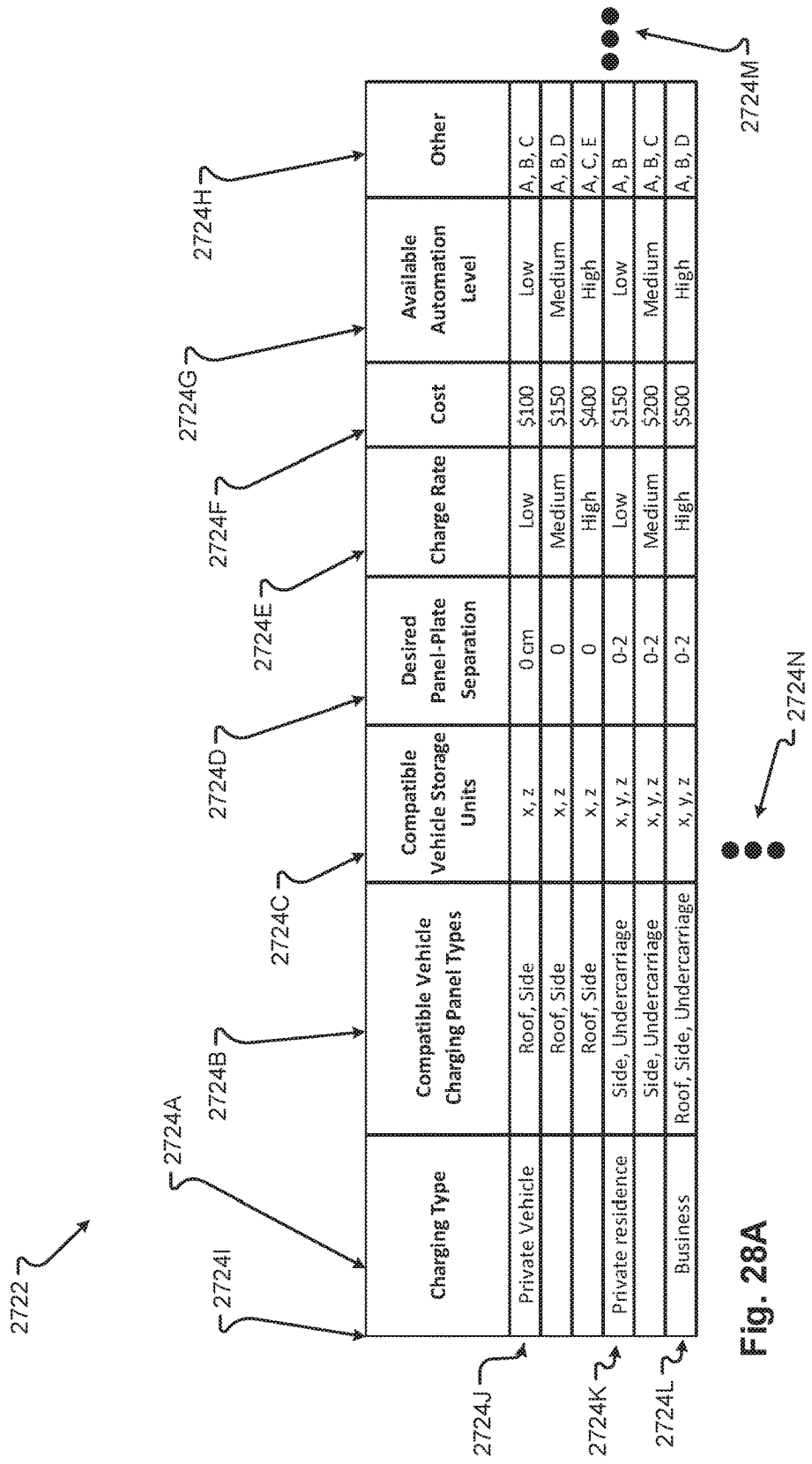
FIG. 28A is a diagram of an embodiment of a data structure for storing information about an external charging source in a charge exchange environment.
Figure 28B:
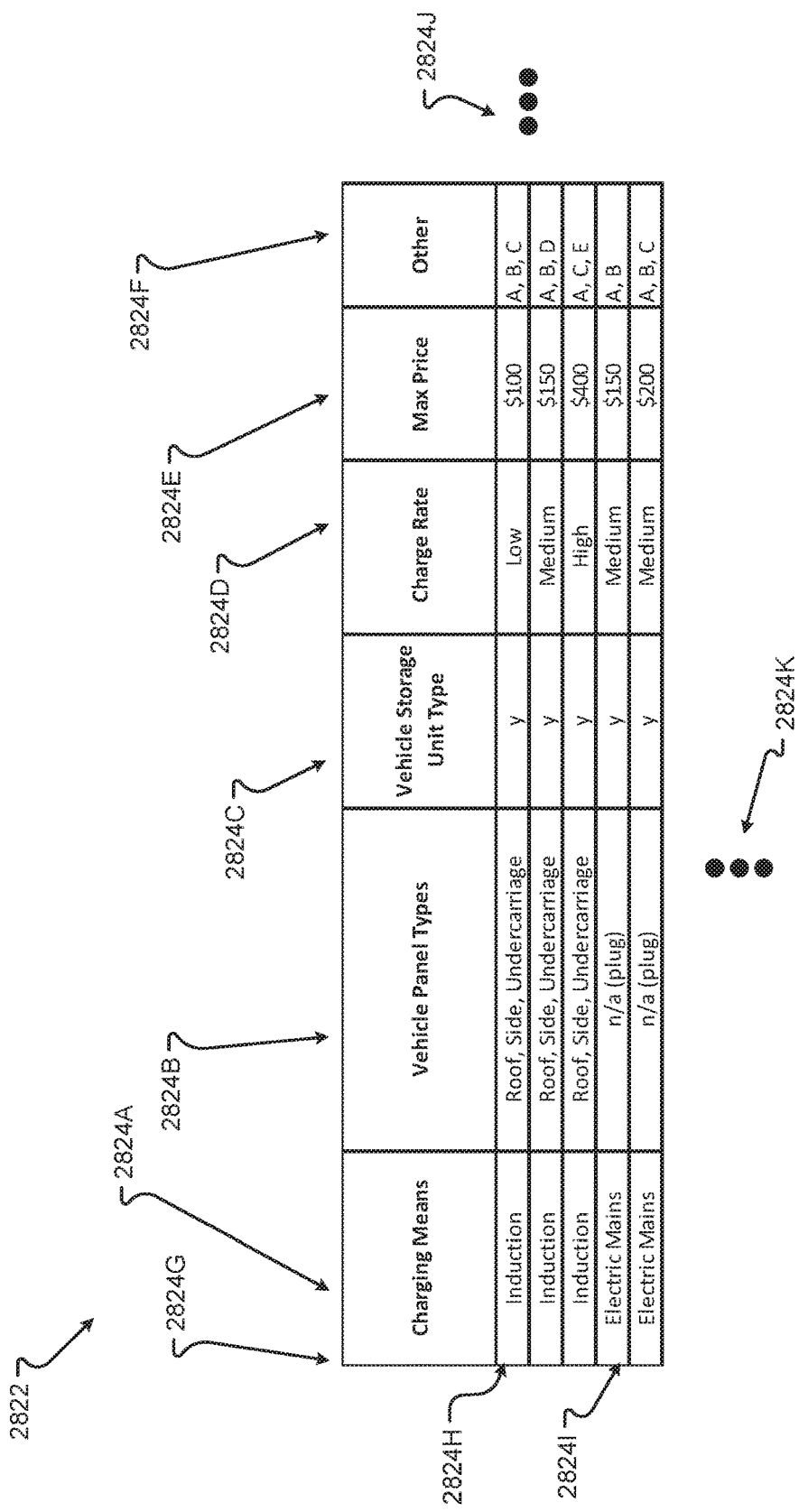
FIG. 28B is a diagram of an embodiment of a data structure for storing information about a receiving vehicle in a charge exchange environment.
Figure 29:
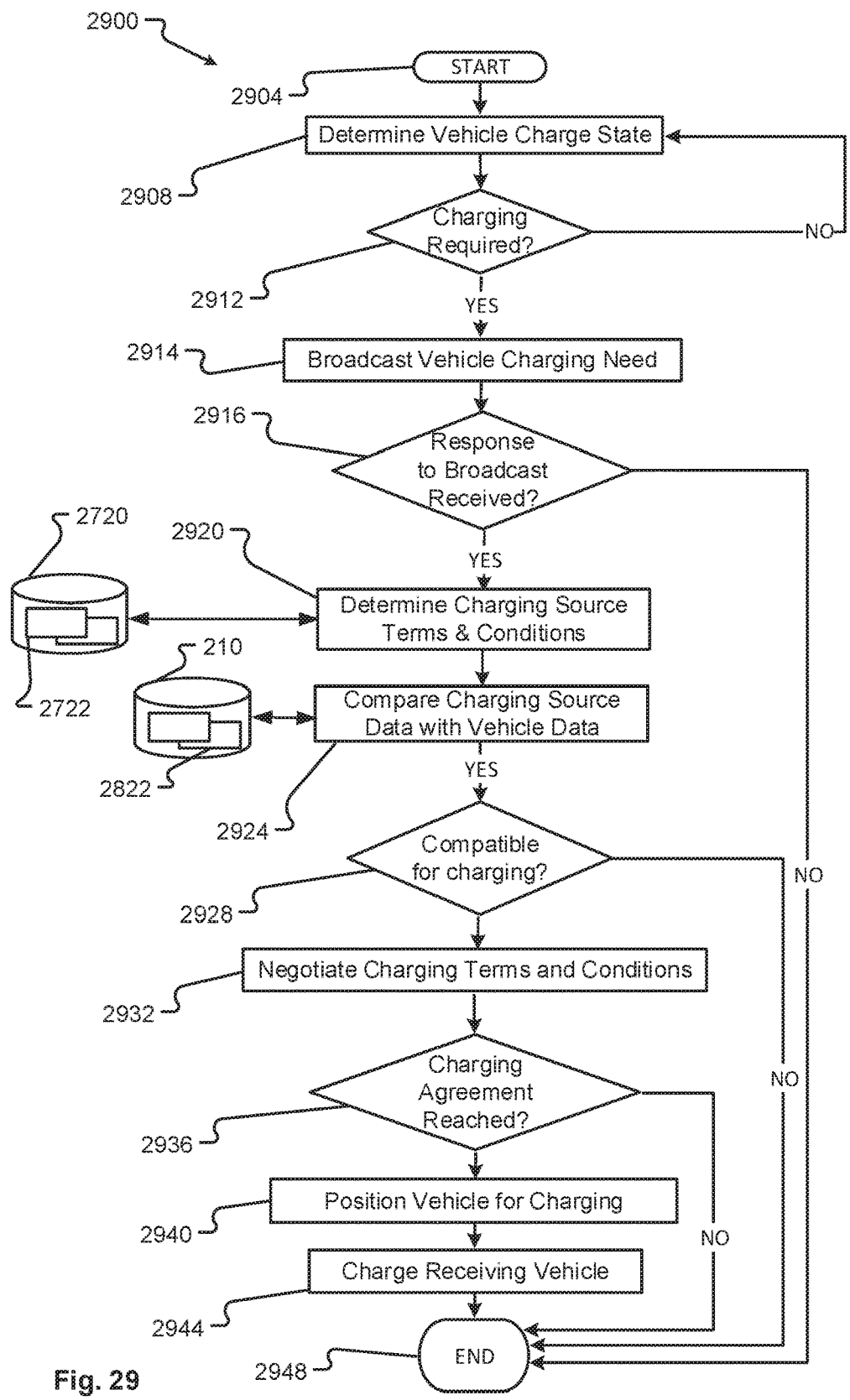
FIG. 29 is a flow or process diagram of a method of charge exchanging.

A system and method for a vehicle charge exchange system and method of use are presented in FIGS. 27-29. Generally, participating entities, such as a pair of vehicles, are able to negotiate and exchange charging services with one another for financial compensation.

FIG. 27 shows a receiving vehicle 925 in a charge exchange environment. The vehicle 925 is an electric vehicle comprising vehicle database 210 with data structures 2822, charging panel controller 610, energy storage unit 612 and charging panel 608. As disclosed above, e.g. with respect to FIG. 7, charging panel 608 is configured to receive a charge (e.g. through induction) and is interconnected to energy storage unit 612 and/or panel controller 610. Panel controller 610 may position panel 608 to receive charging, and may interact with database 210 to query data residing in data structure 2822.

Receiving vehicle 925 interacts and communicates with external parties or entities that may be capable of participating in a charge exchange. Stated another way, receiving vehicle 925 interacts with other participants in a charge swapping system wherein electrical charging services are exchanged, sold, bought or otherwise traded. Although the disclosure focuses on receiving vehicle 925 receiving a charging service from an external entity, in some embodiments, the receiving vehicle provides a charging service to external entities. The external entities (external with respect to the receiving vehicle 925) may comprise other vehicles, i.e. vehicle charging sources 2710, a home charge source 2730, and a business charge source 2740. A vehicle charge source 2710 may be as described with respect to FIGS. 20-23. Other charge sources are possible, e.g. rail or train sources and nautical sources such as ferries, wherein a vehicle may receive a charge while in transit onboard or within a train or ferry. In one embodiment, the external charge source is as described with respect to FIGS. 24-26. Each participant in the charge exchange system 2700 has access to or maintains a charge source database 2720 with associated charge source data structure. In some embodiments, a particular charge source participant may maintain an associated charge source database by any means known to those skilled in the art, to include as software as a service or through cloud services.

With attention to FIG. 28A, an exemplar embodiment of a data structure for storing information about an external charging source in a charge exchange environment is depicted. The charge source data structure 2722 are stored in charge source database 2720 and accessible in any of several means, comprising by a controller or microprocessor associated with the charging source (e.g. associated with the vehicle charging source 2710, home charge source 270 and business charge source 2740). The data contained in charge source data structure 2722 enables, among other things, for the negotiation of charging terms and conditions between the receiving vehicle 925 and one or more of the external charging sources. The data contained in charge source data structure 2722 also enables other functions, such as availability of a particular charging entity and compatibility or ability of a particular charging entity to provide a charge to a receiving vehicle.

Exemplar data stored in charge source data structure 2722 may comprise charging type 2724A, such as private vehicle (e.g. vehicle charging source 2710), private residence (e.g. home charge source 2730) and business (e.g. business charge source 2740). A compatible vehicle charging panel type is identified in element 2724B (where roof, side, lower reference receiving vehicle locations that may be serviced or charged by, ie are compatible with, a charging type of 2475A).

Data field 2724C provides compatibility with vehicle storage unit data, i.e. data so as to provide types of receiving vehicle energy storage units 612 that are able or configured to receive energy or power or charging for a given charging type 2724A. A desired panel-plate separation distance range is provided as data field 2724D. Such a separation distance between the charging panel 608 of vehicle 925 and a charging means of an external charging source (e.g. a charging plate of a particular charging source) may be facilitated by a separation distance sensor as disclosed above with respect to other embodiments. Note that a separation distance 2724D of zero (0) indicates that charging panel 608 of vehicle 925 and the charging means of an external charging source are in physical contact. Charge rate 2724E may be set to numerical values or a qualitative value (e.g. low, medium, high which may correspond to a charging transmission level).

A charge cost 2724F may be to fully charge a vehicle 925 at charge rate 2724E. The available automation level 2724G provides associated automation levels for given data parameters (e.g. for a given charge rate 2724E). An automation level of "low" may indicate that a user (either associated with vehicle 925 as e.g. a driver or passenger) or charging provider operator (e.g. robotic unit operator as used, e.g. in business charge source 2740) must manually maneuver its charging means (e.g. a charging plate via a robotic unit arm to a desired panel-plate separation distance 2724D). A "high" level of automation may indicate that once the vehicle 925 is positioned relative to a robotic unit, e.g., and charging is indicated as desired (e.g. by vehicle user), charging is performed automatically with aid of one or both of charging panel controller 610 and/or an external charging source/provider controller.

The Other data type of 2724H may comprise other data items involved in electrical charging such as voltage levels, current values, etc as known to those skilled in the art, and further operational data such as status of the particular charging entity, i.e. indications as to the charging system is operational and available to provide charging to vehicle 925, or indications that the particular charging system or entity is not available for charging a vehicle 925, such as caused by maintenance demands. Further data fields 2724M and 2724N are possible.

With attention to FIG. 28B, an exemplar embodiment of a data structure for storing information about a receiving vehicle 925 in a charge exchange environment is depicted. The receiving vehicle data structure 2822 are stored in vehicle database 210 and accessible in any of several means, comprising by controller 610. The data contained in receiving vehicle data structure 2822 enables, among other things, for the identification of available external charging sources and for the negotiation of charging terms and conditions between the receiving vehicle 925 and one or more of the external charging sources.

Exemplar data stored in receiving vehicle data structure 2822 may comprise charging means 2824A, such as by induction 2824H or electric mains 2824I. Vehicle panel types 2824B identifies available receiving vehicle panel types that are available for a particular charging means. For example, the receiving vehicle 925 includes roof, side and undercarriage charging panel 608 types to enable or allow charging by induction means. Vehicle storage unit type 2824C identifies the type of electric charge storage device of the receiving vehicle, such as a type "y" which may indicate a certain brand and/or model of lithium battery, for example. Charge rate 2824D and maximum price 2824E are charge rate or duration values with respect to pricing targets, respectively, established by the receiving vehicle owner, user and/or occupant. Such values allow an initial comparison or appraisal to be performed between a receiving vehicle's user (who is seeking charging) and rates/pricing advertising by a particular charging entity.

The Other data type of 2824F may comprise other data items involved in electrical charging such as voltage levels, current values, etc as known to those skilled in the art, and further operational data such as negotiating parameters or negotiating limits. For example, a user may store data that indicates that he is willing to pay up to 25% more than his maximum price value 2824E.

The data structures of FIGS. 28A and B may be combined and may co-exist in one or both of the receiving vehicle 925 and one or more of the external charging sources.

FIG. 29 is a flow or process diagram of a method of charge exchange. The method starts at step 2904 and ends at step 2948. At step 2908, the method determines the state of charge of the receiving vehicle 925, that is, the charge level of the battery or batteries of receiving vehicle 925. Such a status may be obtained by way of one or more sensors interconnected to the one or more batteries of vehicle 925, and may be monitored by vehicle controller 610. At step 2912, a query is made as to whether charging is required. The status data of step 2908 may be compared against a stored, user-selectable threshold value of battery charge level required to trigger a request for charging. For example, a battery below 20% full charging level may trigger a declaration that the battery is in need of charging. If the result of step 2912 is No, the method 2900 moves to step 2908 wherein the battery charging levels continues to be monitored. Alternatively, the method 2900 may proceed to step 2948 and end. If the result of step 2912 is Yes, the method 2900 proceeds to step 2916.

At step 2914, the method 2900 broadcasts a need for charging. Such a broadcast may comprise any of several means known to those skilled in the art, to include broad omnidirectional broadcasting by an electronic transmitter of frequency monitored by potential charging entities. Alternatively, or additionally, the broadcast may be a targeted broadcast or communication directed to identified or pre-listed or pre-authorized providers of a charging service. In another example, the broadcast may be to a third party service provide who receives a communication that charging is needed and routes the need to a selected set of potential charging providers. The method 2900 then continues to step 2916.

At step 2916, the method 2900 queries as to whether any responses to the broadcast of step 2914 have been received. If No, meaning no responses to the broadcast of the need for charging have been received, the method 2900 ends at step 2948. Alternatively, the method 2900 may return to step 2914 and re-broadcast the need for charging. In such an alternative, a time delay may be implemented between lack of receipt of response and re-broadcast. If the answer to the query is Yes, the method 2900 proceeds to step 2920.

At step 2920, for each external charging source associated with a particular received response to the broadcasted need for charging of step 2914, a determination of external charging source terms and conditions is made. That is, each database 2720 of each interested charging source (e.g. 2710, 2720 and/or 2740) is accessed or queried to access charging terms and conditions, such as the data types described with respect to FIG. 28A. For example, step 2920 may query the database of an identified home charge source 2730 to determine cost 2724F for a given charge rate 2724E (e.g. $200 at medium rate, respectively), and to obtain compatible vehicle storage units 2724C and compatible charging panel types 2724B for a given charging type (e.g. units x, y and z via side and undercarriage panels for induction charging, respectively).

At step 2924, a comparison is made between the charging source data of step 2920, and the receiving vehicle data stored in vehicle database 210 (comprising data structures 2822) to determine if the receiving vehicle 925 and the particular charging source are compatible (as distinguished from financially agreeable). Continuing the above example, the receiving vehicle 925 database 210 is accessed to identify that for charging by induction at medium charge rate, the receiving vehicle may be charged by any of roof, side or undercarriage panel types, and is willing to pay $150. As such, while the panel types are physically and/or electrically) compatible (i.e. charging may be performed via side or undercarriage), the maximum price set by the receiving vehicle ($150) is below the cost nominally set by the charging entity (i.e. of $200). As such, the result of the query of step 2924 in this example would be Yes, as charging may occur between the vehicle 925 and the charging source. If the result of step 2928 is No, the method 2900 ends at step 2948. If the result is Yes (as in the example presented), the method 2900 proceeds to step 2932.

At step 2932, the vehicle 925, by any of several means, negotiates any unmatched terms or conditions identified through step 2822. That is, any terms or conditions, outside of compatibility issues (of, e.g. electrical or mechanical interoperability issues), are negotiated. The negotiation may be by any of several means, to include, for example, automatically via respective controllers disposed on the two parties or otherwise interconnected with the two parties. The negotiation may also, for example, be manual between the parties, e.g. via text messaging. Continuing the above example, the $50 price difference between the vehicle 925 price ($150) for charging versus the listed cost ($200) for charging are negotiated. The method 2900 then proceeds to step 2936.

At step 2936, the method 2900 queries as to whether agreement was reached by way of step 2932. That is, were the parties able to reach agreement on terms and conditions to enable receiving vehicle 925 to receive a charge from the external charging entity? If the result is No, the method 2900. If the result is Yes, the method proceeds to step 2940. (In the above example, if the parties negotiated to a price of $170, then agreement was reached and step 2936 is Yes).

At step 2940, the receiving vehicle 925 is positioned for charging by external charging source. Such positioning may require simply parking over a charging spot when receiving charging, e.g., by a business charge source 2740 by way of induction through vehicle panel mounted on vehicle undercarriage, or more elaborate positioning of panel 608 from vehicle roof to enable moving vehicle to moving vehicle charging (as described above). After the positioning of step 2940, the method 2900 proceeds to step 2944. At step 2944, charging is provided to receiving vehicle 925 from external charging source and the method 2900 proceeds to step 2948, wherein the method 2900 ends. Note that payment by receiving vehicle 925 to charging source may be provided, e.g., after an affirmative result to step 2936. That is, once a charging agreement is reached, financial payment (via any of several means, to include electronic funds transfer) may be provided. Payment may alternately be paid, e.g., after the charging is receiving at step 2944, and/or once the vehicle is positioned for charging at step 2940. Partial payment at any combination of the above steps is also possible.

Figure 30:
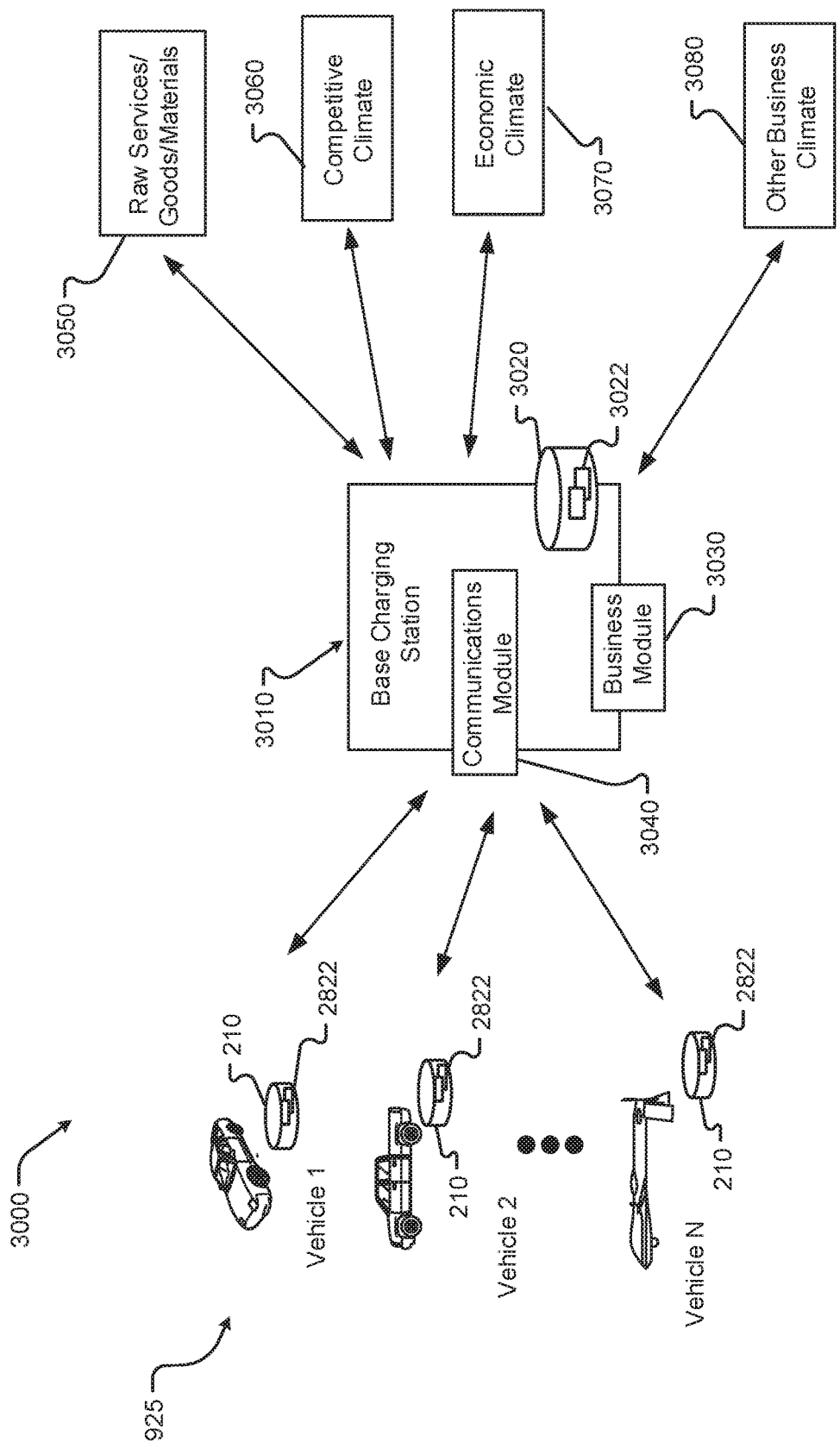
FIG. 30 shows a group charging environment in accordance with embodiments of the present disclosure.
Figure 31:
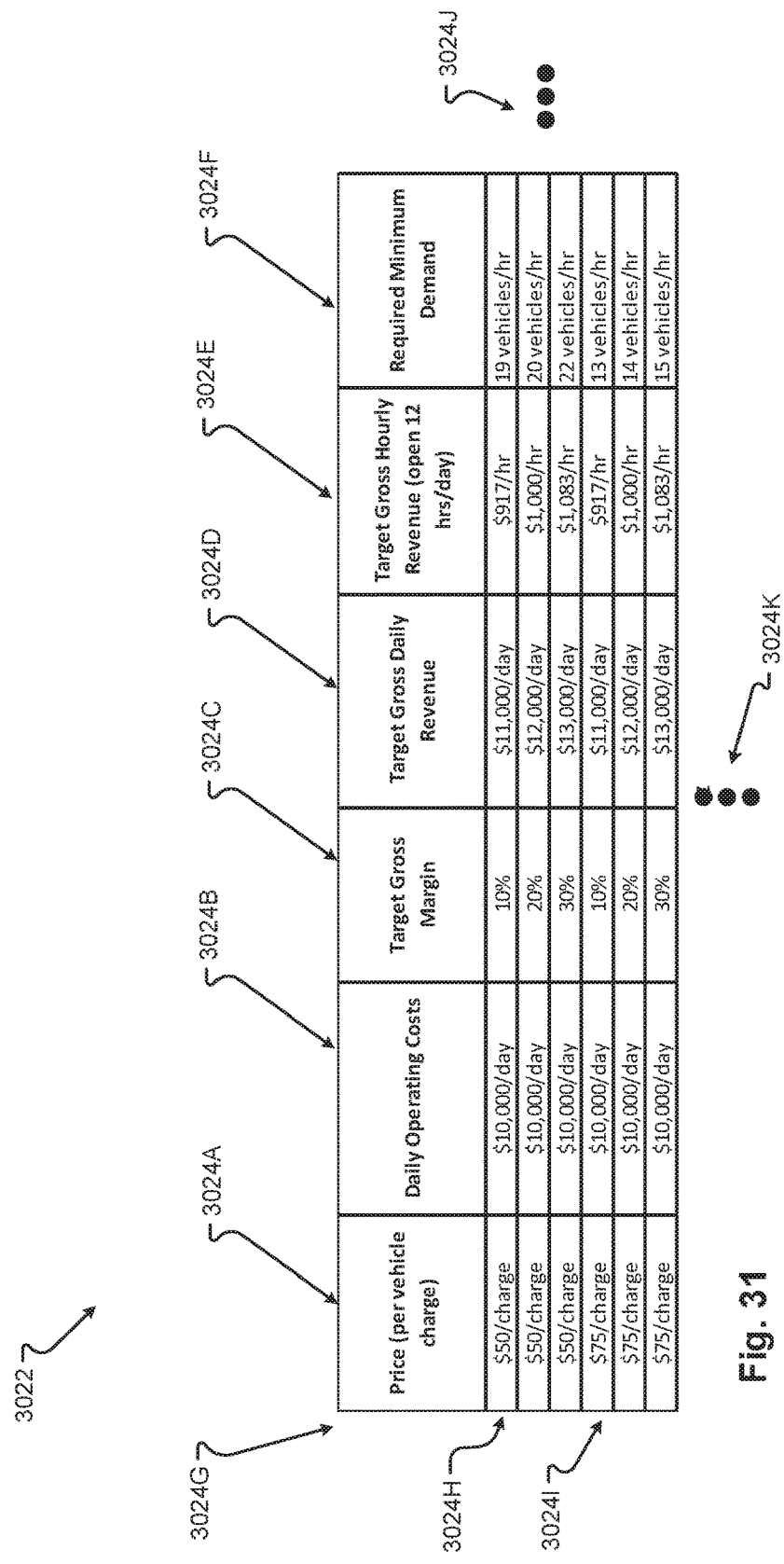
FIG. 31 is a diagram of an embodiment of a data structure for storing information about a group charging environment.
Figure 32:
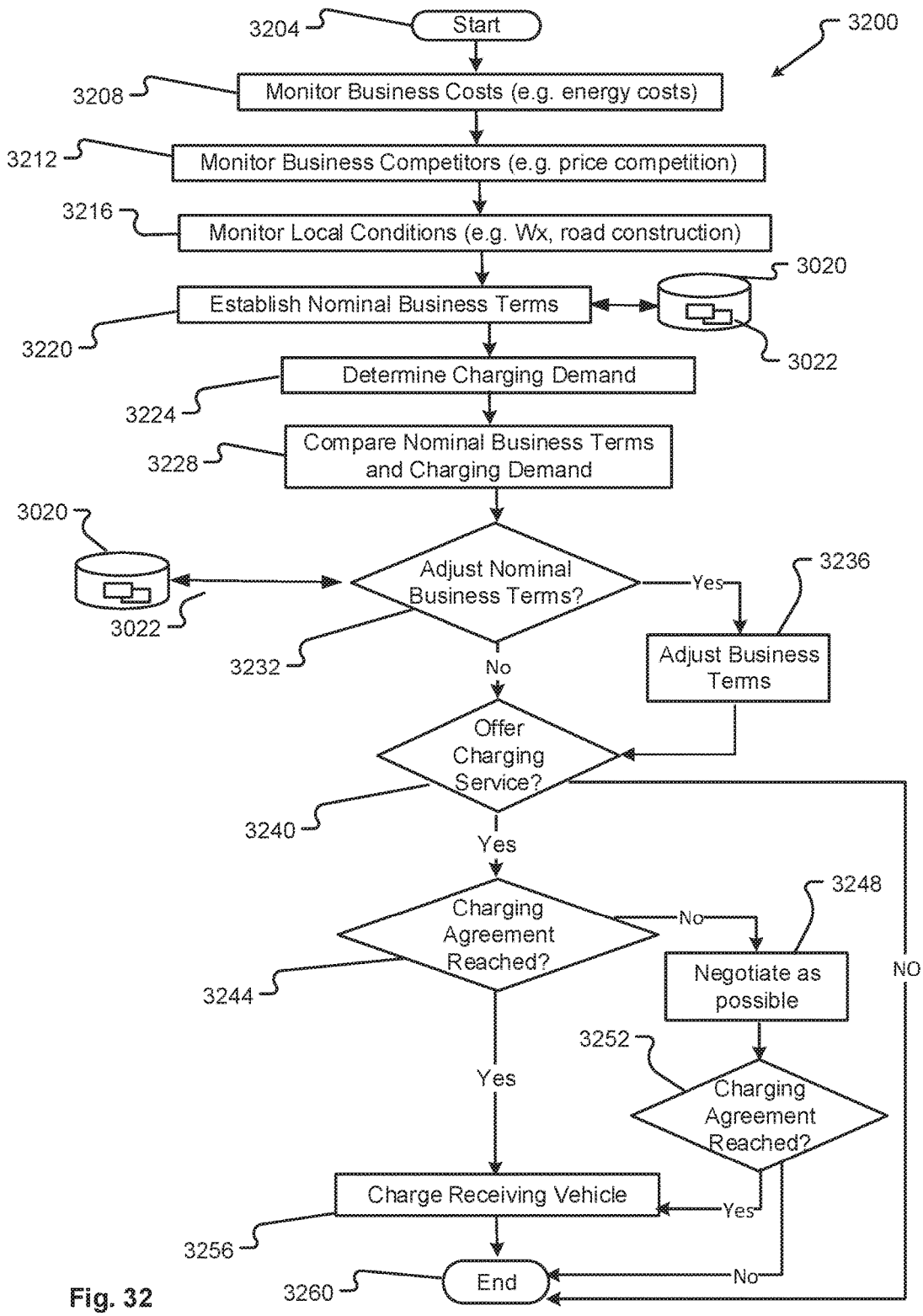
FIG. 32 is a flow or process diagram of a method of group charging.

A system and method for a vehicle group charging system and method of use are presented in FIGS. 30-32. Generally, participating entities, such as one or more charge receiving vehicles, are able to receive charging from a base charging station; the base charging station determining whether a charging service is available based on business conditions, to include the receiving vehicle demand for the charging service.

FIG. 30 shows a vehicle group charging system 3000 comprising a base charging station 3010 and a plurality (numbered 1-N) of receiving vehicles. The term "receiving vehicles" here is broadly defined to mean any means of transportation to include, without limitation, automobiles, land vehicles such as semi-tractor trailers and motorcycles, airborne vehicles to include unmanned aerial vehicles and drones, and sea-borne vessels including any pleasure watercraft. The base charging station 3010 comprises base station database 3020 (comprising base station data structure 3022), communications module 3040 and business module 3030. The communications module 3040 is configured to communicate with the one or more receiving vehicles 925, each comprising database 210 and data structure 2822. The communications module 3040 may broadcast an omnidirectional signal, transmit/receive a directed signal to/from one or more receiving vehicles, or communicate (unidirectional or bidirectional) in any of several means known to those skilled in the art. The base charging station 3010 also monitors one or more sources of business intelligence and/or business conditions to determine or establish business terms and conditions of a charging service (e.g. to set pricing terms). The base charging station 3010 may communicate with or monitor raw services/goods/materials 3050, competitive climate 3060, economic climate 3070 and other business climate 3080 conditions. The raw services/goods/materials 3050 monitored may include energy prices such the cost of electricity and labor cost. Labor cost may be essentially static so as not to require active monitoring, by may be dynamic (and thus require monitoring) if, e.g. the base charging station 3010 employs "on-demand" workers who are scheduled on a just-in-time basis. The competitive climate 3060 may include terms and conditions of competitors, e.g. a nearby charging station that is offering a discount to first-time customers or suffering labor unrest, either of which may influence the pricing or other terms of the base charging station 3010. The economic climate 3070 may include macro-economic conditions (e.g. are electricity prices expected to generally increase by x % over the coming y months, are wages declining, etc) and micro-economic conditions (e.g. the local demand for charging over a coming weekend). Other business climate 3080 may include any influences known to businesses when setting terms and conditions for providing a charging service. Among other things, the base charging station 3010, via the business module 3030, determines terms and conditions for a charging service, comprising determining or setting nominal or baseline terms and conditions (e.g. pricing) but also setting dynamic pricing as a functions of one or more of the above-identified factors. The base charging station 3010 may employ econometrics to set one or more terms and conditions of pricing.

FIG. 31 is a diagram of an exemplar embodiment of a base station data structure 3022 for storing information about a base charging station 3010 in a group charging system environment. The base station data structure 3022 are stored in base station database 3020 and accessible in any of several means, comprising by a base station controller. The data contained in receiving base station data structure 3022 enables, among other things, for the determination, establishment, changing or alternation and negotiation of charging terms and conditions between the receiving vehicles and the base charging station 3010. The data will change with calculations of the business module 3030.

Price per vehicle charge is provided as 3024A, as depicted in FIG. 31 at $50/charge of 3024H or $75/charge of 3024I. Daily operating costs are provided as 3024B, and target gross margin as 3024C. Target gross daily revenue is 3024D, as is computed by adding the gross margin of 3024B to the daily operating costs (e.g. 10% margin or profit is 10% more than daily operating cost of $10,000 yields 1.10×$10,000=$11,000). Target gross hourly revenue is target gross daily revenue divided by 12 hours/day (e.g. $11,000/12=$917/hr). The target gross hourly revenue would readily be adjusted for longer or shorter operating times of the base charging station. The required minimum demand of vehicles is the target gross hourly revenue 3024D divided by the price per vehicle 3024A rounded up to the nearest integer, e.g. ($917/hr)/($50/vehicle)=19 vehicles/hr. Thus, for the base charging station to meet its business objectives, as presented in the exemplar data structure 3022, requires 19 or more vehicles to receive the charging service. Below 19 vehicles per hour, and the business objectives will not be meet, and the charging service may not be offered. Conversely, above 19 vehicles per hour, and the business objectives will be met, and the charging service would likely be offered. Other data parameters or metrics are possible, as indicated as 3024J and 3024K. Note that the above are exemplary data representations and calculations—many other possibilities are available and contemplated by the invention and form other embodiments, and are not discussed explicitly here solely for brevity.

FIG. 32 is a flow or process diagram of a method of group charging 3200. The method starts at step 3204 and ends at step 3260. The steps are notionally followed in increasing numerical sequence, although, in some embodiments, some steps may be omitted, some steps added, and the steps may follow other than increasing numerical order. At steps 3208, 3212 and 3216, various terms or conditions are monitored to enable business terms to be determined at step 3220. Such costs may be monitored internally and/or externally. More specifically, business costs are monitored at step 3208, such as energy costs (e.g. electricity) and labor costs, and internal business costs such as upkeep and maintenance. Step 3212 follows after step 3208. At step 3212, business competitors are monitored, e.g. competitors offering similar charging services are monitored as to pricing, special promotional terms, or business difficulties (e.g. a labor action, breakdown in equipment, etc.). Step 3216 follows after step 3212. Local conditions are monitored at step 3216, e.g. weather conditions (which may reduce receiving vehicle demand in case of rain, or increase demand in case of a predicted snowstorm). Other conditions may also be monitored, as known to those skilled in the art. Step 3220 follows after step 3216. At step 3220, in coordination with data of the base charging station database 3020, the above monitored conditions and associated data are considered, in whole or in part or in any combination thereof, to set nominal charging service terms and conditions. The method 3200, after step 3220, proceeds to step 3224.

At step 3224, charging demand is determined, i.e. the number of receiving vehicles requesting charging service and/or querying the charging base station for charging service is determined. The demand may be allotted into time tranches, e.g. demand tranches covering 60 minute periods. The method continues to step 3228, wherein the charging demand determined at step 3224 is compared with the nominal business terms established at step 3220. The comparison may determine which charging requests from receiving charging vehicles have an associated price for charging service at or above the nominal price set by the base charging station, and those that have a price below the nominal price of the base charging station (these are customer with which pricing adjustment may be performed e.g. step 3232). The method 3200 continues to step 3232.

At step 3232, the nominal business terms are considered for adjustment, e.g. pricing term of 3024A, so as to increase demand and/or to bring more receiving vehicles within the nominal charging price terms. The adjustment of terms may involve use of data stored in the base station database 3020. If the adjustment if not performed i.e. is denied, then a No response to the step 3232 query is reached and the method continues to step 3240. If it is determined that one or more terms or conditions of the nominal business terms set at step 3220 are to be adjusted, then a Yes response at step 3232 is generated and those term(s) are adjusted at step 3236 wherein afterwards the method 3200 proceeds to step 3240.

At step 3240, the base charging station 3000 queries whether charging service should be offered. If the projected revenue from the receiving vehicles does not meet business objectives (i.e. the business case does not close), the base charging station does not offer a charging service (the result of step 3240 is No) and the method 3200 proceeds to step 3260 wherein the method 3200 ends. If the business case does close, the result of step 3240 is a Yes and the charging service is offered, and the method 3200 proceeds to step 3244. At step 3244, a query is made as to whether a charging agreement was reached with the one or more identified receiving vehicles. If the result is Yes, then method proceeds to step 3256 and the identified one or more receiving vehicles are charged. If the result is No, the method 3200 proceeds to step 3248 wherein a negotiation may occur to reach a charging agreement. After step 3248, the method proceeds to step 3252 wherein as query is made as to whether a charging agreement was reached. If the answer is Yes, the method 3200 proceeds to step 3256 wherein the charge receiving vehicle is charged and the method proceeds to step 3260 wherein the method 3200 ends. If the answer is No then the method 3200 proceeds to step 3260 wherein the method 3200 ends. Any of the steps, functions, and operations discussed herein can be performed continuously and automatically.

Figure 33:
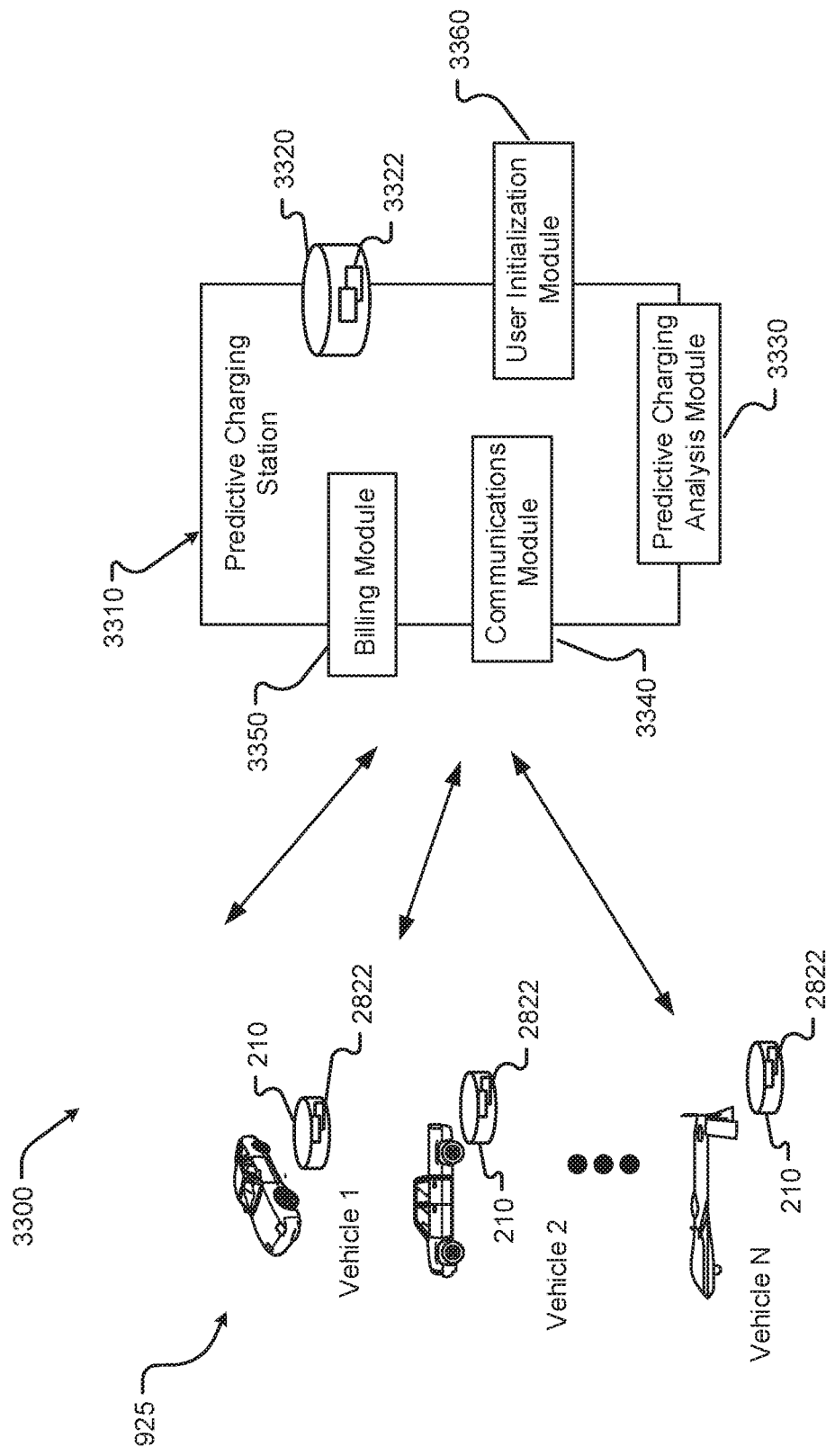
FIG. 33 shows a vehicle in a predictive charging environment in accordance with embodiments of the present disclosure.
Figure 34:
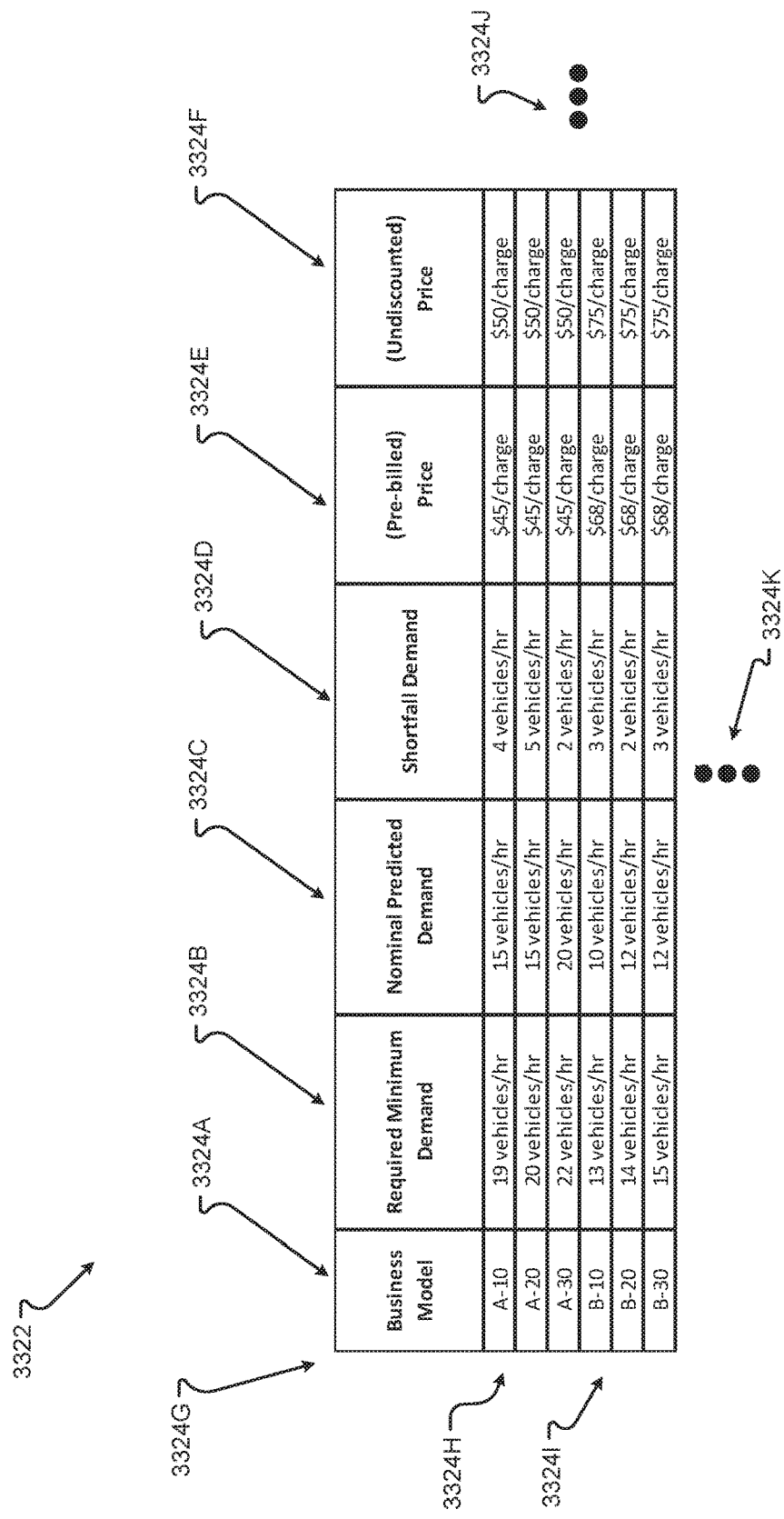
FIG. 34 is a diagram of an embodiment of a data structure for storing information about predictive charging in a predictive charging environment.
Figure 35:
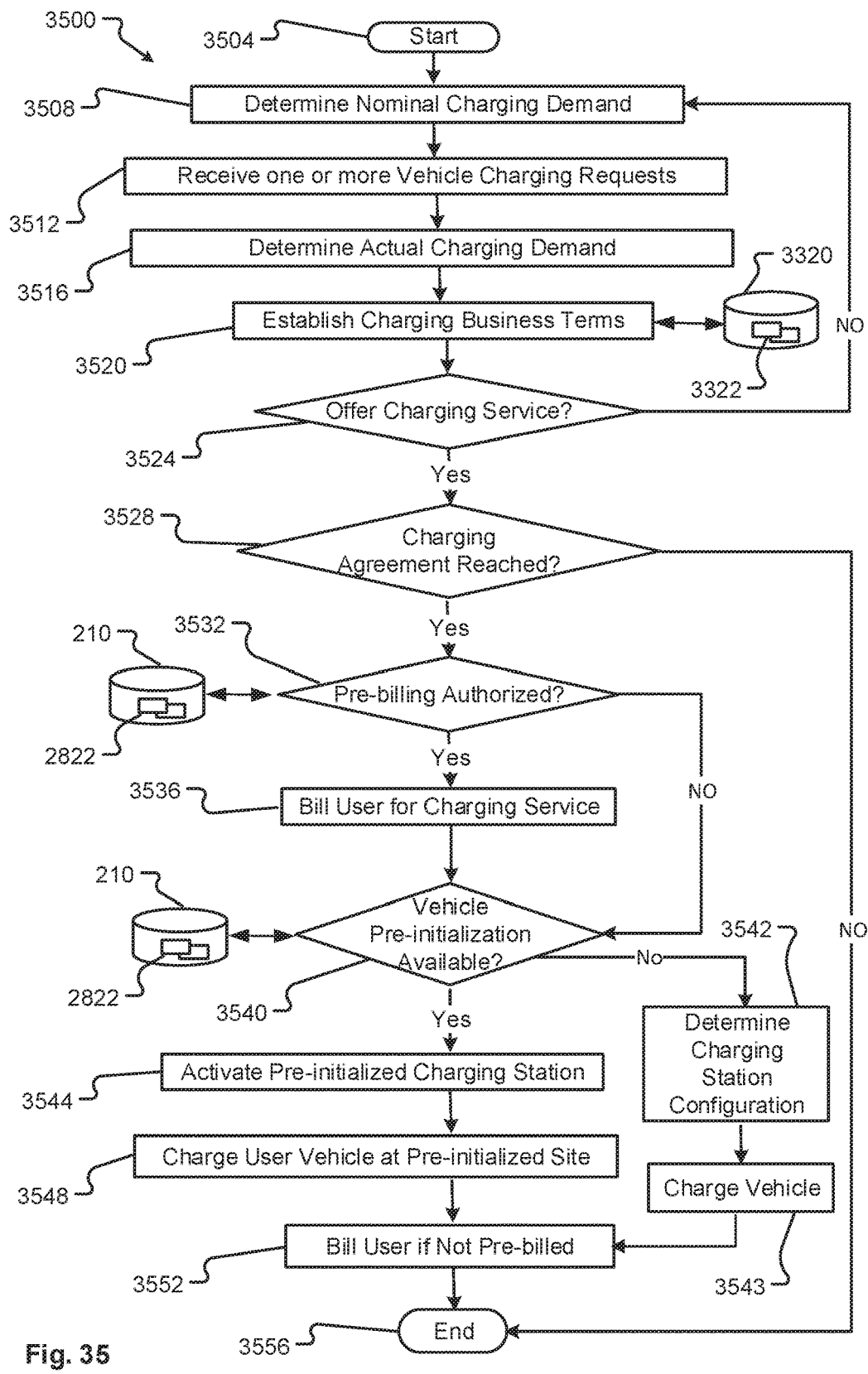
FIG. 35 is a flow or process diagram of a method of predictive charging.

A predictive charging system is disclosed with respect to FIGS. 33-35. Generally, the predictive charging system 3300 is configured to determine a demand for a charging service for a plurality of receiving vehicles 925. In some embodiments, a particular vehicle 925 may be configured to allow or authorize the charging system 3300 to pre-bill the vehicle 925 for the charging service, and/or pre-initialize a charging station site environment to allow or enable the vehicle 925 to receive charging automatically upon positioning at a charging station site.

With attention to FIG. 33, a predictive charging system 3300 comprising a plurality of receiving vehicles 925 (numbered 1-N) and a predictive charging station 3310 is depicted. The term "receiving vehicles" here is broadly defined to mean any means of transportation to include, without limitation, automobiles, land vehicles such as semi-tractor trailers and motorcycles, airborne vehicles to include unmanned aerial vehicles and drones, and sea-borne vessels including any pleasure watercraft.

The predictive charging station 3310 comprises predictive charging database 3320 (comprising predictive charging data structure 3322), predictive charging analysis module 3330, predictive charging communications module 3340, predictive charging billing module 3350 and predictive charging user initialization module 3360. The communications module 3340 is configured to communicate with the one or more receiving vehicles 925, each comprising database 210 and data structure 2822. The communications module 3340 may broadcast an omni-directional signal, transmit/receive a directed signal to/from one or more receiving vehicles, or communicate (unidirectional or bidirectional) in any of several means known to those skilled in the art.

The predictive charging station 3310, by way of analysis module 3330, determines charging demand. The charging demand may comprise a nominal demand, as predicted by one or more sources of business intelligence and/or business conditions. The nominal demand may be adjusted to account for real-time or updated or actual demand data, such as queries from one or more vehicles 925 that a charging service is desired. The predictive charging station 3310 may, in some embodiments, employ some or all techniques or means as that of the group charging system 3000 discussed above.

Functions of the billing module 3350 comprise determining pricing for the charging service, determining if a particular vehicle 925 may be pre-billed for a charging service, and determining if a particular vehicle 925 is capable or configured to receive pre-initialized charging. Pre-initialized charging may comprise the ability of a vehicle to automatically receive a charging service when the vehicle enters a certain defined physical location site. For example, a stretch of roadway may be configured to provide a charging service while a vehicle is traversing that stretch of roadway; a pre-initialized vehicle will automatically receive charging when it travels that particular stretch of roadway. Similarly, a designated fixed charging station/pad may provide automatic charging service to a particular pre-initialized vehicle when that vehicle parks proximal or on the designated charging site or pad. The user initialization module 3360 may determine if a particular vehicle 925 is capable or authorized or configured for pre-initialization. The predictive charging station 3310 may further comprise predictive charging database and predictive charging data structure 3322 to, among other things, set pricing and determine demand.

FIG. 34 is a diagram of an exemplar embodiment of a predictive charging data structure 3322 for storing information about a predictive charging station 3310 in a predictive charging system environment. The predictive charging data structure 3322 data are stored in predictive charging database 3320 and accessible in any of several means, comprising by a predictive charging system controller. The data contained in predictive charging data structure 3322 enables, among other things, for the determination, establishment, changing or alternation of charging demand and setting or negotiation of charging terms and conditions between the receiving vehicle(s) and the predictive charging station 3310. The data will change with, for example, calculations of the analysis module 3330.

Business model data are provided as 3324A, as depicted in FIG. 34 as A-10, A-20 and A-30 (as 3334H) and B-10, B-20 and B-30 (as 3334I). A business model of A-10 may equate to a model wherein margin is targeted or set at 10%, and pre-billed price of $50/charge (analogous to the data described in FIG. 31 above as 3024H). Similarly, business model of B-10 may equate to a model wherein margin is targeted or set at 10%, and pre-billed price of $75/charge (analogous to the data described in FIG. 31 above as 3024I).

Required minimum demand data are provided as 3324B; these values represent minimal demand values for operation of the charging service. Below such data thresholds, the charging service may not be offered. Nominal predicted demand 3324C may be calculated or estimated by the analysis module 3330 based on factors comprising historical demand predictions and factors identified above. Shortfall demand 3324D is the numerical difference between required minimum demand 3324B and nominal predicted demand 3324C. The shortfall data value 3324D represents demand required to allow or trigger the charging service offer. Stated another way, if the shortfall demand is not present, the charging service will not be offered. Undiscounted price 3324F is a raw posted price for a charging service per vehicle. Pre-billed price 3324E is a discounted price offered to a user of a vehicle 925 that has authorized the billing of the charging service prior to the charging service being provided. Note that the above are exemplary data representations and calculations—many other possibilities are available and contemplated by the invention and form other embodiments, and are not discussed explicitly here solely for brevity.

FIG. 35 is a flow or process diagram of a method of predictive charging 3500. The method starts at step 3504 and ends at step 3556. The steps are notionally followed in increasing numerical sequence, although, in some embodiments, some steps may be omitted, some steps added, and the steps may follow other than increasing numerical order.

At step 3508, nominal charging demand is determined, in some embodiments by way of the analysis module 3330. The nominal charging demand may be determined in any of several ways, to include similar analysis and consideration as that described with respect to FIG. 32. That is, external sources of demand data may be considered (e.g. predictions of roadway usage or traffic conditions) and/or stored historical data as to demand (stored in, e.g., the predictive charging database 3320). At step 3512, the system 3300 receives one or more charging requests or queries for a charging service from one or more vehicles 925. The charging requests may be managed by the communications module 3340. At step 3516, the actual charging demand is determined, in one embodiment by the analysis module. At step 3520, the business terms for a potential or possible offering of a charging service are determined. For example, the particular business model (e.g. business model A-10 of data element 3324H) is selected, resulting in definition of additional business terms (e.g. if and what discount may be applied to pricing for pre-billing). The setting of business terms at step 3520 may comprise interaction with data stored in predictive charging database 3320.

At step 3524, the predictive charging station 3300 queries whether charging service should be offered. If the demand is insufficient (as described above), i.e. business objectives are not satisfied, the predictive charging station 3310 does not offer a charging service (the result of step 3524 is No), the method 3500 proceeds to step 3508 wherein nominal charging demand is re-calculated. If the business case does close (i.e. the demand is sufficient), the result of step 3524 is a Yes and the charging service is offered, and the method 3500 proceeds to step 3528.

At step 3528, a query is made as to whether a charging agreement was reached with the one or more identified receiving vehicles 925. If the result is Yes, then method 3500 proceeds to step 3532. If the result is No, the method 3500 proceeds to step 3556 and the method ends. In one embodiment, the step 3528 further comprises negotiation with the user of vehicle 925 to reach a charging agreement.

At step 3532, a query is made as to whether pre-billing is authorized for a particular user of a vehicle 925 seeking a charging service. The query may require engagement with the database 210 of the particular vehicle 925 to determine if pre-billing is authorized. Alternatively or additionally, the vehicle 925 may communicate that pre-billing is authorized. If pre-billing is authorized, the result of the query of step 3532 is Yes, and the method 3500 advances to step 3536 and the user of vehicle 925 is pre-billed. After step 3536, the method proceeds to step 3540. If the result is No, the method 3500 proceeds to step 3540.

At step 3540, a query is made as to whether pre-initialization is available for a particular user of a vehicle 925 seeking a charging service. The query may require engagement with the database 210 of the particular vehicle 925 to determine if pre-initialization is available. Alternatively or additionally, the vehicle 925 may communicate that pre-initialization is available. If pre-initialization is available (and, in some embodiments, the predictive charging station 3310 also has an available pre-initialization site available), the result of the query of step 3540 is Yes, and the method 3500 advances to step 3544. If the result of the query is No at step 3540, the method 3500 proceeds to step 3542. At step 3542, the charging station site configuration is determined to enable the particular vehicle 925 to receive charging. Such charging site configuration may require, for example, aligning means for charging such as by induction, or ensuring compatible electrical parameters such as amperage. Step 3542 may require engagement with vehicle database 210 and/or predictive charging database 3320. After step 3542, the vehicle 925 is charged at step 3543, wherein upon completion, the method proceeds to step 3552. At step 3544 (entered if the result of the query of step 3540 is Yes), the pre-initialized charging station is activated to enable the vehicle 925 to receive a charge, wherein the method continues to step 3548 and the vehicle 925 receives a charge. After step 3548, the method 3500 proceeds to step 3552.

At step 3552, the vehicle 925 user is billed for the charging service received, if the user was not pre-billed at step 3536. After completing step 3552, the method 3500 proceeds to step 3556 and ends. Any of the steps, functions, and operations discussed herein can be performed continuously and automatically.

Figure 36:
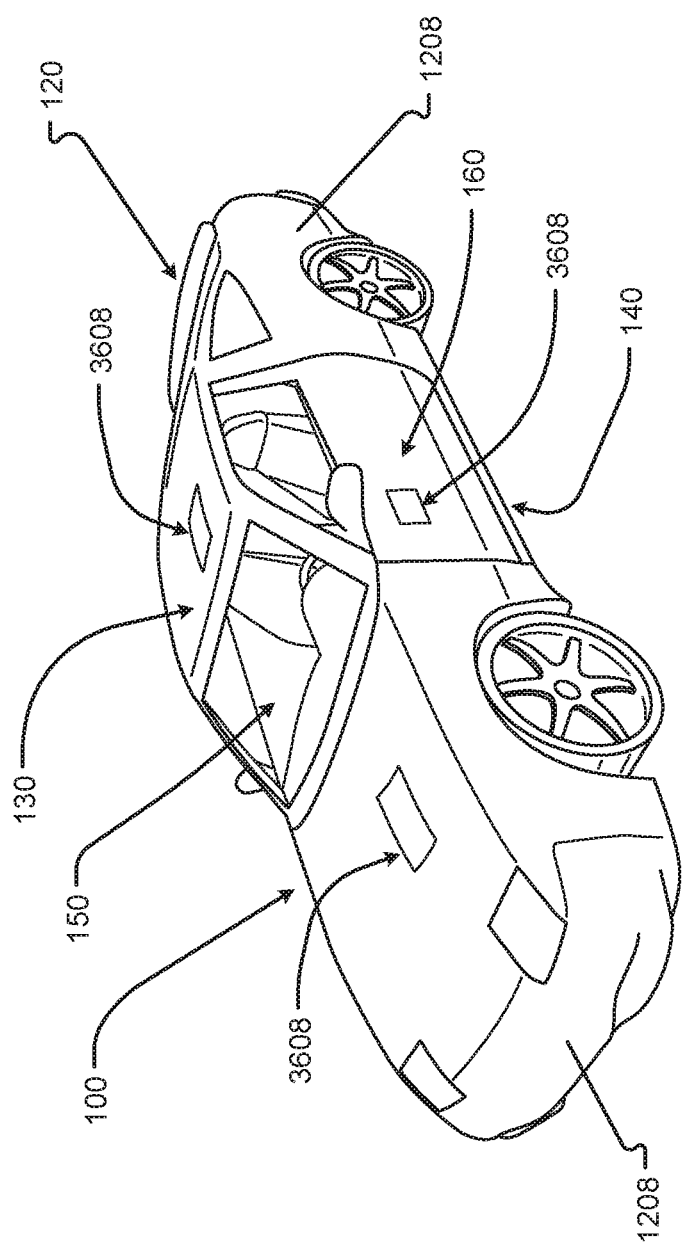
FIG. 36 shows a vehicle in an integrated vehicle charging panel environment in accordance with embodiments of the present disclosure.
Figure 37:
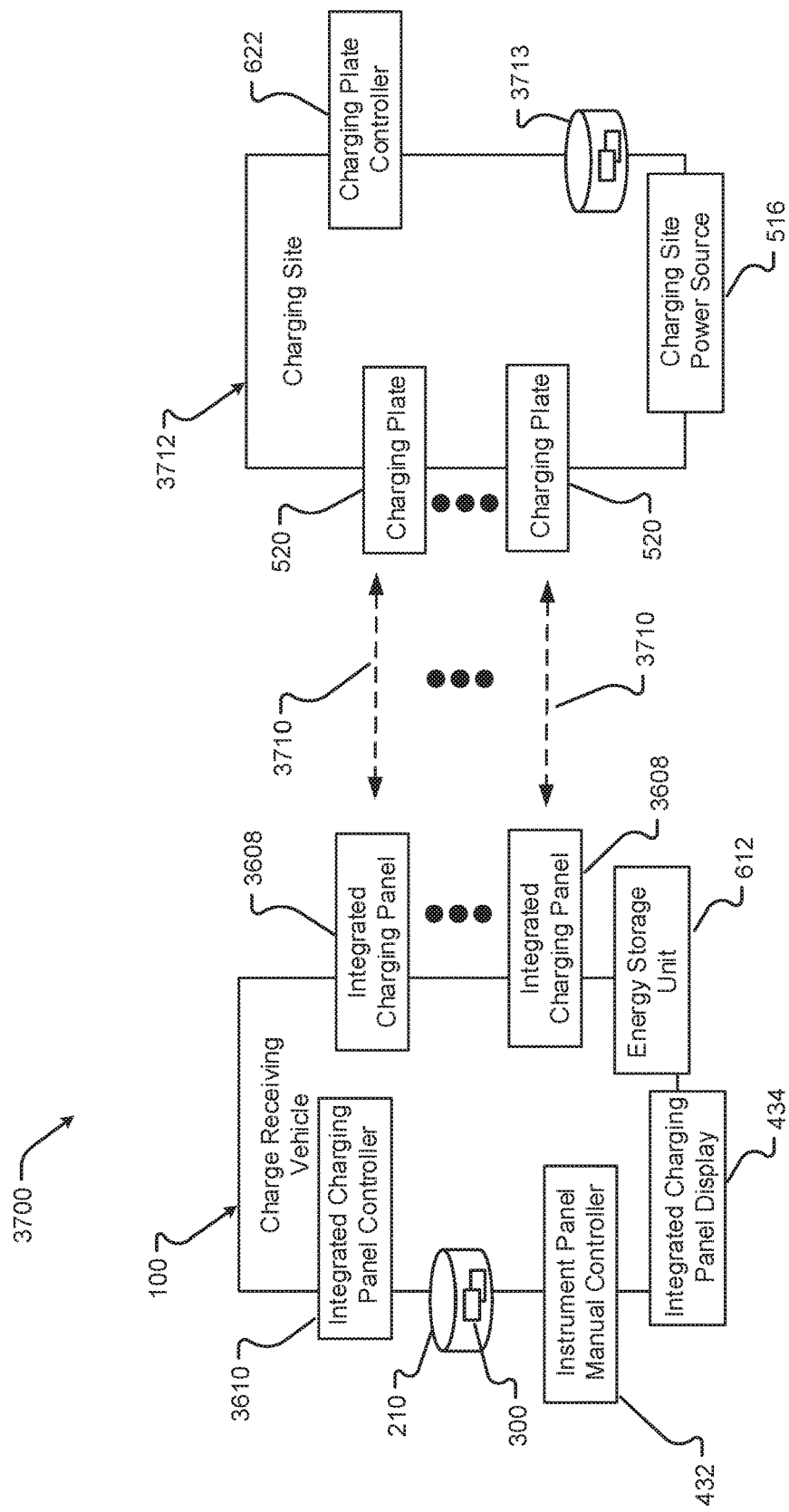
FIG. 37 shows a block diagram of an integrated vehicle charging panel system.
Figure 38:
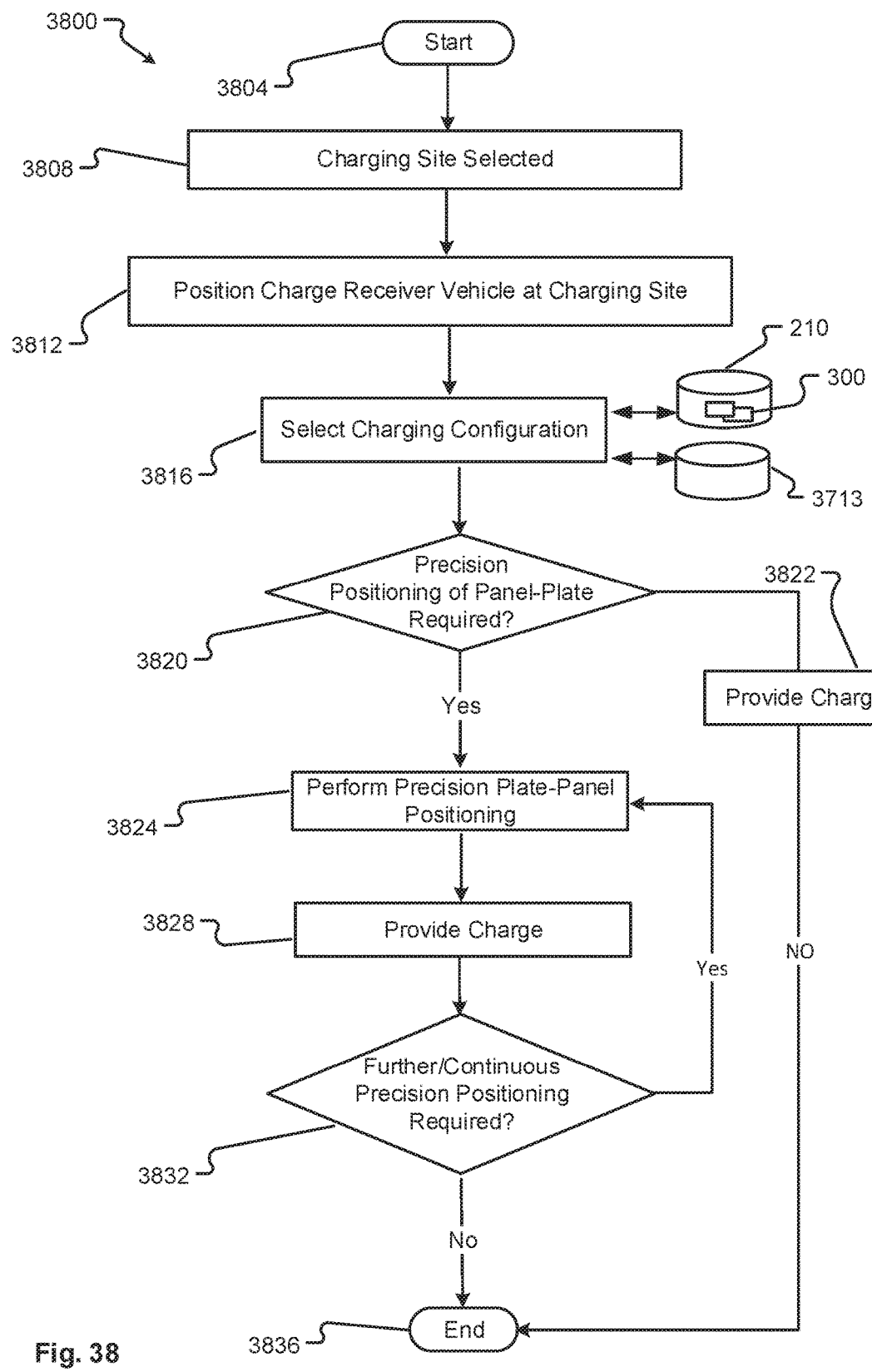
FIG. 38 shows a flow or process diagram of a method of use of an integrated vehicle charging panel system.

An integrated charging panel system is disclosed with respect to FIGS. 36-38. Generally, the integrated charging panel system 3700 is configured to provide a charging service to a vehicle by way of one or more integrated charging panels 3608.

With attention to FIGS. 36-37, the integrated charging panel system 3700 comprises a charge receiving vehicle 100 and a charging site 3712. The charge receiving vehicle 100 comprises one or more integrated vehicle charging panels 3608, integrated vehicle charging controller 3610, vehicle database 210 with associated data structure 300, instrument panel manual controller 432 and energy storage unit 612. The charging site 3712 comprises one or more charging plates 520, charging site power source 516, charging plate controller 622, and charging site database 3713. The one or more charging plates 520 are in charging communication 3710 with the one or more integrated charging panels 3608.

With attention to FIG. 36, a plurality of integrated charging panels 3608 are depicted: one each on the vehicle hood, the vehicle roof and the driver's side door. Many configurations are possible, comprising panels 3608 that are flush or conformal with the exterior surface of the vehicle (as each of the integrated vehicle charging panels 3608 of FIG. 36 are depicted). In some configurations, the panel 3608 is deployable, i.e. it may extend from the body of the vehicle. Such deployment is controlled by integrated vehicle charging controller 3608 and may include one or more actuators. A deployable or moveable panel 3608 may deploy or extend in any of three dimensions and/or three axes of rotation. In some configurations or embodiments, the panel 3608 may be positioned as a blister with respect to the vehicle exterior, i.e. a bump that is not conformal with the vehicle skin. In some configurations or embodiments, the panel 3608 may form a depression with respect to the vehicle skin. The location of the panel 3608 may be any location on the vehicle, comprising bumpers, hood, roof, hatch area, frame pillars, doors, side panels, wheel wells and undercarriage. In one embodiment, the panel 3608 is located anywhere on the vehicle 100 except the undercarriage.

With attention to FIG. 37, the functions and interaction of the elements of the integrated charging panel system 3700 will be described with reference to a typical charging scenario. Charge receiving vehicle 100 may determine it is in need for a charging service, e.g. by monitoring of the energy storage unit 612 of vehicle 100 by integrated charging panel controller 3610. The vehicle 100 then drives to a candidate charging site 3712. The candidate charging site 3712 may be identified by data stored in vehicle database 210 and/or data stored in charging site database 3713. The vehicle 100, once nominally positioned at charging site 3712, may finely position vehicle 100 so as to align or position the one or more integrated charging panels 3608 to receive a charge from the charging site 3712; in one embodiment, by way of one or more charging plates 520. The charging plates 520 provide charging to the integrated charging panels 3608; in one embodiment, by way of induction. The charging plates 520 are controlled by charging plate controller 622, and receive power by charging site power source 516. Positioning and orientation of the charging plates 520 (i.e. positioning in any of three linear dimensions and orientation in any of three rotational dimensions) is performed by charging plate controller 622. Similarly, the integrated charging panels 3608 are controlled by the integrated charging panel controller 3610. Positioning and orientation of the integrated charging panels 3608 (i.e. positioning in any of three linear dimensions and orientation in any of three rotational dimensions) is performed by integrated charging panel controller 3610. In one embodiment, the integrated charging panel controller 3610 operates as a feedback controller, e.g. for positioning of the plate relative to the panel and/or the positioning of the panel relative to the plate, as provided in FIG. 21 and associated description.

FIG. 38 shows a flow or process diagram of a method of use 3800 of an integrated charging panel system 3700. The method starts at step 3804 and ends at step 3836. The steps are notionally followed in increasing numerical sequence, although, in some embodiments, some steps may be omitted, some steps added, and the steps may follow other than increasing numerical order.

At step 3808, the charging site is selected. The charge site selection may consider compatibility between the charge receiving vehicle 100 and the charging site 3808. For example, a given charging site may be limited to solely charging vehicles with charging panels disposed on a vehicle undercarriage, in which case a vehicle that does not have undercarriage charging capability would be incompatible, thereby removing the given site from selection. The method continues to step 3812. At step 3812, the vehicle 100 is positioned at the charging site. For example, the vehicle may be driven to the charging site, in the case of a stationary charging site such as a charging pad. Alternatively, for charging "sites" that are embedded in a roadway, the step 3812 of positioning translates to driving the vehicle along the charging roadway. The method 3800 continues to step 3816.

At step 3816, the charging configuration is selected. Here, the vehicle 100, through integrated charging panel controller 3810 and query to vehicle database 210 and associated data structure 300, selects a compatible charging configuration. For example (with attention to FIG. 3), for the data of 310J, a charging site providing manual charging requires charging to integrated charging panels disposed at roof and/or side of vehicle 100. The integrated charging panel controller 3810 may also query charging site database 3713 which may comprise a data structure similar to that of FIG. 3. The method continues to step 3820.

At step 3820, the method queries as to whether precision positioning of the vehicle integrated charging panel(s) 3608 with respect to the charging site 3712 (such as with the respect to the charging plates 520) require precision positioning. Here, precision positioning means more positioning than that ordinarily required by simply parking the vehicle at a stationary charging site such as a charging pad. If the result of the query is No, then the step 380 proceeds to step 3822 and the vehicle receives a charge at step 3822, wherein after step 3822 the method 3800 ends at step 3836. However, if the result of the query of step 3820 is Yes, then the method 3820 proceeds to step 3824.

At step 3824, the integrated charging panel controller 3810 precisely positions the one or more integrated charging panels 3608 with respect to the one or more charging plates 520 so as to enable charging of the vehicle 100. That is, the panels are positioned relative to the plates to receive a charge. In one embodiment, the one or more charging plates 520 are alternatively or additionally precisely maneuvered or positioned (by the charging plate controller 622) relative to the integrated charging panels 3608 to enable a charge. One the panel-plate combination are adequately positioned at step 3824, the method 3800 continues to step 3828 wherein a charge is provided. The method then continues to step 3832. At step 3832, the method 3800 queries as to whether the panel-plate combination require further or additional precision positioning (to include continuous positioning, as would be required by a feedback control system). If the result is No, then the method 3800 proceeds to step 3826 and ends. If the result of the query of step 3832 is Yes, then the method proceeds to step 3824 and additional precision panel-plate positioning is performed.

Figure 39B:
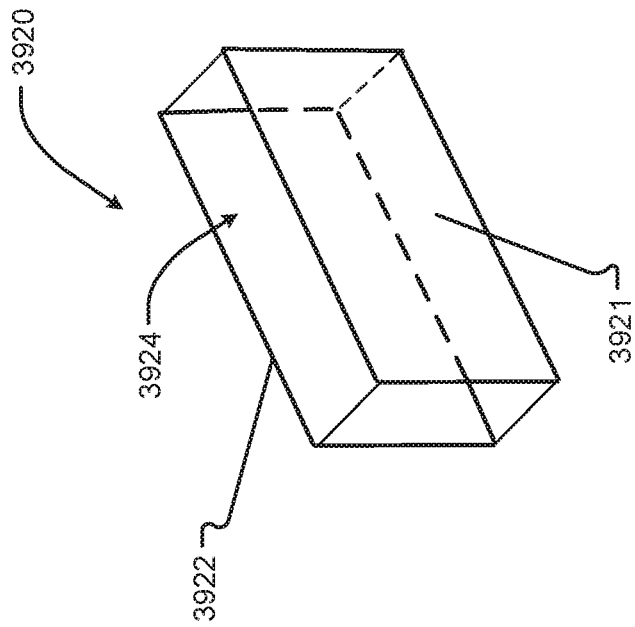
FIG. 39B shows additional detail of the door capacitor element of the skin charging system of FIG. 39A.
Figure 39A:
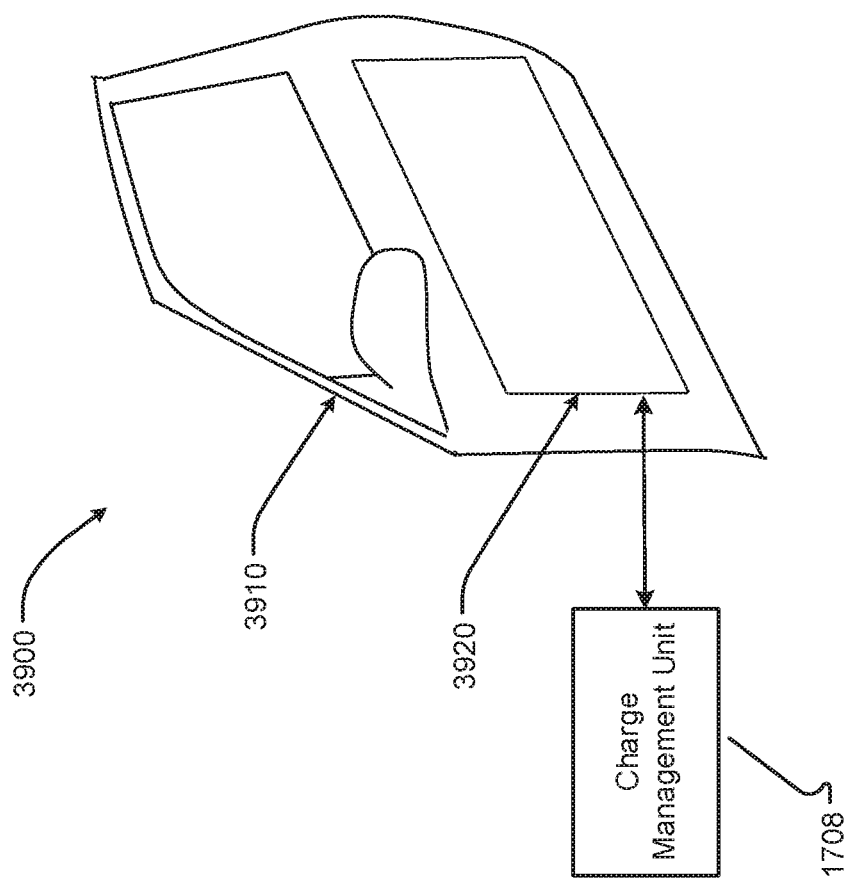
FIG. 39A shows one embodiment of the skin charging system.

FIGS. 39A-B depict a skin charging system 3900 comprising a door capacitor 3920 in communication with a charge management unit 1708 (as described above, e.g. with respect to FIG. 17). The door capacitor 3920 may more broadly be termed a capacitive electrical storage unit as, for example, the door capacitor 3920 may be disposed or mounted or engaged with any portion of the vehicle 100, such as the roof or other body panels. The door capacitor 3920 comprises a door capacitor plate one 3921, a door capacitor plate two 3922, and a door capacitor dielectric 3924 disposed between the capacitor plates 3921 and 3922. Door capacitor plate one 3921 is conformal with the exterior skin of door panel 3910 and, in one configuration, is the exterior door skin. Stated another way, the door capacitor plate one 3921 is the exterior skin of the door panel 3910. Note that conformal means a geometry that mirrors another, e.g. a conformal capacitor plate that is conformal with a door panel is configured with a shape or geometry that mirrors the door panel, such that when the plate is placed on top of the panel, minimal or no gaps or space is present between the engaged surfaces of the panel and the plate.

Generally, a capacitor is a passive two-terminal electrical component used to store electrical energy. Capacitors at least contain two electrical conductors (i.e. a pair) such as plates, separated by a dielectric that acts as an insulator which stores energy by becoming polarized. The conductors may be thin films, foils, centered beads of metal, conductive electrolyte, and the like. The non-conducting dielectric acts to increase the capacitor's charge capacity. The dielectric can be glass, ceramic, plastic, film, air, a plastic film, a vacuum, paper, mica, an oxide layer, or the like. Capacitors store electrical energy in the form of an electrostatic field between the plates. The larger the surface area of the plates, and the narrower the gap between them, the greater the capacitance of the capacitor. There are numerous types of capacitors that are capable of being used with the embodiments discussed herein including electrolytic capacitors, tantalum capacitors, polymer capacitors, supercapacitors, and the like. Moreover, flexible capacitors or flexible supercapacitors may be used with the various embodiments discussed herein. Some examples of supercapacitors utilize nanowire-based solutions that are even more efficient than their graphene counterparts. These supercapacitors are capable of delivering quick bursts of high power and are also very quickly charged. One very intriguing aspect of these capacitors, and particularly the graphene-epoxy capacitor, is that the capacitor itself is actually flexible and can be bent or formed into a plurality of different shapes. This can be particularly advantageous to get the capacitor to, for example, conform to the shape of a body panel.

In other embodiments, the skin charging system 3900 comprises a plurality of capacitors. The capacitors may be mounted in conformance with the vehicle 100 exterior skin and/or as an integral part of the vehicle skin. The shape of the capacitor paired plates may be any of several shapes, to include a rectangular shape as depicted in FIGS. 39A-B. For example, the capacitor plates may form all or substantially all of the door panel shape and/or the roof shape. As such, the actual body panel(s) of the vehicle 100 may serve as a charge receptor instead of mounting a separate charge panel onto a panel of the vehicle, such as the roof. The capacitor may be charged and then the energy bled or provided to one or more batteries in the vehicle or to power the vehicle directly. The power management of the capacitor may be controlled by the charge management unit 1708.

The door capacitor 3920 is in electrical contact with the vehicle power systems to provide electrical energy. While the outer door panel can be the capacitor itself, the capacitor could also be affixed to the door panel, such as on the inside of the door panel. Additionally, or alternatively, a flexible capacitor or supercapacitor may be affixed to or otherwise integrated into or as a replacement for the door panel, such as the skin, or other body panel(s) or vehicle parts. In accordance with one exemplary embodiment, these flexible capacitors are associated with one or more of the larger body panels, such as the roof, doors, hood, trunk, floor pan, and the like, thereby maximizing the amount of capacitive energy storage of the vehicle.

In accordance with another exemplary embodiment, and because capacitors have a layered structure such as metal film, dielectric, another layer of metal film, etc., capacitors may be a suitable material for use as the exterior body panel. For example, the basic capacitor structure may be supplemented with additional material(s) to make the capacitor suitable for a body panel. Each of these body panels may then be interconnected to the vehicle's power system thereby greatly increasing the charge storing capacity of the vehicle. The panels could then be painted etc., as a normal body panel would.

In one embodiment, all or part of the capacitive electrical storage unit is enclosed is a surrounding safety enclosure, such as a boxed structure. The safety enclosure is to guard against inadvertent electrical shock or discharge through errant contact with a charged capacitive electrical storage unit. The safety enclosure may be manufactured of an insulative materials or otherwise provide electrical shielding.

Figure 40:
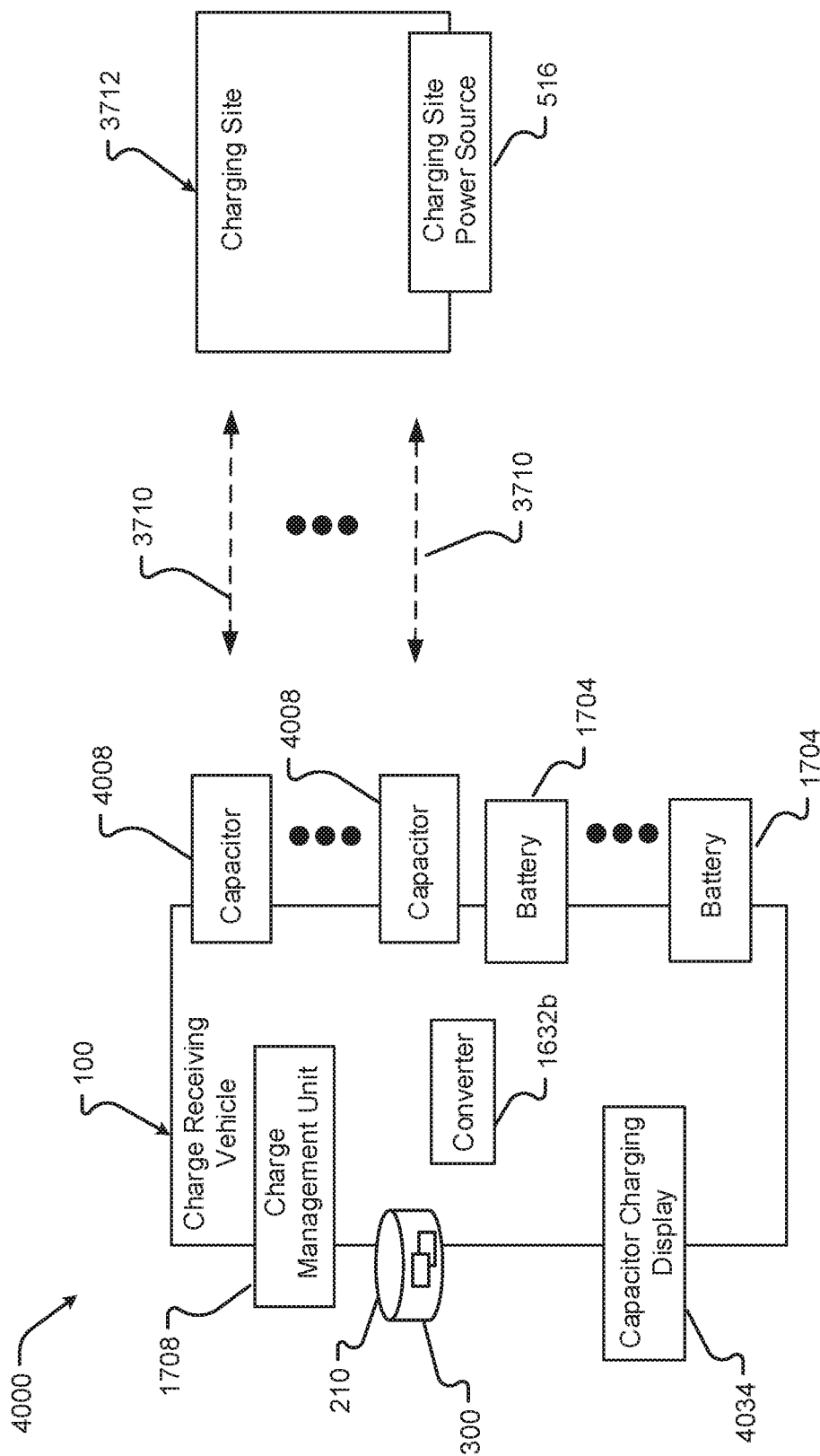
FIG. 40 shows a block diagram of one embodiment of a vehicle capacitive charging system.

FIG. 40 shows a block diagram of one embodiment of a vehicle capacitive charging system 4000, also termed a battery/capacitive system. The features, functions and interactions of the vehicle capacitive charging system 4000 will be described with reference to a typical charging scenario. Generally, the vehicle system 4000 comprises one or more capacitors 4008, one or more batteries 1704, at least one converter 1632b, a charge management unit 1708, database 210, and capacitor charging user display 4034. Charge receiving vehicle 100 may determine it is in need for a charging service, e.g. by monitoring of the one or batteries 1704 and/or capacitors 4008. The vehicle 100 then drives to a candidate charging site 3712. The candidate charging site 3712 may be identified by data stored in vehicle database 210. The vehicle 100, once nominally positioned at charging site 3712, may finely position vehicle 100 so as to align or position the one or more capacitive electrical storage units 4008 to receive a charge from the charging site 3712. The capacitive electrical storage units 4008 may be positioned by way of capacitor charging panel 4034 and/or charge management unit 1708. Positioning and orientation of the capacitive electrical storage units 4008 (i.e. positioning in any of three linear dimensions and orientation in any of three rotational dimensions) is performed by capacitor charging panel 4034 and/or charge management unit 1708. In one embodiment, the capacitor charging panel 4034 and/or charge management unit 1708 operates as a feedback controller, e.g. for positioning of the plate relative to the panel and/or the positioning of the panel relative to the plate, as provided in FIG. 21 and associated description. The capacitor charging display 4034 enables a user, such as a driver or passenger, to maneuver or position one or more capacitors 4008 relative to the charging site 3712 so as to receive charging. The electrical converter 1632b is in electrical communication with capacitors 4008 and batteries 1704.

The one or more capacitors 4008 may operate in any of several ways with the batteries 1704. In one embodiment, the capacitors 4008 supplement the electrical power stored in the batteries; in another embodiment, the capacitors charge the batteries 1704. Capacitors charge typically more swiftly and are able to accept a charge that can then bled or otherwise transferred into the batteries. In some embodiments, the battery 1704 or battery banks may be eliminated entirely and replaced with capacitors 4008.

In accordance with one exemplary embodiment, the vehicle's battery banks 1704 are supplemented with one or more capacitor banks 4008, as shown in FIG. 40, to facilitate rapid charging and/or extra energy storage capacity. As discussed, capacitors typically can charge significantly faster than most batteries and can be used when, for example, a rapid charge is desired. For example, upon connecting the vehicle to a charging site 3712, the charging site 3712 may be connected to one or more of the capacitor banks 4008 and battery banks 1704. The energy from the charging site 3712 may be sent to the capacitor banks 4008, and energy can also be sent from the charging site 3712 (as charged itself by charging site power source 516) to the battery banks 1704 to optionally charge the two in parallel. However, the capacitors have the ability to charge much quicker, and will be at full charge typically long before the battery banks are at full charge. Upon the capacitor banks reaching full charge, the charger could then be disconnected with the capacitors one or more of supplying power to the vehicle, and supplying power to the batteries at a rate which is appropriate for the charging of the batteries.

In an alternate embodiment, the battery banks 1704 in the vehicle 100 are eliminated and replaced with one or more capacitor banks 4008. These capacitor banks 4008 can supply energy to the vehicle 100 as needed, and are also capable of both receiving a charge very quickly, and able to supply a tremendous amount of power if needed to any one or more of the vehicle systems, e.g., powertrain, navigation system, lighting system, infotainment system, etc. The one or more capacitor banks may be connectable to one or more chargers either wired or wireless. The capacitor banks 4008 act in a similar manner as the battery banks 1704, and are able to provide energy to various vehicle systems. As will be discussed hereinafter, a vehicle 100 can include a power cell that includes one or more capacitor banks in a similar manner to the way battery banks are currently integrated into vehicles, or can be integrated into one or more body panels or other locations of the vehicle as discussed hereinafter.

The relative and/or absolute charging level and/or rate of charging may be controlled or managed by the charge management unit 1708 and/or the capacitor charging display 4034 with user input. For example, a user, such as a driver or a passenger, may select (by way of the capacitor charging display 4034) a first charging threshold value or charging rate for one or more capacitors 4008 and/or the one or more batteries 1704 which is then achieved by way of the charge management unit 1708. The capacitor charging display 4034 may have similar functions and features of the integrated charging panel display 434.

Figure 41:
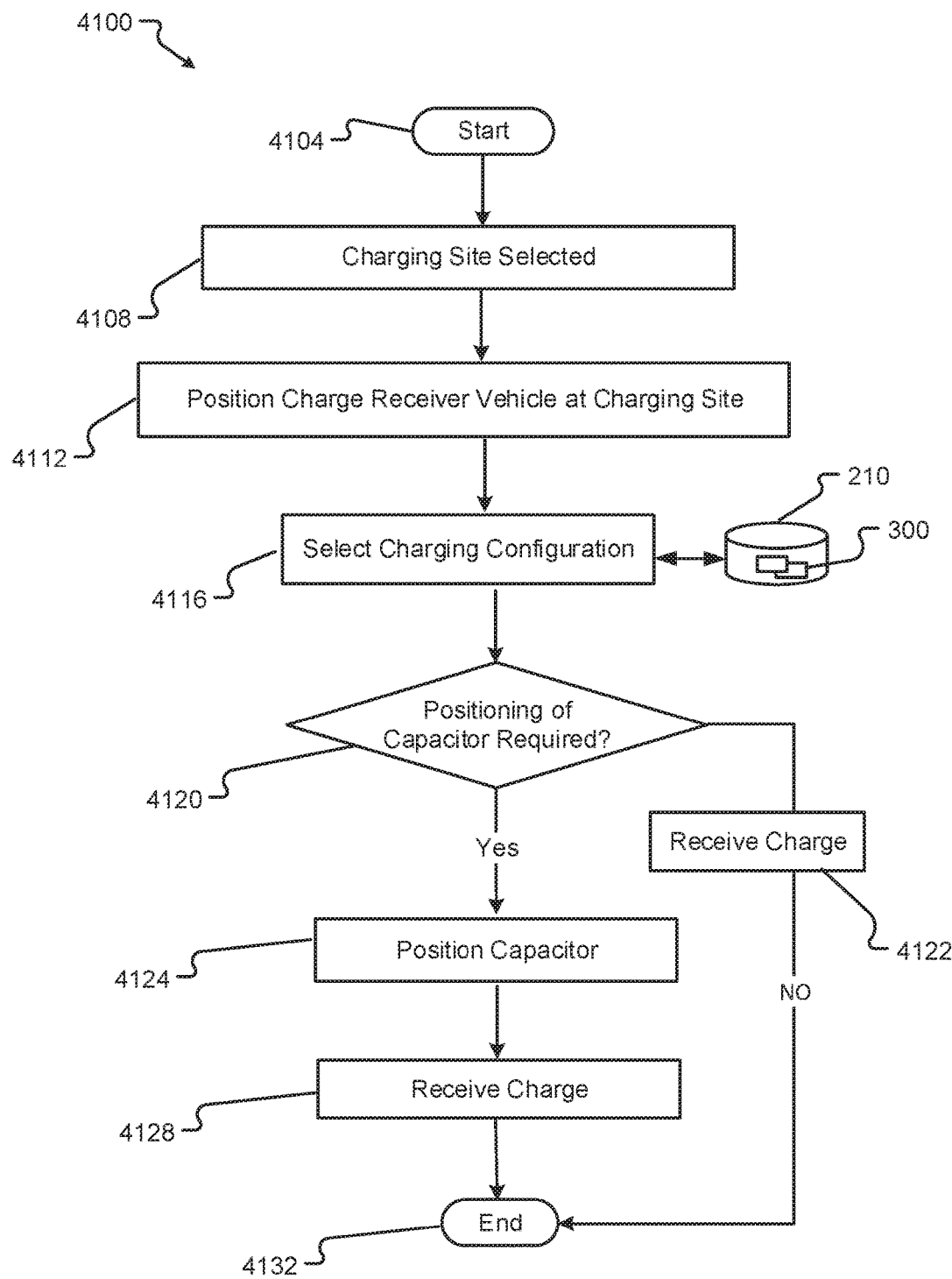
FIG. 41 shows a flow or process diagram of a method of use of a vehicle capacitive charging system.

FIG. 41 shows a flow or process diagram of a method 4100 of use of a vehicle capacitive charging system 4000. The method starts at step 4104 and ends at step 4132. The steps are notionally followed in increasing numerical sequence, although, in some embodiments, some steps may be omitted, some steps added, and the steps may follow other than increasing numerical order.

At step 4108, the charging site is selected. The charge site selection may consider compatibility between the charge receiving vehicle 100 and the charging site 3712. For example, a given charging site may be limited to solely charging vehicles with standard electrical charging plug receptacles and not able to charge capacitors, in which case a vehicle that requires charging of capacitors would be incompatible, thereby removing the given site from selection. The method continues to step 4112. At step 4112, the vehicle 100 is positioned at the charging site. For example, the vehicle may be driven to the charging site, in the case of a stationary charging site such as a charging pad. Alternatively, for charging "sites" that are embedded in a roadway, the step 4112 of positioning translates to driving the vehicle along the charging roadway. The method 4100 continues to step 4116.

At step 4116, the charging configuration is selected. Here, the vehicle 100, through charge management unit 1708 and/or capacitor charging display 4034 and query to vehicle database 210 and associated data structure 300, selects a compatible charging configuration. For example, a compatible charging configuration may require one or more capacitors 4008 to extend from vehicle 100 to receive a charge from charging site 3712. The charge management unit 1708 and/or capacitor charging display 4034 may also query charging site database which may comprise a data structure similar to that of FIG. 3. The method continues to step 4120.

At step 4120, the method queries as to whether precision positioning of the vehicle capacitors 4008 with respect to the charging site 3712 require capacitor positioning. Here, capacitor positioning means more capacitor positioning than that ordinarily required by simply parking the vehicle at a stationary charging site such as a charging pad. If the result of the query is No, then the step 4120 proceeds to step 4122 and the vehicle receives a charge at step 4122, wherein after step 4122 the method 4100 ends at step 4132. However, if the result of the query of step 4120 is Yes, then the method 4100 proceeds to step 4124.

At step 4124, the charge management unit 1708 and/or capacitor charging display 4034 positions the one or more capacitors 4008 with respect to the charging site 3712 so as to enable charging of the vehicle 100. Once the capacitors are adequately positioned at step 4124, the method 4100 continues to step 4128 wherein a charge is provided. The method then continues to step 4132 and ends.

Figure 42:
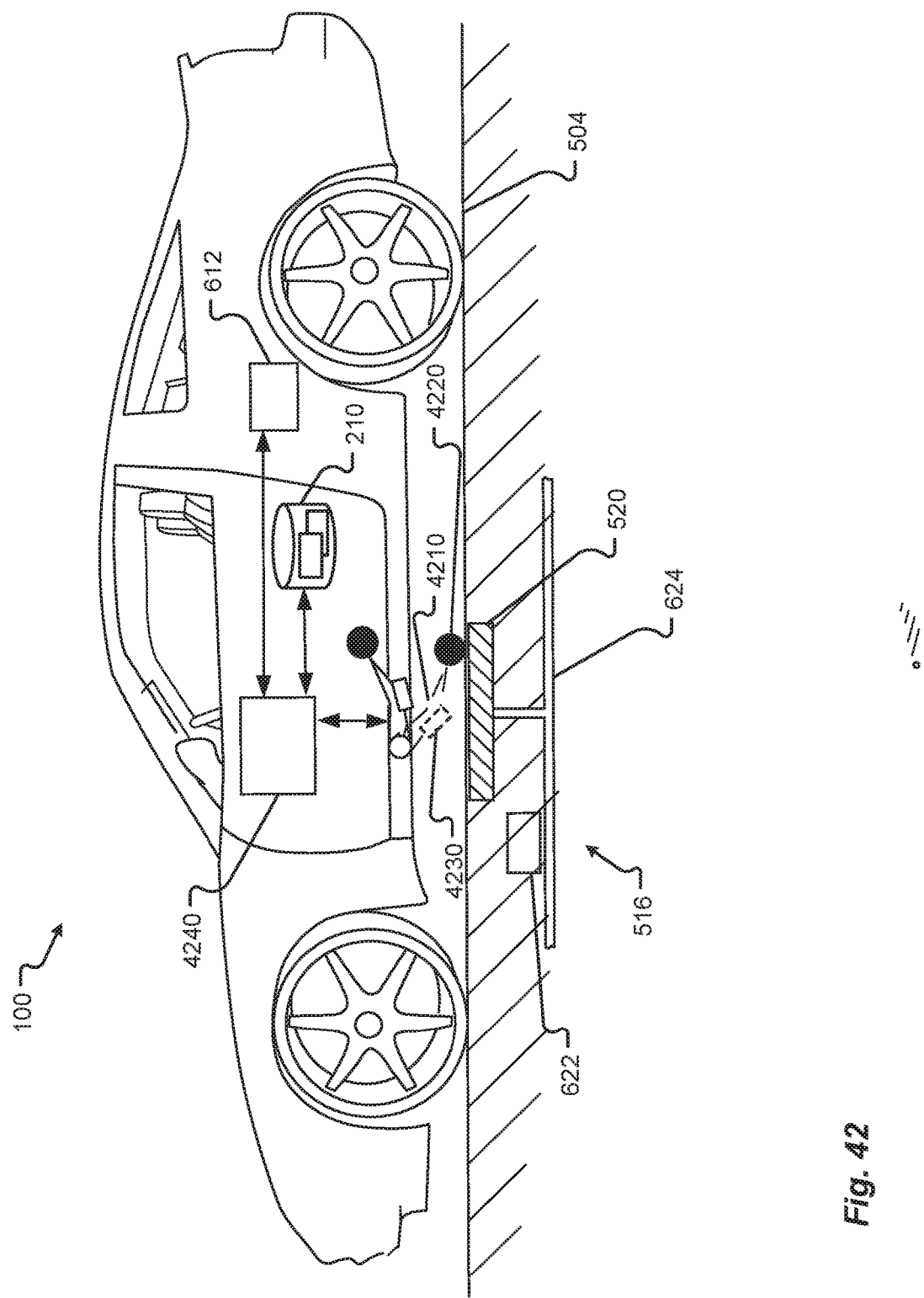
FIG. 42 shows a vehicle in an electric contact charging environment in accordance with embodiments of the present disclosure.
Figure 43A:
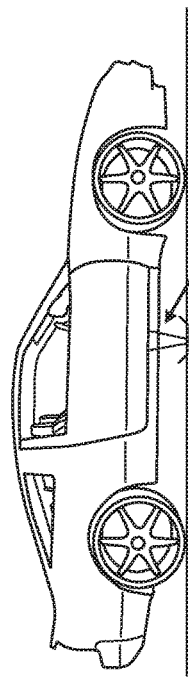
FIG. 43A shows a vehicle in an electric contact charging environment with a particular embodiment of a contact system in accordance with embodiments of the present disclosure.
Figure 43C:
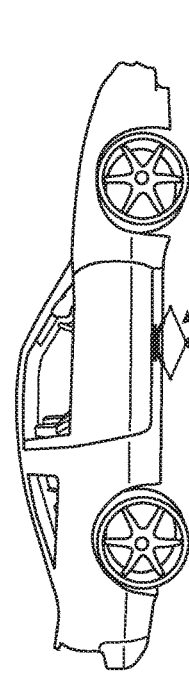
FIG. 43C shows a vehicle in an electric contact charging environment with an alternate particular embodiment of a contact system in accordance with embodiments of the present disclosure.
Figure 43B:
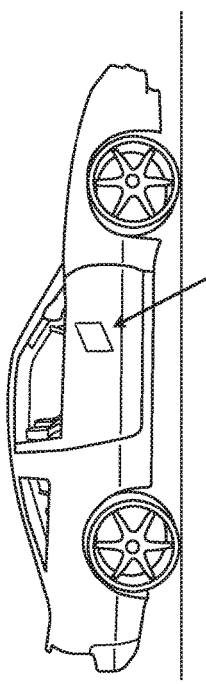
FIG. 43B shows a vehicle in an electric contact charging environment with an alternate particular embodiment of a contact system in accordance with embodiments of the present disclosure.
Figure 43D:
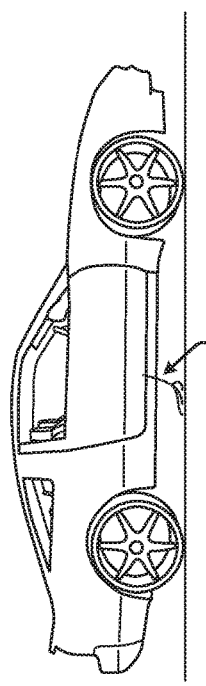
FIG. 43D shows a vehicle in an electric contact charging environment with an alternate particular embodiment of a contact system in accordance with embodiments of the present disclosure.
Figure 44:
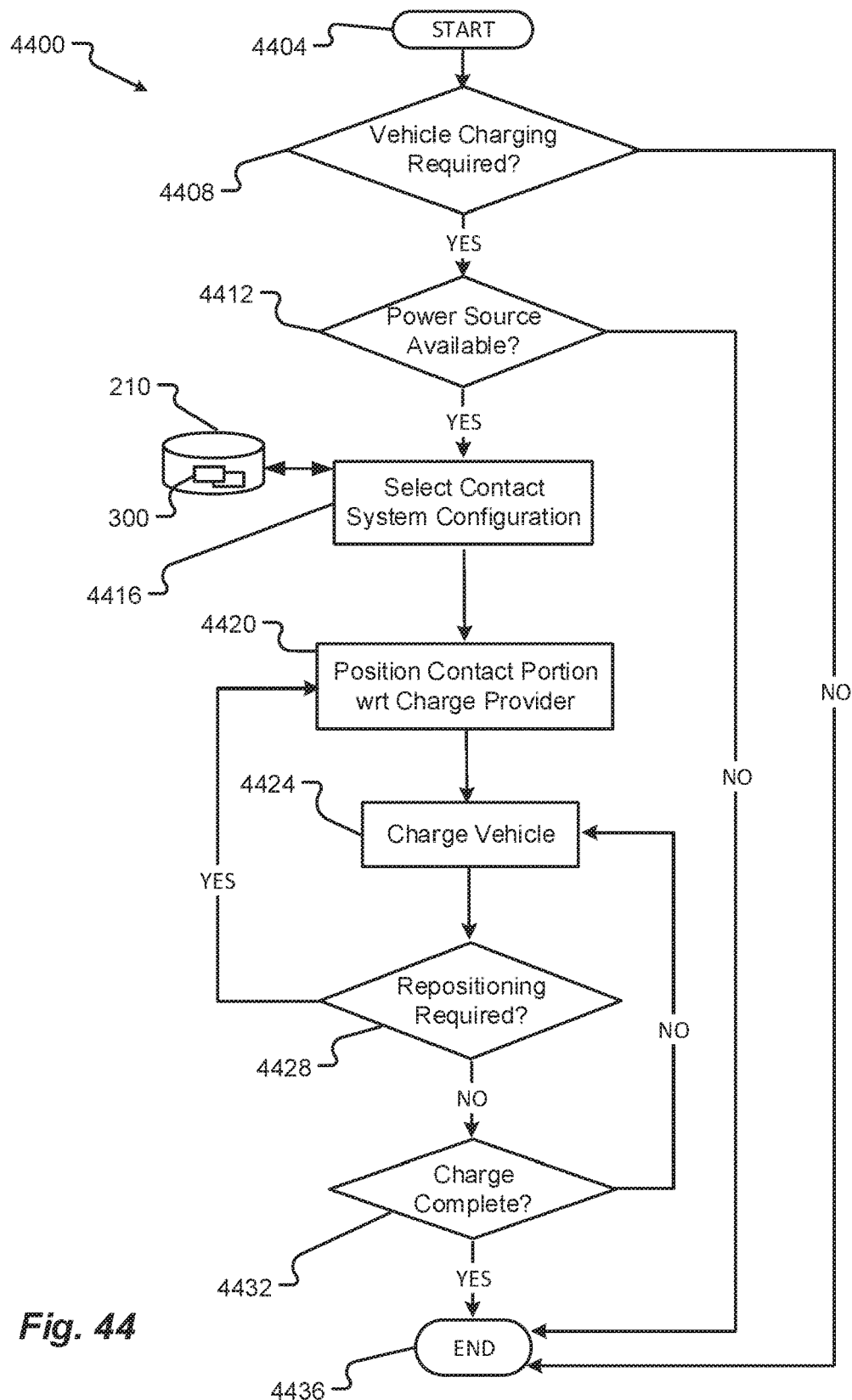
FIG. 44 shows a flow or process diagram of a method of use of an electric contact charging system.

A system and method of use for charging an electrical storage unit of an electrical vehicle through a contact device is disclosed in FIGS. 42-44. Generally, an electrical contact device, typically a deployable contact device, engages an external power source to receive and pass a charge to an electrical storage unit aboard and electric vehicle. The electric contact device may be of various configurations, as will be described below.

With particular attention to FIGS. 42 and 43A-D, a vehicle 100 comprising an electrical charging contact system 4200 is depicted. The contact system 4200 is deployable and is shown in an undeployed or stowed state or first state (as solid lines) and in a deployed or second state (as dashed lines) in FIG. 42. The contact system 4200 comprises contact arm 4210, contact portion 4220, contact sensor 4230 and contact controller 4240. The contact controller 4240 operates or controls or maneuvers the contact arm 4210 such that the contact portion 4220 electrically engages (typically through physical contact) an external charging power source 516, as located on or within roadway 504. The charging source 516 comprises charge provider controller 622, charging plate 520 and transmission line 624. The contact portion 4220 interacts, interconnects or otherwise electrically engages the charging source 516 by way of the charging plate 520 to receive electrical power or charging. The received electrical charging or power, as received by the contact portion 4220, is provided or communicated or transmitted to the energy storage unit 612, in one embodiment by way of the contact controller 4240. The contact controller 4240 interacts or communicates with the vehicle database 210 to determine charging parameters, comprising positioning parameters of the contact portion 4220 relative to roadway 504 and/or charging plate 420 and compatibility of the contact system 4200 with the power source 516. Note that any of several types of power source 516 configurations are possible, to include charging strips embedded below a roadway and running the length of a roadway (akin to railroad tracks or light rail tracks on or below a roadway).

The contact system 4200 may take any of several forms, such as the embodiments of FIGS. 42 and 43A-D. A contact system 4200 comprising a wheeled contact portion 4220 is depicted in FIG. 42. A wheeled contact portion configuration 4220 would involve the wheeled portion rolling adjacent or on top of the charging source (e.g. a railed configuration for the charging source) wherein electrical communication is maintained such that charging may be received. The wheeled portion may be a plurality of wheels in alternate configurations. The contact portion comprises a conductive material.

Other embodiments of the contact system 4200 are provided in FIGS. 43A-D. FIG. 43A depicts a contact system 4200 comprising a pantograph configuration for the contact portion 4220. The pantograph contact portion 4220 system is depicted with the pantograph upside down from its typical configuration on a trolley or railcar. Note that in alternate embodiments, the pantograph (or any other of the contact systems 4200 with associated contact portions 4220 may be disposed or mounted on the upper portion (eg roof) of a vehicle 100.

The pantograph contact portion 4220 system may comprise any known means to connect to electrical power (to include electrical power cables), such as a pantograph, a bow collector, a trolley pole or any means known to those skilled in the art. Further disclosure regarding electrical power or energy transfer via pantograph (and other overhead systems) is found in US Pat. Publ. No. 2103/0105264 to Ruth entitled "Pantograph Assembly," the entire contents of which are incorporated by reference.

Contact portion 4220 and/or contact system 4220 may be located anywhere on vehicle 100, to include, for example, the roof, side panel, trunk, hood, front or rear bumper of the charge receiver 100 vehicle, as long as the contact portion 4220 engages the power source 516. Contact system 4200 and/or contact portion 4220 may be stationary (e.g. disposed on the roof of vehicle 100) or may be moveable or deployable. For example, pantograph contact portion 4220 may be positioned in at least two states comprising retracted and extended. In the extended state pan contact portion 4220 engages power source 516 by way of physical contact. In the retracted state, contact portion 4220 may typically reside flush with the roof, undercarriage or side of vehicle 100 and extend only when required for charging. Control of the charging and/or positioning of the contact portion 4220 and/or contact system 4200 may be manual, automatic or semi-automatic (such as via contact controller 4240); said control may be performed through a GUI engaged by driver or occupant of receiving vehicle 100 and/or driver or occupant of charging vehicle.

FIG. 43B depicts a contact system 4200 comprising a skid configuration for the contact portion 4220, while FIG. 43C depicts a brush configuration for the contact portion 4220. Note that the skid and the brush configurations provide multiple (electrical) contact locations between the contact portion 4220 and charging source, thereby potentially increasing reliability of the electrical contact and therefore reliability or speed of charging. The brush configuration provides a passive ability to adapt to varied local distance separation of the contact portion and the roadway, e.g. due to local crown or crest in a roadway. The contact portion may engage other passive components to maintain contact with the roadway in the presence of roadway anomalies, e.g. the contact portion may engage a leaf-spring. In some embodiments, the contact portion and/or the contact arm 4210 engages an actuator to assist or enable the positioning of the contact portion.

The contact portion 4220 may be controlled by the contact controller 4240 in any of several ways to achieve any of several objectives. For example, the vertical positioning of the pantograph may be controlled with respect to height extension relative to vehicle, the roadway 504 or the charging source such as the charging plate 520. The force or pressure imposed onto the roadway by the pantograph may also be controlled, e.g. force or pressure may increase when traveling over hilly terrain which would urge separation of the physical contact between the pantograph and the charging source during cresting of hills.

The positioning of the contact portion 4220 is controlled by the contact controller 4240, such as by feedback control as enabled by measurement of the vertical position of the contact portion 4220 relative to the roadway or the charging plate. Such a measurement is provided by a contact sensor 4230, which may be disposed on one or more of the contact portion 4220 and contact arm 4210. The positioning and automated control, such as by feedback control, of the contact portion 4220 relative to the roadway 516 and/or charging plate 520 is similar to the positioning of "charging panel 108" described in U.S. patent application Ser. No. 14/979,158, filed on Dec. 22, 2015, entitled "Electric Vehicle Charging Device Alignment and Method of Use", incorporated by reference in entirety.

FIG. 43D depicts a contact system 4200 comprising a vehicle surface or skin or body panel mounted charging panel, the charging panel serving as the contact portion 4220. The operation and characteristics of the skin-mounted contact portion 4220 is similar to the integrated charging panel 3608 described in U.S. patent application Ser. No. 15/223,814 filed Jul. 29, 2016, entitled "Vehicle Skin Charging System and Method of Use", incorporated by reference in entirety. In one embodiment, the vehicle skin-mounted contact portion 4220 is configured such that when the vehicle 100 is brought into contact with another (charging) vehicle, and the charging contacts of the two vehicles are in electrical contact with one another, vehicle-to-vehicle sharing of energy is possible. As will be appreciated, numerous vehicles can be daisy-chained together, such as bumper to bumper, to facilitate charging through a plurality of vehicles simultaneously. This can be facilitated through the use of the vehicle-to-vehicle contacts with all-vehicles within the daisy chain capable of receiving and/or sharing a charge/energy.

A vehicle 100 may comprise more than one contact portion 4220, e.g. a vehicle 100 may comprise both a wheeled contact portion 4220 (i.e. that of FIG. 42) and a brush contact portion 4220 (i.e. that of FIG. 43C). The contact controller 4240 may control the use of one or more contact portions 4220.

FIG. 44 shows a flow or process diagram of a method of use 4400 of an electric contact charging system 4200. The method starts at step 4404 and ends at step 4436. The steps are notionally followed in increasing numerical sequence, although, in some embodiments, some steps may be omitted, some steps added, and the steps may follow other than increasing numerical order.

At step 4408, a query is made as to whether the vehicle 100 requires charging. If the response is NO, the method 4400 continues to step 4436 and ends. If the response to the query is Yes, the method continues to step 4412.

At step 4412, a query is made to determine if a charging site is available. Such a charging site may be a roadway charging site, such as an embedded railroad-like charging "site" wherein rails on or within the roadway may provide or transmit electrical power by way of the contact portion 4220 to the vehicle 100. If the response to the query of step 4412 is No, the method 4400 continues to step 4436 and the method 4400 ends. If the result of the query of step 4412 is Yes, the method 4400 continues to step 4416.

At step 4416, a configuration for the contact system 4200 is selected, in some embodiments with aid of query to a vehicle database 210 comprising data structure 300. The selection of system configuration may involve many parameters defining the system configuration, comprising nominal distance between contact portion 4220 and charging source e.g. the charging plate 520 of roadway 504, force imparted to contact portion 4220 when engaged with the charging source, amperage or voltage settings, rate of charge, and type(s) of contact portion 4220 to use if the vehicle 100 is configured with a plurality of contact systems 4200 and/or plurality of contact portions 4220. One or more of the afore-mentioned system configuration parameters may be stored in data structure 300 of vehicle database 210. The selection of the charging configuration may consider compatibility between the charge receiving vehicle 100 and the contact system 4200. For example, a given charging means may be limited to solely charging vehicles with wheeled contact portions 4220 and not able to provide charging by way of a pantograph contact portion 4220 system. In one embodiment, the selection of contact system configuration comprises use of a display that may enable the user to interact with or query the database 210.

At step 4420, the contact portion 4220 is positioned relative to the charging source. The positioning may be facilitated by an actuator and/or by control provided by contact controller 4240. The method continues to step 4424, wherein the contact portion 4220 receives a charge from the external power source, the charge provided to the energy storage unit 612. The method continues to step 4428.

At step 4428, a query is made to determine if repositioning of the contact portion 4220 is required. Such repositioning may be required due to a blunt change in positioning of the contact portion 4220 as caused e.g. by a rut in a road, or due to a more precise re-positioning as implemented by a feedback control positioning of the contact portion 4220 relative to the roadway as described above. If the result of the query is Yes, the method continues to step 4420. If the result of the query is No, the method continues to step 4432.

At step 4432, a query is made as to whether charging is complete. That is, a query is made as to whether a desired or selectable charging level of energy storage unit 612 has been achieved. If the result of the query is Yes, the method 4400 continues to step 4436 and the method 4400 ends. If the result of the query is No, the method continues to step 4424.

While the exemplary embodiments described in FIGS. 42-44 are directed toward the contacts utilizing an in-road or in-ground charger contact, it is to be appreciated that the various contact methodologies need not be limited to vehicle-in-road charging. Rather, the contacts can be situated at any appropriate location on a vehicle, such as to contact a roadside charger, or an overhead charger. For the roadside charger, the vehicle contact can be located on the side of the vehicle, and be placed in electrical contact with the roadside charger as the vehicle is moving or parked. In a similar manner, a charger can energize overhead charging lines for a vehicle equipped with one or more overhead contacts that come in contact with the overhead charging lines. In this manner, the vehicle can receive charge from the overhead charging lines which one or more of energized the vehicle, charged the battery, and/or charged the power supply. In another embodiment, the contact system 4200 is configured to receive a charge from a stationary charging source, such as power from a home garage environment. In accordance with this exemplary embodiment, one charger provides charging contacts that are located or are extendable from the roof of the garage, and a second charger supplies charging contacts that are located in the floor. For both of these configurations, charging contacts can optionally and automatically be extended, upon detection of the vehicle in the parking space, such as to reduce the chances of a person accidentally coming in contact with the charging contacts. As discussed, the charger could optionally automatically detect the presence of a vehicle, and extend the charging contacts to the appropriate location of the charging contacts on the vehicle—otherwise, when not in use the charging contacts could be shielded.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials

What is claimed is:

1. A system for charging an electrical storage unit of an electric vehicle through a contact device, the system comprising:
- a contact device interconnected to the electrical storage unit of an electric vehicle and configured to receive an electrical charge from an external power source;
- a contact arm interconnected to the contact device, the contact arm configured to position the contact device at a first position relative to the external power source; and
- a contact device controller interconnected to the contact arm and configured to control the contact arm;
- wherein the first position is maintained;
- wherein the contact device controller maintains the first position through a feedback control;
- wherein the contact device receives the electrical charge from the external power source; and
- wherein the electrical storage unit of the electric vehicle is charged.

2. The system of claim 1, wherein the contact device engages the external power source through a physical contact.

3. The system of claim 2, wherein the contact device comprises a contact wheel, a contact brush, and a pantograph.

4. The system of claim 1, wherein the external power source is embedded in a roadway surface.

5. The system of claim 1, further comprising a vertical distance measurement sensor configured to output a distance measurement of a distance between contact device and the external power source.

6. The system of claim 5, wherein the vertical distance measurement sensor is disposed on at least one of the contact device, an actuator and the contact arm.

7. The system of claim 5, wherein the contact device controller receives the distance measurement to enable the feedback control.

8. The system of claim 1, further comprising an actuator interconnected to at least one of the contact device and the contact arm.

9. The system of claim 1, wherein the first position of the contact device relative to the external power source is presented to a user of the electric vehicle on a graphical user interface.

10. The system of claim 9, wherein the graphical user interface is disposed on a mobile device.

11. The system of claim 9, wherein the electric vehicle is moving relative to the external power source.

12. The system of claim 1, wherein the first position is selected from a vehicle database comprising desired contact device separation distances with respect to external power source types.

13. A method for charging an electrical storage unit of an electric vehicle through a contact device, the method comprising:
- determining that the electrical storage unit of the electric vehicle requires charging;
- measuring, by a sensor, a vertical distance measurement between a contact device interconnected to the electrical storage unit of the electric vehicle and an external power source, wherein the contact device is configured to receive an electrical charge from the external power source;
- receiving, by a microprocessor, the vertical distance measurement measured by the sensor;
- positioning, by the microprocessor based on the vertical distance measurement received, the contact device at a first position relative to the external power source, wherein positioning the contact device at the first position relative to the external power source comprises controlling, by the microprocessor, a contact arm interconnected to the contact device, the contact arm configured to maintain the contact device at the first position relative to the external power source; and
- receiving, through the contact device, the electrical charge from the external power source;
- wherein the electrical storage unit of the electric vehicle is charged.

14. The method of claim 13, wherein the contact device engages the external power source through a physical contact.

15. The method of claim 14, wherein the contact device comprises a contact wheel, a contact brush, and a pantograph.

16. The method of claim 15, wherein the external power source is embedded in a roadway surface.

17. The method of claim 16, wherein the first position is selected from a vehicle database comprising desired contact device separation distances with respect to external power source types.

* * * * *